(12) United States Patent
Ren et al.

(10) Patent No.: US 11,155,279 B2
(45) Date of Patent: Oct. 26, 2021

(54) RAIL TRANSPORT SYSTEM

(71) Applicant: BYD COMPANY LIMITED, Shenzhen (CN)

(72) Inventors: Lin Ren, Shenzhen (CN); Hao Zeng, Shenzhen (CN); Junjie Liu, Shenzhen (CN); Fanghong Peng, Shenzhen (CN); Xingcan Huang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 321 days.

(21) Appl. No.: 16/335,224

(22) PCT Filed: Feb. 28, 2017

(86) PCT No.: PCT/CN2017/075166
§ 371 (c)(1),
(2) Date: Mar. 20, 2019

(87) PCT Pub. No.: WO2018/053998
PCT Pub. Date: Mar. 29, 2018

(65) Prior Publication Data
US 2019/0283783 A1 Sep. 19, 2019

(30) Foreign Application Priority Data
Sep. 21, 2016 (CN) .......................... 201610839154.9

(51) Int. Cl.
*B61D 19/02* (2006.01)
*B61B 13/06* (2006.01)
(Continued)

(52) U.S. Cl.
CPC .............. *B61D 19/023* (2013.01); *B60L 5/39* (2013.01); *B61B 13/06* (2013.01); *B61C 3/02* (2013.01);
(Continued)

(58) Field of Classification Search
CPC ........ B61D 19/023; B61D 1/00; B61D 17/10; B61D 17/22; B61D 23/00; B61D 3/10;
(Continued)

(56) References Cited

U.S. PATENT DOCUMENTS

| 2,076,914 | A | * | 4/1937 | Newton | .................... B61B 5/02 |
| | | | | | 105/72.2 |
| 2,503,120 | A | * | 4/1950 | Meyer | ...................... B61F 9/00 |
| | | | | | 104/247 |

(Continued)

FOREIGN PATENT DOCUMENTS

| BR | 102012002851 A2 | 10/2013 |
| CN | 102303611 A | 1/2012 |

(Continued)

OTHER PUBLICATIONS

The World Intellectual Property Organization (WIPO) International Search Report for PCT/CN2017/075166 dated Jun. 23, 2017 6 Pages.

*Primary Examiner* — Mark T Le
(74) *Attorney, Agent, or Firm* — Anova Law Group, PLLC

(57) ABSTRACT

The present disclosure discloses a rail transport system. The rail transport system includes: a rail, where the rail is provided with an escape passage; and a rail vehicle, where the rail vehicle includes a vehicle body and a plurality of bogies, the plurality of bogies respectively movably straddles the rail, and the vehicle body is connected to the plurality of bogies and pulled by the plurality of bogies to travel along the rail; and the vehicle body includes a plurality of compartments hinged sequentially along a length direction of the rail, the plurality of compartments forms at least one compartment group, the compartment group includes three compartments hinged sequentially, and the bottom of each of only compartments that are located at two (Continued)

ends of the compartment group and that are of the three compartments is connected to the bogie. The rail transport system according to this embodiment of the present disclosure has advantages such as facilitation of evacuation of passengers in an emergency, low costs, small occupied space, small rail weight bearing, high stability, and flexible steering.

20 Claims, 61 Drawing Sheets

(51) Int. Cl.
| | | |
|---|---|---|
| *B61D 1/00* | (2006.01) | |
| *B61D 17/10* | (2006.01) | |
| *B61D 17/22* | (2006.01) | |
| *B61D 23/00* | (2006.01) | |
| *B61F 3/04* | (2006.01) | |
| *B61F 9/00* | (2006.01) | |
| *B61F 5/02* | (2006.01) | |
| *B61C 9/50* | (2006.01) | |
| *B61F 13/00* | (2006.01) | |
| *B60L 5/39* | (2006.01) | |
| *B61C 3/02* | (2006.01) | |
| *B61F 5/52* | (2006.01) | |

(52) U.S. Cl.
CPC ............... *B61C 9/50* (2013.01); *B61D 1/00* (2013.01); *B61D 17/10* (2013.01); *B61D 17/22* (2013.01); *B61D 23/00* (2013.01); *B61F 3/04* (2013.01); *B61F 5/02* (2013.01); *B61F 5/52* (2013.01); *B61F 9/00* (2013.01); *B61F 13/00* (2013.01); *B60L 2200/26* (2013.01); *E01B 2204/15* (2013.01); *Y02T 30/00* (2013.01)

(58) Field of Classification Search
CPC .... B61F 5/02; B61F 13/00; B61F 5/52; B61F 3/04; B61F 9/00; B61F 3/12; B61C 9/50; B61C 3/02; B60L 5/39; B60L 2200/26; B61B 13/06; B61B 5/00; B61B 5/02; Y02T 30/00; E01B 2204/15; E01B 25/10
See application file for complete search history.

(56) References Cited

U.S. PATENT DOCUMENTS

| | | | | |
|---|---|---|---|---|
| 2,647,677 | A * | 8/1953 | Reed | B64C 1/24 |
| | | | | 182/88 |
| 3,095,828 | A * | 7/1963 | Deller | B61B 13/04 |
| | | | | 105/144 |
| 3,376,830 | A * | 4/1968 | Bingham | B61F 9/00 |
| | | | | 105/133 |
| 4,061,089 | A | 12/1977 | Sawyer | |
| 4,702,173 | A * | 10/1987 | Perrott | B61B 5/02 |
| | | | | 104/130.07 |
| 4,996,928 | A * | 3/1991 | Janssen | B60G 17/04 |
| | | | | 104/119 |
| 5,372,073 | A * | 12/1994 | Cattani | B61C 9/52 |
| | | | | 105/133 |
| 5,487,555 | A * | 1/1996 | Koch | B60D 5/00 |
| | | | | 105/18 |
| 5,934,198 | A | 8/1999 | Fraser | |
| 6,523,481 | B2 * | 2/2003 | Hara | B61C 13/00 |
| | | | | 104/245 |
| 7,823,512 | B2 * | 11/2010 | Timan | B61B 13/04 |
| | | | | 105/144 |
| 2002/0162478 | A1* | 11/2002 | Henderson | E01B 25/28 |
| | | | | 104/124 |
| 2009/0090293 | A1* | 4/2009 | Santay | G08B 7/00 |
| | | | | 116/28 R |
| 2011/0100253 | A1* | 5/2011 | Koyama | H02K 11/33 |
| | | | | 105/34.1 |

FOREIGN PATENT DOCUMENTS

| | | | |
|---|---|---|---|
| CN | 202879489 U | 4/2013 | |
| CN | 103612635 A | 3/2014 | |
| CN | 104527660 A | 4/2015 | |
| CN | 104554323 A | 4/2015 | |
| CN | 204871031 U | 12/2015 | |
| EP | 0 728 648 | * 8/1996 | |
| KR | 20120059292 A | 6/2012 | |
| WO | WO-2011004331 A | * 1/2011 | ........... B61D 19/023 |

* cited by examiner

RAIL TRANSPORT SYSTEM

CROSS-REFERENCE TO RELATED APPLICATIONS

This application is a national phase entry under 35 U.S.C. § 371 of International Application No. PCT/CN2017/075166, filed on Feb. 28, 2017, which claims priority to Chinese Patent Application No. 201610839154.9, filed on Sep. 21, 2016, content of all of which is incorporated herein by reference in its entirety.

FIELD

The present disclosure relates to the field of transport technologies and, specifically, to a rail transport system.

BACKGROUND

A rail transport system such as a straddle-type monorail train has a complex structure, relatively high costs, relatively large occupied space, and a hidden danger in stability.

To facilitate evacuation of passengers in an emergency, the straddle-type monorail train in the related art is provided with an independent escape passage. Specifically, by additionally providing a frame on a rail, the frame is usually connected to a side of the rail and protrudes outward, and then a floor is laid on the frame to form a passage for evacuating passengers.

The inventors of this application have found through a large quantity of researches and experiments that disadvantages such as high costs, large occupied space, and a hidden danger in stability existing in the straddle-type monorail train provided with an escape passage in the related art are just caused by the structure of the foregoing escape passage. Specific reasons are as follows:

Since the frame and the floor laid on the frame are both additional structures independent of the rail, and a specific location of a rail vehicle in an emergency during travelling is unpredictable, the escape passage of this structure needs to be additionally disposed in the entire length direction of the rail (except a platform). The amount of work is enormous, which greatly increases the costs. Moreover, the frame and the floor are located at the side of the rail, which is equivalent to an extra portion extending in the width direction of the rail, which takes up a lot of space. In addition, the frame and the floor have a certain weight. Regardless of whether the rail vehicle is in an emergency, the frame and the floor are both erected on the rail, that is, even if the rail vehicle is travelling normally, the rail still needs to bear the weight of the frame and the floor, thereby increasing the weight borne by the rail, which has an adverse effect on the stability of the rail.

SUMMARY

An objective of the present disclosure is to resolve at least one of the foregoing technical problems in the related art to some extent.

To achieve the foregoing objective, according to an embodiment of the present disclosure, a rail transport system is provided. The rail transport system includes: a rail, where the rail is provided with an escape passage; and a rail vehicle, where the rail vehicle includes a vehicle body and a plurality of bogies, the plurality of bogies respectively movably straddles the rail, and the vehicle body is connected to the plurality of bogies and pulled by the plurality of bogies to travel along the rail; and the vehicle body includes a plurality of compartments hinged sequentially along a length direction of the rail, the plurality of compartments forms at least one compartment group, the compartment group includes three compartments hinged sequentially, and the bottom of each of only compartments that are located at two ends of the compartment group and that are of the three compartments is connected to the bogie.

The rail transport system according to this embodiment of the present disclosure has advantages such as facilitation of evacuation of passengers in an emergency, low costs, small occupied space, small rail weight bearing, high stability, flexible steering, and low costs.

In addition, the rail transport system according to this embodiment of the present disclosure may further have the following additional technical features:

According to an embodiment of the present disclosure, a number of the compartments is an odd number, and the plurality of compartments is sorted sequentially along the length direction of the rail, where the bottom of only each compartment whose sequence number is an odd number is connected to the bogie.

According to an embodiment of the present disclosure, the plurality of compartments is sorted sequentially along the length direction of the rail, and the bottom of each of remaining compartments other than a compartment whose sequence number is 2 is connected to the bogie.

According to an embodiment of the present disclosure, the plurality of compartments of the vehicle body is all used to form a plurality of compartment groups.

According to an embodiment of the present disclosure, one bogie on the bottom of each compartment whose sequence number is an odd number is located in the middle of the compartment along the length direction of the rail.

According to an embodiment of the present disclosure, neighboring compartments are further flexibly connected.

According to an embodiment of the present disclosure, the neighboring compartments are hinged at a lower portion and flexibly connected at an upper portion.

According to an embodiment of the present disclosure, in the length direction of the rail, a surface that is of a compartment at at least one end of the vehicle body and that faces away from an adjacent compartment is provided with an escape door that can be opened and closed, a first end of the escape door is pivotably mounted onto the corresponding compartment, and a second end of the escape door tilts downward and stretches into the escape passage when the escape door is opened.

According to an embodiment of the present disclosure, an inner surface of the escape door is provided with a slide rail.

According to an embodiment of the present disclosure, in the length direction of the rail, a surface that is of a compartment at at least one end of the vehicle body and that faces away from an adjacent compartment is provided with an escape door that can be opened and closed, an escape port and an escape cover plate are disposed on an inner floor of the compartment at the at least one end of the vehicle body, the escape cover plate collaborates with the escape door and is used to open and close the escape port, the escape cover plate opens the escape port when the escape door is opened, and the escape cover plate closes the escape port when the escape door is closed.

According to an embodiment of the present disclosure, an escape ladder leading to the escape passage is disposed in the escape port.

According to an embodiment of the present disclosure, the vehicle body has a stretching/retraction driving device used to drive stretching/retraction of the escape ladder.

According to an embodiment of the present disclosure, the rail includes: a first rail beam; a second rail beam, where the first rail beam and the second rail beam are spaced apart; and a weight bearing floor, where the weight bearing floor is disposed between the first rail beam and the second rail beam and is connected to the first rail beam and the second rail beam, and the escape passage is defined among the first rail beam, the second rail beam, and the weight bearing floor.

According to an embodiment of the present disclosure, the weight bearing floor includes: a connection beam, where two ends of the connection beam are respectively connected to the first rail beam and the second rail beam; a support frame, where the support frame is mounted onto the connection beam; and a support plate, where the support plate is connected to the support frame and supported by the support frame, and the support plate forms a bottom surface of the escape passage.

According to an embodiment of the present disclosure, the support plate and at least one of the first rail beam and the second rail beam are spaced apart in a horizontal direction.

According to an embodiment of the present disclosure, there is a plurality of connection beams spaced apart along the length direction of the rail, and there is a plurality of support plates sequentially connected along the length direction of the rail.

According to an embodiment of the present disclosure, at least one of an upper end and a lower end of at least one of the first rail beam and the second rail beam is provided with an anti-dropping edge, and the anti-dropping edge extends outward horizontally and is used to prevent the bogie from being disengaged from the rail.

According to an embodiment of the present disclosure, the bogie includes: a bogie frame, where the bogie frame has a straddle recess straddling the rail; a first running wheel and a second running wheel, where the first running wheel and the second running wheel are pivotably mounted onto the bogie frame respectively and are coaxially spaced apart, the first running wheel fits in on an upper surface of the first rail beam, and the second running wheel fits in on an upper surface of the second rail beam; and a driving device, where the driving device is mounted onto the bogie frame and is located between the first running wheel and the second running wheel, and the first running wheel and the second running wheel are driven by the driving device.

According to an embodiment of the present disclosure, the bogie includes: a bogie frame, where the bogie frame has a straddle recess straddling the rail; a first running wheel and a second running wheel, where the first running wheel and the second running wheel are pivotably mounted onto the bogie frame respectively and are coaxially spaced apart, the first running wheel fits in on an upper surface of the first rail beam, and the second running wheel fits in on an upper surface of the second rail beam; a third running wheel and a fourth running wheel, where the third running wheel and the fourth running wheel are pivotably mounted onto the bogie frame respectively and are coaxially spaced apart, the third running wheel fits in on the upper surface of the first rail beam and is spaced apart from the first running wheel in a length direction of the first rail beam, and the fourth running wheel fits in on the upper surface of the second rail beam and is spaced apart from the second running wheel in a length direction of the second rail beam; and a driving device, where the driving device is mounted onto the bogie frame, the driving device is located between the first running wheel and the second running wheel and/or the driving device is located between the third running wheel and the fourth running wheel, and the first running wheel and the second running wheel are driven by the driving device and/or the third running wheel and the fourth running wheel are driven by the driving device.

According to an embodiment of the present disclosure, the first running wheel and the second running wheel are connected by using a first connection shaft and/or the third running wheel and the fourth running wheel are connected by using a second connection shaft; and the driving device is in transmission connection to the first connection shaft and/or the second connection shaft.

According to an embodiment of the present disclosure, the driving device includes a first driving device and a second driving device, where the first driving device is located between the first running wheel and the second running wheel, and the first running wheel and the second running wheel are driven by the first driving device; the second driving device is located between the third running wheel and the fourth running wheel, and the third running wheel and the fourth running wheel are driven by the second driving device; and the first driving device is closer to the first running wheel than the second running wheel, and/or the second driving device is closer to the fourth running wheel than the third running wheel.

According to an embodiment of the present disclosure, the bogie further includes: a first horizontal wheel, where the first horizontal wheel is pivotably mounted onto the bogie frame and fits in on a side surface of the first rail beam; and a second horizontal wheel, where the second horizontal wheel is pivotably mounted onto the bogie frame and fits in on a side surface of the second rail beam.

According to an embodiment of the present disclosure, the first horizontal wheel is connected to a first horizontal safety wheel that moves in synchronization with the first horizontal wheel and whose outer diameter is less than the outer diameter of the first horizontal wheel, and the second horizontal wheel is connected to a second horizontal safety wheel that moves in synchronization with the second horizontal wheel and whose outer diameter is less than the outer diameter of the second horizontal wheel.

According to an embodiment of the present disclosure, the first horizontal wheel fits in on the outer side surface of the first rail beam, and the second horizontal wheel fits in on the outer side surface of the second rail beam.

According to an embodiment of the present disclosure, the first horizontal wheel fits in on the inner side surface of the first rail beam, and the second horizontal wheel fits in on the inner side surface of the second rail beam.

According to an embodiment of the present disclosure, the first horizontal wheel and the second horizontal wheel are located at a same height in the up and down direction.

According to an embodiment of the present disclosure, there is a plurality of first horizontal wheels spaced apart and coaxially disposed along an up and down direction and there is a plurality of second horizontal wheels spaced apart and coaxially disposed along the up and down direction.

According to an embodiment of the present disclosure, there is a plurality of first horizontal wheels spaced apart along an up and down direction and a length direction of the first rail beam respectively, and there is a plurality of second horizontal wheels spaced apart along the up and down direction and a length direction of the second rail beam respectively.

According to an embodiment of the present disclosure, there is a plurality of first horizontal wheels respectively fitting in on the outer side surface and the inner side surface of the first rail beam, and there is a plurality of second horizontal wheels respectively fitting in on the outer side surface and the inner side surface of the second rail beam.

According to an embodiment of the present disclosure, the first horizontal wheel fitting in on the inner side surface of the first rail beam and the second horizontal wheel fitting in on the inner side surface of the second rail beam are located at different heights in the up and down direction.

According to an embodiment of the present disclosure, the bogie further includes: a first collector shoe, where the first collector shoe is disposed on the bogie frame, a first conductive rail is disposed on the outer side surface of the first rail beam, and the first collector shoe is powered by using the first conductive rail; and a second collector shoe, where the second collector shoe is disposed on the bogie frame, a second conductive rail is disposed on the outer side surface of the second rail beam, and the second collector shoe is powered by using the second conductive rail.

According to an embodiment of the present disclosure, the first collector shoe is located above the first horizontal wheel, and the second collector shoe is located above the second horizontal wheel.

According to an embodiment of the present disclosure, the first collector shoe is located below the first horizontal wheel, and the second collector shoe is located below the second horizontal wheel.

According to an embodiment of the present disclosure, the first collector shoe is located below the first horizontal wheel, and the second collector shoe is located above the second horizontal wheel.

According to an embodiment of the present disclosure, there is a plurality of first horizontal wheels spaced apart along the length direction of the first rail beam, and the first collector shoe is located between neighboring first horizontal wheels in the length direction of the first rail beam; and there is a plurality of second horizontal wheels spaced apart along the length direction of the second rail beam, and the second collector shoe is located between neighboring second horizontal wheels in the length direction of the second rail beam.

According to an embodiment of the present disclosure, there is a plurality of first horizontal wheels spaced apart along the length direction of the first rail beam, and the first collector shoe and one of the first horizontal wheels are disposed facing each other in the up and down direction; and there is a plurality of second horizontal wheels spaced apart along the length direction of the second rail beam, and the second collector shoe and one of the second horizontal wheels are disposed facing each other in the up and down direction.

According to an embodiment of the present disclosure, there is a plurality of first horizontal wheels spaced apart along an up and down direction and the first collector shoe is located between neighboring first horizontal wheels in the up and down direction; and there is a plurality of second horizontal wheels spaced apart along the up and down direction and the second collector shoe is located between neighboring second horizontal wheels in the up and down direction.

According to an embodiment of the present disclosure, the rail vehicle is provided with a power battery used to supply power to travelling of the rail vehicle.

According to an embodiment of the present disclosure, the bogie further includes: a first support suspension device and a second support suspension device, where the first support suspension device and the second support suspension device are respectively mounted onto the bogie frame and respectively connected to the vehicle body, and the first support suspension device and the second support suspension device are spaced apart along the length direction of the rail and located on the central axis equally dividing the bogie frame in the width direction of the rail; or the first support suspension device and the second support suspension device are spaced apart along the width direction of the rail and located on the central axis equally dividing the bogie frame in the length direction of the rail.

According to an embodiment of the present disclosure, the bogie further includes: a first support suspension device, a second support suspension device, a third support suspension device, and a fourth support suspension device, where the first support suspension device, the second support suspension device, the third support suspension device, and the fourth support suspension device are respectively mounted onto the bogie frame and respectively connected to the vehicle body, the first support suspension device, the second support suspension device, the third support suspension device, and the fourth support suspension device are respectively located at four corners of a rectangle in the horizontal plane, and the rectangle is symmetrical about the center of the bogie frame.

According to an embodiment of the present disclosure, there are two first horizontal wheels spaced apart along the length direction of the first rail beam, and there are two second horizontal wheels spaced apart along the length direction of the second rail beam; and the central axes of the two first horizontal wheels and the central axes of the two second horizontal wheels are respectively located at four corners of a rectangle in the horizontal plane, and the rectangle is symmetrical about the center of the bogie frame.

According to an embodiment of the present disclosure, there are one first horizontal wheel and one second horizontal wheel respectively, the first horizontal wheel and the second horizontal wheel are spaced apart along the width direction of the rail, and the first horizontal wheel and the second horizontal wheel deviate from the center of the bogie frame to a travelling direction of the rail vehicle in the length direction of the rail.

According to an embodiment of the present disclosure, the outer diameter of the first running wheel and the outer diameter of the second running wheel are the same and are 900 to 1100 millimeters.

According to an embodiment of the present disclosure, the outer diameter of the first running wheel, the outer diameter of the second running wheel, the outer diameter of the third running wheel, and the outer diameter of the fourth running wheel are the same and are 900 to 1100 millimeters.

Figure 1:
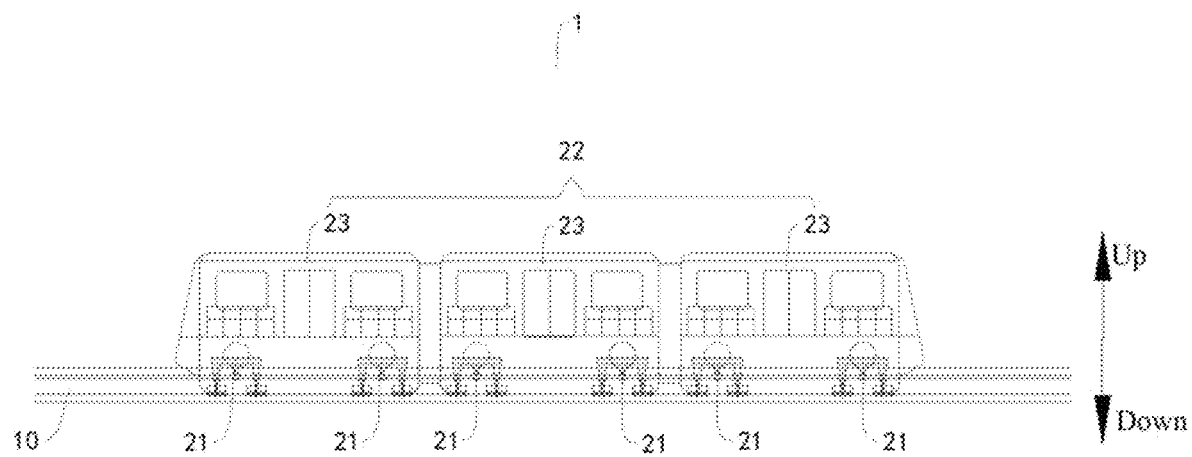
FIG. 1 is a schematic structural diagram of a rail transport system according to an embodiment of the present disclosure.
Figure 2:
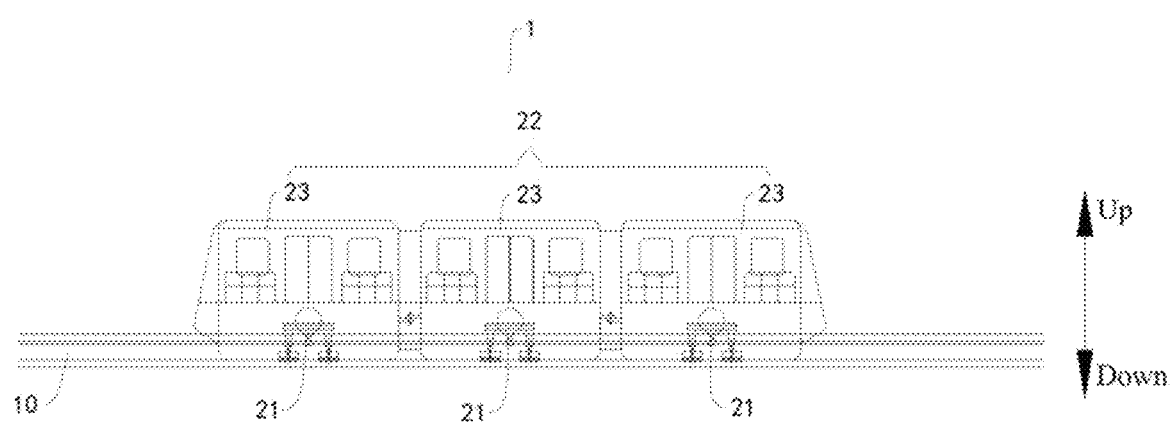
FIG. 2 is a schematic structural diagram of a rail transport system according to another embodiment of the present disclosure.
Figure 3:
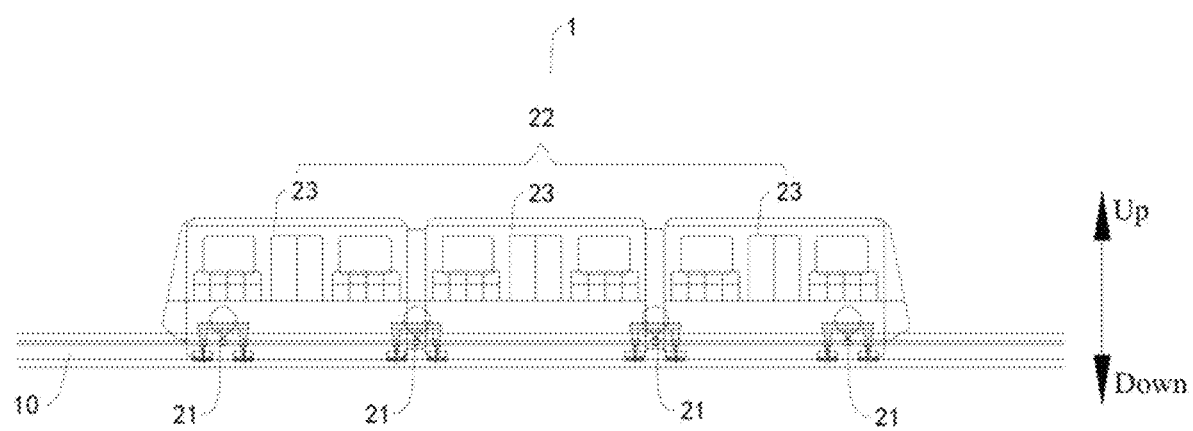
FIG. 3 is a schematic structural diagram of a rail transport system according to another embodiment of the present disclosure.

Reference numerals in the drawings: rail transport system 1; rail 10, escape passage 11, first rail beam 12, second rail beam 13, weight bearing floor 14, connection beam 15, support frame 16, support plate 17, anti-dropping edge 18, steering portion 111, travelling portion 112, bottom plate 113, first side plate 114, second side plate 115; rail vehicle 20, bogie 21, vehicle body 22, compartment 23, escape door 24, escape port 25, escape cover plate 26, escape ladder 27, power battery 28, first end 31 of the escape door 24, second end 32 of the escape door 24; bogie frame 100, second recess 110, first dodge groove 120, second dodge groove 130, running wheel mounting groove 140, first horizontal wheel mounting limb 150, second horizontal wheel mounting limb 160; first running wheel 210, second running wheel 220, third running wheel 230, fourth running wheel 240, first connection shaft 250, second connection shaft 260, running wheel 270; driving device 300, first driving device 310, second driving device 320; first horizontal wheel 710, second horizontal wheel 720, first horizontal safety wheel 711, second horizontal safety wheel 721; first collector shoe 810, second collector shoe 820, first conductive rail 830, second conductive rail 840; first support suspension device 910, second support suspension device 920, third support suspension device 930, and fourth support suspension device 940.

DETAILED DESCRIPTION

The following describes embodiments of the disclosure in detail. Examples of the embodiments are shown in the accompanying drawings. The same or similar elements and the elements having same or similar functions are denoted by like reference numerals throughout the descriptions. The embodiments described below with reference to the accompanying drawings are exemplary, aim to explain the disclosure, but cannot be understood as a limitation on the disclosure.

The present disclosure provides a rail transport system 1 has advantages such as facilitation of evacuation of passengers in an emergency, low costs, small occupied space, small rail weight bearing, and high stability.

The rail transport system 1 according to an embodiment of the present disclosure is described below with reference to accompanying drawings.

Figure 100:
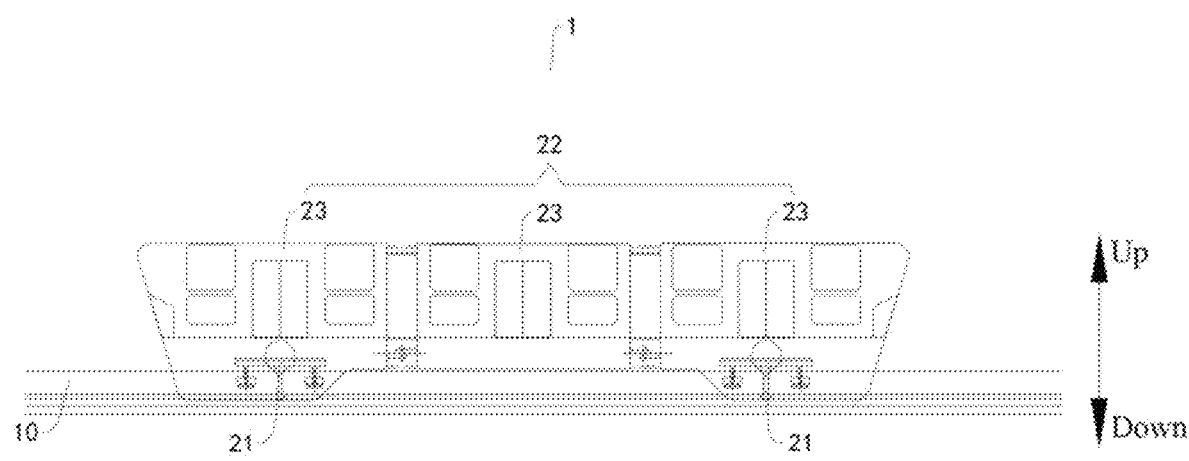
FIG. 100 is a schematic structural diagram of a rail transport system according to another embodiment of the present disclosure.

As shown in FIG. 1 to FIG. 100, the rail transport system 1 according to this embodiment of the present disclosure includes a rail 10 and a rail vehicle 20.

A first recess as an escape passage 11 is constructed on the rail 10. The rail vehicle 20 includes bogies 21 and a vehicle body 22, the bogie 21 has a second recess 110 suitable for straddling the rail, the bogie 21 movably straddles the rail 10, and the vehicle body 22 is connected to the bogie 21 and pulled by the bogie 21 to travel along the rail 10. The second recess 110 is a straddle recess. Specifically, in a left and right direction, a minimum distance between two ends of the second recess 110 is greater than or equal to a minimum width of the rail.

As shown in FIG. 100, the vehicle body 22 includes a plurality of compartments 23 hinged sequentially along a length direction of the rail 10, the plurality of compartments 23 forms at least one compartment group, the compartment group includes three compartments 23 hinged sequentially, and the bottom of each of only compartments 23 that are located at two ends of the compartment group and that are of the three compartments 23 is connected to one bogie 21. For example, the compartment group includes a first compartment, a second compartment, and a third compartment that are hinged sequentially, where the bottom of each of the first compartment and the third compartment is connected to one bogie 21, and the bottom of the second compartment is provided with no bogie 21.

Optionally, a number of the compartments 23 is an odd number (for example, 3, 5, or 7). It may be understood herein that, the vehicle body 22 includes the plurality of compartments 23, and therefore the number of compartments 23 does not include 1. The plurality of compartments 23 is sorted sequentially along the length direction of the rail 10. For example, from the vehicle head to the vehicle tail, sequence numbers of the plurality of compartments 23 are sequentially 1, 2, 3, 4, 5, and the like, where for compartments 23 whose sequence numbers are odd numbers (for example, compartments 23 whose sequence numbers are 1, 3, 5, and the like), the bottom of each compartment 23 is connected to a bogie 21; and for compartments 23 whose sequence numbers are even numbers (for example, compartments 23 whose sequence numbers are 2, 4, and the like), the bottom of each compartment 23 is provided with no bogie 21.

Alternatively, the number of compartments 23 is an odd number or an even number. Among the plurality of compartments 23, the bottom of each of remaining compartments 23 other than a compartment 23 whose sequence number is 2 (for example, compartments whose sequence numbers are 1, 3, 4, 5, and the like) is connected to a bogie 21, and the bottom of only the compartment 23 whose sequence number is 2 is provided with no bogie 21.

Alternatively, the number of compartments 23 is a multiple of 3 and is greater than or equal to 6. Specifically, the number of compartments 23 is an even number greater than or equal to 6, and the plurality of compartments 23 of the vehicle body 22 are all used to form a plurality of compartment groups. In other words, the vehicle body 22 is formed by the plurality of compartment groups, and does not include a compartment 23 independent of the compartment groups, and neighboring compartment groups are hinged directly and are not spaced apart by an additional compartment 23. For example, the bottom of each of compartments 23 whose sequence numbers are 1, 3, 4, 6, 7, 9, and the like is connected to a bogie 21, and the bottom of none of compartments 23 whose sequence numbers 2, 5, 8, and the like is provided with a bogie 21.

It may be understood that, the bottom of a single compartment 23 may be provided with one or more bogies 21.

It can be understood that, that the rail 10 is provided with the escape passage 11 means that, the escape passage 11 is disposed on the rail 10 but not disposed on another additional component on the rail 10. To be specific, compared with the structure of the escape passage in the related art, in the rail transport system 1 according to this embodiment of the present disclosure, the rail 10 does not need to be provided with other components such as a frame and a floor, and the escape passage 11 is formed on the rail 10.

In the rail transport system 1 according to this embodiment of the present disclosure, the escape passage 11 is disposed on the rail 10, and when an emergency occurs, passengers can be evacuated in time by using the escape passage 11. Moreover, because the escape passage 11 is disposed on the rail 10 itself, no other additional structure needs to be added to the rail 10, and only the escape passage 11 needs to be disposed on the rail 10 itself along the length direction of the rail 10. Therefore, the amount of work of the rail transport system 1 may be greatly reduced. On one hand, costs are reduced, and on the other hand, occupied space is reduced. Moreover, the weight borne by the rail 10 does not need to be increased, which is favorable to stability of the rail 10. Therefore, the rail transport system 1 according to this embodiment of the present disclosure has advantages such as facilitation of evacuation of passengers in an emergency, low costs, small occupied space, small rail weight bearing, and high stability.

Moreover, the vehicle body 22 includes at least one compartment group. For three compartments 23 of one compartment group, only compartments 23 at two ends of the compartment group are provided with bogies 21, and an intermediate compartment 23 of compartment group is provided with no bogie 21. In other words, in the entire vehicle body 22, the bottom of at least one compartment 23 is provided with no bogie 21, and such a bogie arrangement manner can reduce a number of the bogies 21, thereby reducing the total weight of the rail vehicle 20, and reducing the costs and the height of the rail vehicle 20, and can reduce the bend radius, thereby improving a topographical adaptation capability of the rail vehicle 20. Moreover, based on this, the bottom of each of compartments 23 on two sides of and adjacent to a compartment 23 provided with no bogie 21 is provided with a bogie 21, thereby ensuring balance and stability of the vehicle body 22.

The rail transport system 1 according to a specific embodiment of the present disclosure is described below with reference to accompanying drawings.

As shown in FIG. 1 to FIG. 100, the rail transport system 1 according to this embodiment of the present disclosure includes a rail 10 and a rail vehicle 20.

In an embodiment of the present disclosure, as shown in FIG. 100, one bogie 21 on the bottom of each compartment 23 whose sequence number is an odd number is located in the middle of the compartment 23 along a length direction of the rail 10. Therefore, the compartment 23 can be uniformly supported, so that a vehicle body 22 is more steady.

Further, neighboring compartments 23 are further flexibly connected. For example, two neighboring compartments 23 are hinged at a lower portion of opposite end surfaces of the two compartments 23 and flexibly connected at an upper portion of the opposite end surfaces of the two compartments 23. In this way, the connection strength between the compartments 23 can be improved, thereby improving the entire structural strength of the vehicle body 22, and stress concentration can be avoided, to prevent the neighboring compartments 23 from being separated from each other.

In some embodiments of the present disclosure, as shown in FIG. 1 to FIG. 5, a vehicle body 22 includes a plurality of compartments 23 hinged sequentially along a length direction of a rail 10, and in the length direction of the rail 10, a surface that is of a compartment 23 at at least one end of the vehicle body 22 and that faces away from an adjacent compartment 23 is provided with an escape door 24 that can be opened and closed. That is, each end of the vehicle body 22 has a compartment 23, the compartment 23 of at least one end of the vehicle body 22 has an escape door 24 on the compartment's surface facing away from an adjacent compartment 23, and the escape door 24 can be opened and closed. In other words, the escape door 24 is disposed on an end surface of at least one of two compartments 23 located at two ends of the vehicle body 22. To be specific, the escape door 24 is disposed on the compartment 23 at the at least one end of the vehicle body 22 in the length direction of the rail 10. Specifically, the escape door 24 is disposed on a first end surface of the compartment 23 at the at least one end, and the first end surface is a surface away from the adjacent compartment. The escape door 24 has a first end 31 and a second end 32, and the first end 31 of the escape door 24 is pivotably mounted onto the corresponding compartment 23. When opened, the escape door 24 is slant relative to a horizontal plane, and the second end 32 of the escape door 24 tilts downward and stretches into an escape passage 11. In this way, when an emergency occurs, a vehicle 20 is actively or passively parked, the escape door 24 is opened, and a lower end stretches into the escape passage 11. Passengers in the compartment 23 can slide downward to the escape passage 11 through the escape door 24, and then be evacuated from the escape passage 11.

Specifically, the first end 31 of the escape door 24 is disposed adjacent to the vehicle bottom, and the second end 32 of the escape door 24 is disposed adjacent to the vehicle top when the escape door 24 is closed. In other words, when the escape door 24 is closed, the second end 32 of the escape door 24 is located above the first end 31 of the escape door 24; and when the escape door 24 is opened, the second end 32 of the escape door 24 is located below the first end 31 of the escape door 24. Therefore, the escape door 24 is converted from a closed state to an opened state through downward flipping. A flipping-type structure is used for the escape door 24, and a passenger in the vehicle can quickly open the escape door 24 in need of only a simple operation, to effectively improve escape efficiency.

Further, an inner surface of the escape door 24 is provided with a slide rail to help a passenger slide on the slide rail to the escape passage 11. It may be understood herein that, the inner surface of the escape door 24 is a surface facing the inside of the vehicle when the escape door 24 is closed.

Figure 67:
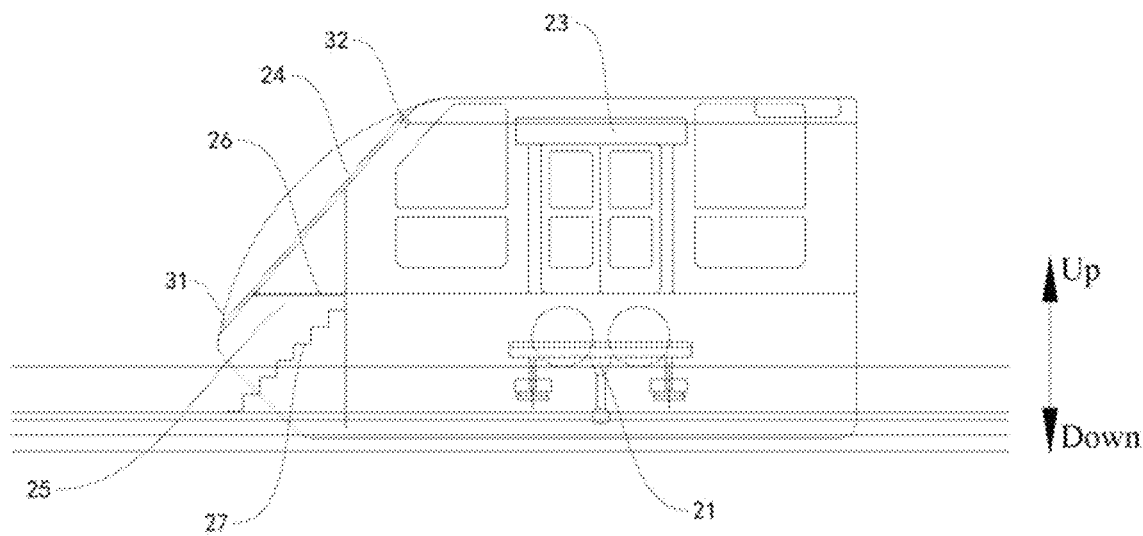
FIG. 67 is a partial schematic structural diagram of a rail transport system according to another embodiment of the present disclosure, where an escape door is in a closed state.
Figure 68:
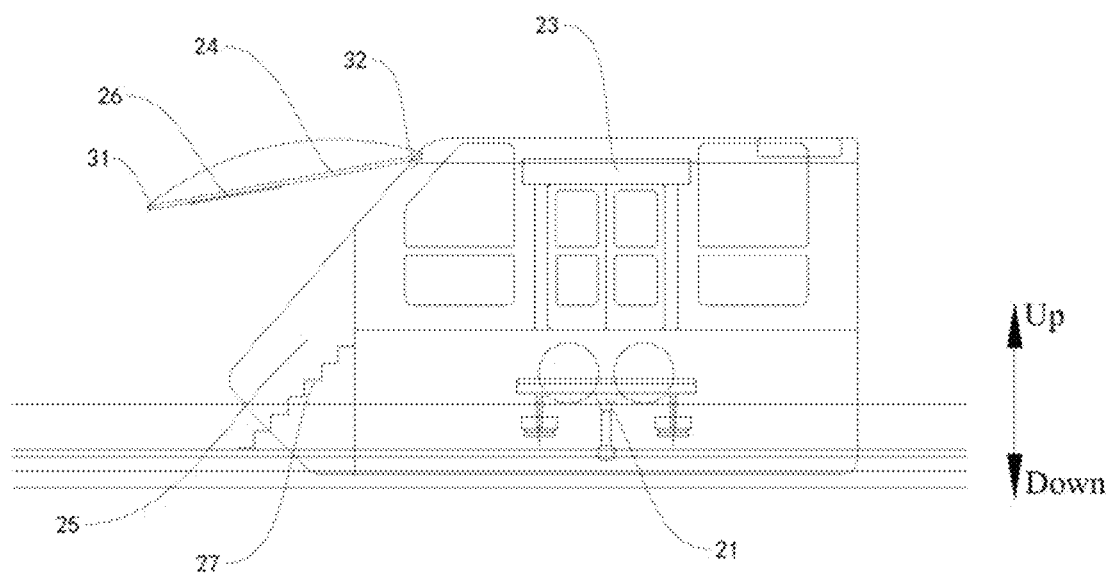
FIG. 68 is a partial schematic structural diagram of a rail transport system according to another embodiment of the present disclosure, where an escape door is in an opened state.

In some other embodiments of the present disclosure, as shown in FIG. 67 and FIG. 68, a vehicle body 22 includes a plurality of compartments 23 hinged sequentially along a length direction of a rail 10, and in the length direction of the rail 10, a surface that is of a compartment 23 at at least one end of the vehicle body 22 and that faces away from an adjacent compartment 23 is provided with an escape door 24 that can be opened and closed. Moreover, an escape port 25 and an escape cover plate 26 are disposed on an inner floor of the compartment 23 at the at least one end of the vehicle body 22, that is, the escape port 25 and the escape cover plate 26 are disposed on the inner floor of the compartment 23 provided with the escape door 24. The escape cover plate 26 collaborates with the escape door 24 and is used to open and close the escape port 25. When a rail vehicle 20 is normally running, the escape door 24 is closed and the escape cover plate 26 closes the escape port 25 (as shown in FIG. 67). When an emergency occurs, the rail vehicle 20 is actively or passively parked, the escape door 24 is opened and the escape cover plate 26 opens the escape port 25 (as shown in FIG. 68), and passengers in the compartment 23 can enter the escape passage 11 through the escape port 25, and then be evacuated from the escape passage 11. Moreover, even if the rail vehicle 20 is forcedly parked at a bend of the rail 10, because the escape door 24, when opened, does not need to fit in with the rail 10, the escape door 24 does not collide with the rail 10, to facilitate evacuation of the passengers at the bend of the rail 10.

Further, in the length direction of the rail 10, each of two end surfaces of two compartments 23 located at two ends of the vehicle body 22 is provided with an escape door 24, and the end surface is a surface of a current compartment away from an adjacent compartment. In an emergency, the escape doors 24 are simultaneously opened at the two ends of the vehicle body 22, and a wide air convection passage can be formed, so that toxic gases such as smog in the vehicle body 22 can be quickly dissipated. Moreover, a flipping-type structure is used for the escape door 24, and the passenger in the vehicle can quickly open the escape door 24 in need of only a simple operation, to effectively improve escape efficiency.

Specifically, The escape door 24 has a first end 31 and a second end 32, and the second end 32 of the escape door 24 is pivotably mounted onto the corresponding compartment 23, where the second end 32 of the escape door 24 is disposed adjacent to the vehicle top, and the first end 31 of the escape door 24 is disposed adjacent to the vehicle bottom when the escape door 24 is closed. In other words, when the escape door 24 is closed, the first end 31 of the escape door 24 is located below the second end 32 of the escape door 24; and when the escape door 24 is opened, the first end 31 of the escape door 24 may be located below the second end 32 of the escape door 24, or may be located above the second end 32 of the escape door 24. Therefore, the escape door 24 is converted from a closed state to an opened state through upward flipping. A flipping-type structure is used for the escape door 24, and the passenger in the vehicle can quickly open the escape door 24 in need of only a simple operation, to effectively improve escape efficiency, and facilitate collaboration between the escape door 24 and the escape cover plate 26.

Optionally, collaboration between the escape cover plate 26 and the escape door 24, may be dominated by the escape door 24, or may be dominated by the escape cover plate 26. Specifically, when passengers need to be evacuated, the escape door 24 may be actively opened, and the escape door 24 drives the escape cover plate 26 to open the escape port 25; or the escape cover plate 26 may be actively opened, and the escape cover plate 26 drives the escape door 24 to be opened. Further, the foregoing collaboration is dominated by the escape cover plate 26, that is, the escape cover plate 26 is opened to drive the escape door 24 to be opened. In this way, when the escape cover plate 26 is opened, an article or a passenger above the escape cover plate 26 can be prevented from falling.

Further, as shown in FIG. 67 and FIG. 68, an escape ladder 27 leading to the escape passage 11 is disposed in the escape port 25, and after the escape port 25 is opened, a passenger in the vehicle may be transferred to the escape passage 11 through the escape ladder 27.

Optionally, the escape ladder 27 may be in a fixed state and is always suspending in the escape port 25, and a lower end of the escape ladder 27 and an inner bottom surface of the escape passage 11 are spaced apart, so as to avoid affecting travelling of the rail vehicle 20.

The escape ladder 27 may alternatively have two states, namely, a retraction state and a stretching state, and the vehicle body further includes a stretching/retraction driving device used to drive stretching/retraction of the escape ladder 27. After the escape port 25 is opened, the escape ladder 27 may be manually controlled to stretch into the escape passage 11, or the escape ladder 27 may automatically stretch into the escape passage 11 through collaboration. In this embodiment, after stretching, the escape ladder 27 may be directly placed on the inner bottom surface of the escape passage 11, or the escape ladder 27 and the inner bottom surface of the escape passage 11 may be spaced apart.

Further, the escape cover plate 26 may be pivotably mounted onto the escape door 24. After the escape door 24 is flipped upward and is opened, the escape cover plate 26 rotates collaboratively to be laminated onto the inner surface of the escape door 24, thereby saving space, and preventing the escape cover plate 26 from affecting evacuation of passengers.

Figure 6:
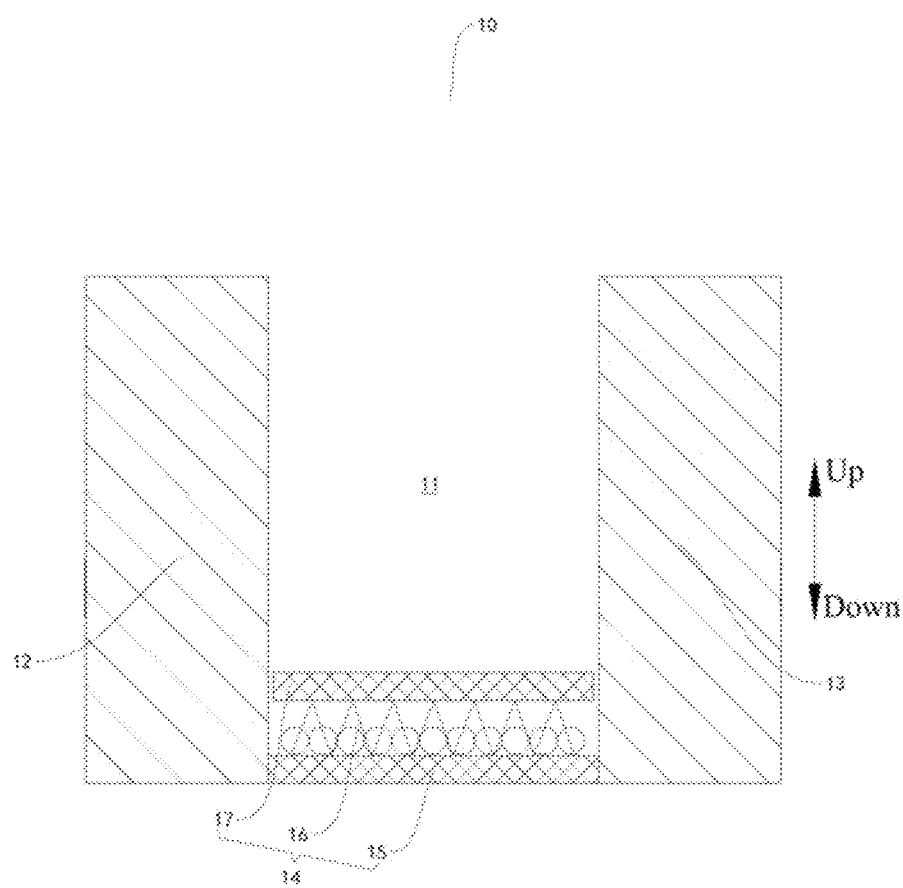
FIG. 6 is a schematic structural diagram of a rail of a rail transport system according to an embodiment of the present disclosure.

In some specific examples of the present disclosure, as shown in FIG. 6, a rail 10 includes a first rail beam 12, a second rail beam 13, and a weight bearing floor 14.

The first rail beam 12 and the second rail beam 13 are disposed in parallel and at an interval, and a bogie 21 straddles the first rail beam 12 and the second rail beam 13. The weight bearing floor 14 is disposed between the first rail beam 12 and the second rail beam 13, the weight bearing floor 14 is connected to the first rail beam 12 and the second rail beam 13, and an escape passage 11 is defined among the first rail beam 12, the second rail beam 13, and the weight bearing floor 14. Therefore, the rail 10 may be provided with the escape passage 11 by using the structure of the rail 10, and no additional component needs to be disposed. Therefore, costs are low, occupied space is small, and it is favorable to reduction in the weight borne by the rail 10. Moreover, the dimension of the rail beam is relatively small, the occupied space area is small, the weight is relatively light, the energy efficiency is high, and the economic performance is good.

Specifically, as shown in FIG. 6, the weight bearing floor 14 includes a connection beam 15, a support frame 16, and a support plate 17. The connection beam 15 extends along an interval direction of the first rail beam 12 and the second rail beam 13, and two ends of the connection beam 15 are respectively connected to a lower portion of the first rail beam 12 and a lower portion of the second rail beam 13. The support frame 16 is mounted onto the connection beam 15. The support plate 17 is connected to the support frame 16 and supported by the support frame 16, and the support plate 17 forms a bottom surface of the escape passage 11. The rail 10 usually needs to be erected overhead by using piers, and there is a predetermined distance between the piers. Therefore, by using the structure of the foregoing weight bearing floor 14, the escape passage 11 extending along the length direction of the rail 10 may be formed between the piers, material consumption is small, and costs are low.

Further, as shown in FIG. 6, the support plate 17 and at least one of the first rail beam 12 and the second rail beam 13 are spaced apart in a horizontal direction. In other words, the support plate 17 and the first rail beam 12 are spaced apart in the horizontal direction, or the support plate 17 and the second rail beam 13 are spaced apart in the horizontal direction, or the support plate 17 and each of the first rail beam 12 and the second rail beam 13 are spaced apart in the horizontal direction. In this way, it may be convenient to insert a tool into a gap between the support frame 16 and a rail beam, thereby levering the support plate 17 to facilitate repair.

Optionally, there is a plurality of connection beams 15 that is spaced apart along the length direction of the rail 10, and there is a plurality of support plates 17 that is sequentially connected along the length direction of the rail 10. On one hand, a single connection beam 15 and a single support plate 17 better facilitate machining, and on the other hand, facilitate entire construction of the rail 10.

A person skilled in the art needs to understand that, sequential connection between the plurality of support plates 17 includes direct connection or indirect connection, and is further direct connection. When the plurality of support plates 17 is indirectly connected, a gap between neighboring support plates 17 needs to ensure that passengers can smoothly stride, that is, does not affect evacuation of the passengers.

Further, the rail 10 further includes an anti-dropping edge 18. Specifically, the anti-dropping edge 18 is disposed at at least one of an upper end and a lower end of at least one of the first rail beam 12 and the second rail beam 13, and the anti-dropping edge 18 extends outward along the horizontal direction and is used to prevent the bogie 21 from being disengaged from the rail 10. Specifically, the anti-dropping edge 18 may be disposed on the top and/or the bottom of the first rail beam 12, and may be disposed on an outer side surface and/or an inner side surface of the first rail beam 12;

or the anti-dropping edge 18 may be disposed on the top and/or the bottom of the second rail beam 13, and may be disposed on an outer side surface and/or an inner side surface of the second rail beam 13. Herein, a person skilled in the art needs to understand that, the anti-dropping edge 18 is disposed to prevent the bogie 21 from being disengaged from the rail 10, thereby ensuring stability of the rail vehicle 20 in a travelling situation such as bending, and therefore, a partial structure of the bogie 21 needs to be placed right below the anti-dropping edge 18 on the top and/or right above the anti-dropping edge 18 on the bottom.

Figure 8:
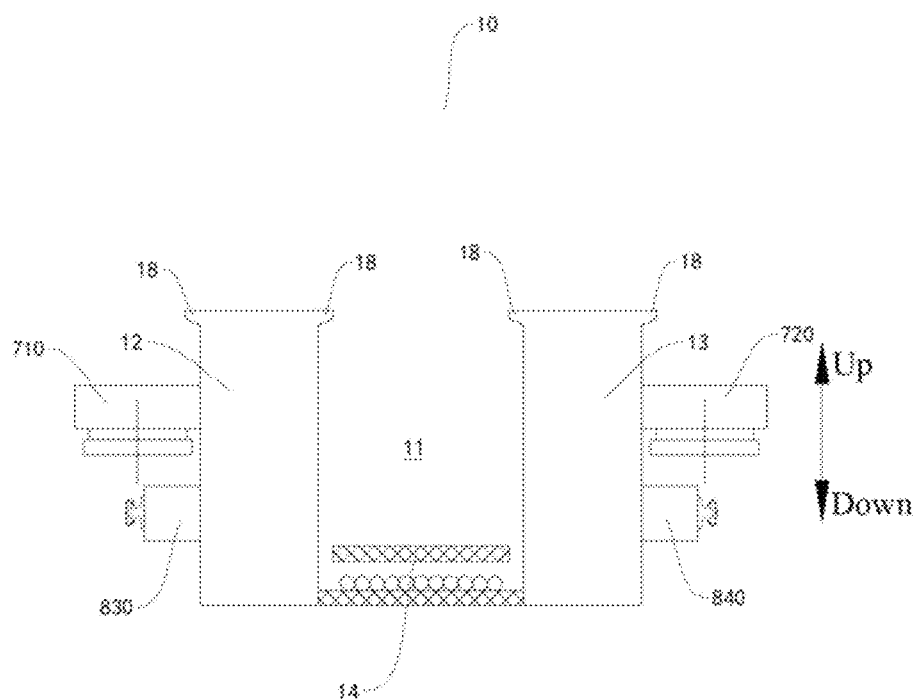
FIG. 8 is a schematic structural diagram of a rail of a rail transport system according to another embodiment of the present disclosure.

For example, as shown in FIG. 8, the first rail beam 12 and the second rail beam 13 are formed by bonding reinforcing steel bars and concrete. Each of the inner side surface and the outer side surface of the top of the first rail beam 12 is provided with an anti-dropping edge 18, and each of the inner side surface and the outer side surface of the top of the second rail beam 13 is provided with an anti-dropping edge 18. A first horizontal wheel 710 of the bogie 21 fits in on the outer side surface of the first rail beam 12 and is located below the anti-dropping edge 18 on the outer side surface of the top of the first rail beam 12, and a second horizontal wheel 720 of the bogie 21 fits in on the outer side surface of the second rail beam 13 and is located below the anti-dropping edge 18 on the outer side surface of the top of the second rail beam 13. In this way, the anti-dropping edges 18 may stop the horizontal wheels from moving upward, thereby playing an anti-dropping role.

Figure 9:
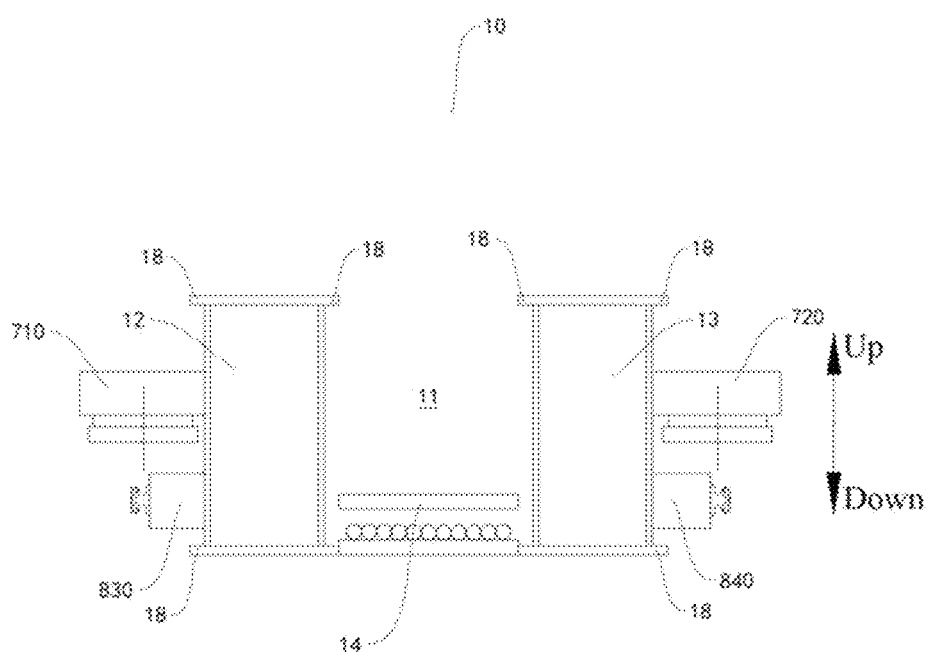
FIG. 9 is a schematic structural diagram of a rail of a rail transport system according to another embodiment of the present disclosure.

As shown in FIG. 9, the first rail beam 12 and the second rail beam 13 are formed by splicing steel plates. Each of the inner side surface and the outer side surface of the top of the first rail beam 12 is provided with an anti-dropping edge 18, each of the inner side surface and the outer side surface of the bottom of the first rail beam 12 is provided with an anti-dropping edge 18, each of the inner side surface and the outer side surface of the top of the second rail beam 13 is provided with an anti-dropping edge 18, and each of the inner side surface and the outer side surface of the bottom of the second rail beam 13 is provided with an anti-dropping edge 18. A first horizontal wheel 710 of the bogie 21 fits in on the outer side surface of the first rail beam 12 and is located between the anti-dropping edge 18 on the outer side surface of the top of the first rail beam 12 and the anti-dropping edge 18 on the outer side surface of the bottom, and a second horizontal wheel 720 of the bogie 21 fits in on the outer side surface of the second rail beam 13 and is located between the anti-dropping edge 18 on the outer side surface of the top of the second rail beam 13 and the anti-dropping edge 18 on the outer side surface of the bottom. In this way, the anti-dropping edges 18 may stop the horizontal wheels from moving upward and downward to prevent the first horizontal wheel 710 from being separated from the first rail beam 12 or prevent the second horizontal wheel 720 from being separated from the second rail beam 13, thereby playing an anti-dropping role.

Figure 10:
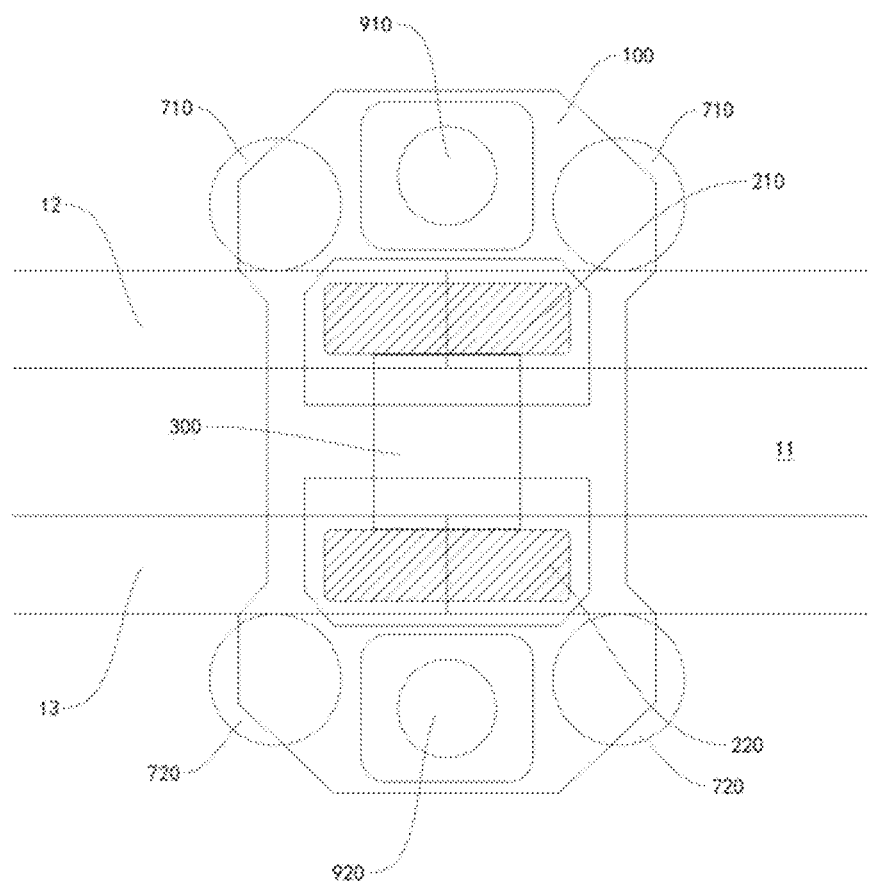
FIG. 10 is a schematic structural diagram of a bogie of a rail vehicle according to an embodiment of the present disclosure.

In some embodiments of the present disclosure, as shown in FIG. 10, the bogie 21 includes a bogie frame 100, a first running wheel 210, a second running wheel 220, and a driving device 300.

The bogie frame 100 has a second recess 110 suitable for straddling the rail 10, that is, the second recess 110 is disposed in the bogie frame 100. Specifically, the second recess 110 is formed by a hollow portion jointly defined by the bottom of the bogie frame 100, a first horizontal wheel 710, and a second horizontal wheel 720, and the innermost sides of the first horizontal wheel 710 and the second horizontal wheel 720 is in contact with the outer side of the rail 10. The first running wheel 210 and the second running wheel 220 are pivotably mounted onto the bogie frame 100 respectively and are coaxially spaced apart. The first running wheel 210 fits in on an upper surface of the first rail beam 12, and the second running wheel 220 fits in on an upper surface of the second rail beam 13. The driving device 300 is mounted onto the bogie frame 100, and the driving device 300 is located between the first running wheel 210 and the second running wheel 220. The first running wheel 210 and the second running wheel 220 are driven by the driving device 300, and under driving of the driving device 300, the first running wheel 210 and the second running wheel 220 drives the bogie 21 to run along the rail 10, thereby pulling the vehicle body 22 to travel. Therefore, the driving device 300 may be mounted by using the gap between the first running wheel 210 and the second running wheel 220, so as to save space, improve space utilization, and facilitate distribution of the center of gravity of the vehicle body 22, and moreover a center distance of a tyre may be increased, to improve uniform stability of driving of the driving device 300 for the first running wheel 210 and the second running wheel 220, thereby improving stability and comfort of the rail transport system 1.

In some other embodiments of the present disclosure, as shown in FIG. 46 to FIG. 49, the bogie 21 includes a bogie frame 100, a first running wheel 210, a second running wheel 220, a third running wheel 230, a fourth running wheel 240, and at least one driving device.

The bogie frame 100 has a second recess 110 suitable for straddling the rail 10, that is, the second recess 110 is disposed in the bogie frame 100. The first running wheel 210 and the second running wheel 220 are pivotably mounted onto the bogie frame 100 respectively and are coaxially spaced apart. The first running wheel 210 fits in on an upper surface of the first rail beam 12, and the second running wheel 220 fits in on an upper surface of the second rail beam 13. The third running wheel 230 and the fourth running wheel 240 are pivotably mounted onto the bogie frame 100 respectively and are coaxially spaced apart. The third running wheel 230 fits in on the upper surface of the first rail beam 12 and is spaced apart from the first running wheel 210 in a length direction of the first rail beam 12, and the fourth running wheel 240 fits in on the upper surface of the second rail beam 13 and is spaced apart from the second running wheel 220 in a length direction of the second rail beam 13. The at least one driving device is mounted onto the bogie frame 100, one of the at least one driving device is located between the first running wheel 210 and the second running wheel 220 and/or one of the at least one driving device is located between the third running wheel 230 and the fourth running wheel 240, and the first running wheel 210 and the second running wheel 220 are driven by one driving device and/or the third running wheel 230 and the fourth running wheel 240 are driven by another driving device. In this way, a requirement of bearing a relatively large weight can be satisfied, and the four running wheels can bear a larger weight, which is a favorable improvement in each of the number of passengers in the rail vehicle 20 and the dimension of the vehicle body. Moreover, space use efficiency of the bogie 21 can be effectively improved, thereby reducing the occupied space area of the entire vehicle.

Figure 46:
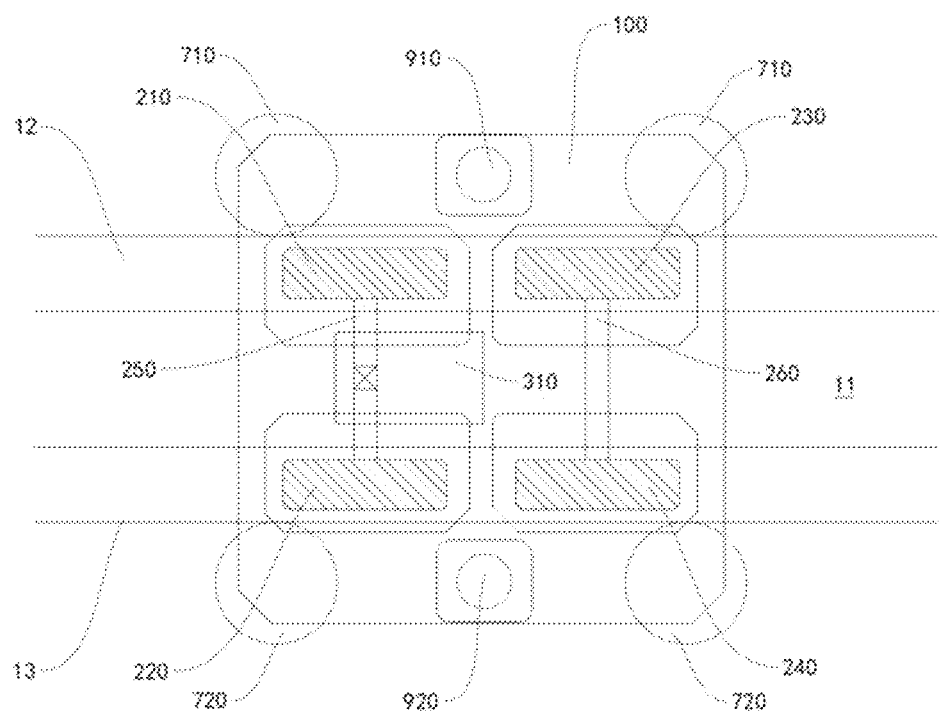
FIG. 46 is a schematic structural diagram of a bogie of a rail vehicle according to another embodiment of the present disclosure.

For example, as shown in FIG. 46, the at least one driving device may include a first driving device 310, the first driving device 310 is disposed between the first running wheel 210 and the second running wheel 220, and the first running wheel 210 and the second running wheel 220 are driven by the first driving device 310.

Figure 47:
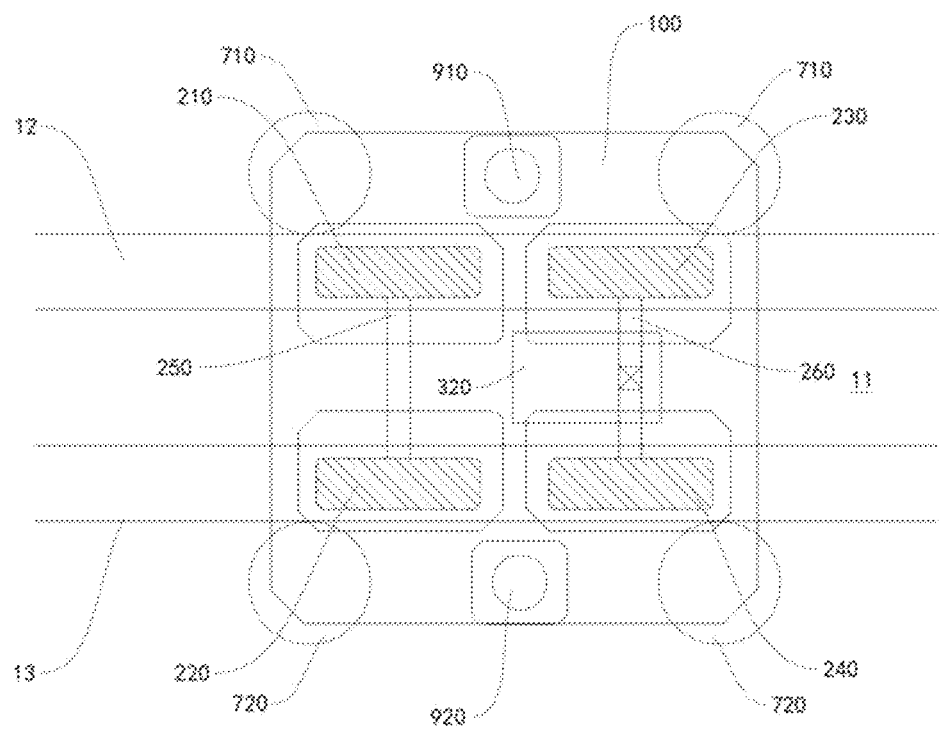
FIG. 47 is a schematic structural diagram of a bogie of a rail vehicle according to another embodiment of the present disclosure.

As shown in FIG. 47, the at least one driving device may include a second driving device 320, the second driving device 320 is disposed between the third running wheel 230 and the fourth running wheel 240, and the third running wheel 230 and the fourth running wheel 240 are driven by the second driving device 320.

Figure 48:
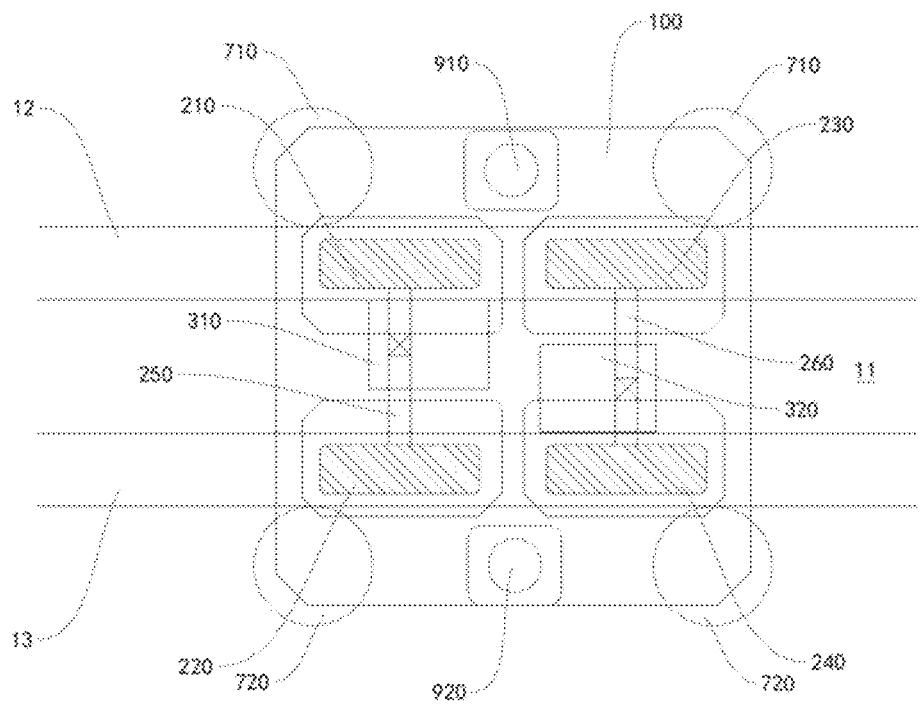
FIG. 48 is a schematic structural diagram of a bogie of a rail vehicle according to another embodiment of the present disclosure.

As shown in FIG. 48, the at least one driving device may include two driving devices defined as a first driving device 310 and a second driving device 320 respectively. The first driving device 310 is disposed between the first running wheel 210 and the second running wheel 220, and the first running wheel 210 and the second running wheel 220 are driven by the first driving device 310. The second driving device 320 is disposed between the third running wheel 230 and the fourth running wheel 240, and the third running wheel 230 and the fourth running wheel 240 are driven by the second driving device 320. The first driving device 310 is closer to the first running wheel 210 than the second running wheel 220, and/or the second driving device 320 is closer to the fourth running wheel 240 than the third running wheel 230. Further, the first driving device 310 is closer to the first running wheel 210 than the second running wheel 220, and the second driving device 320 is closer to the fourth running wheel 240 than the third running wheel 230. To be specific, the first driving device 310 and the second driving device 320 are diagonally disposed. Therefore, the bogie 21 is balanced in a width direction of the rail 10, and a differential may be saved, thereby reducing costs.

Optionally, the first running wheel 210 and the second running wheel 220 are connected by using a first connection shaft 250 and/or the third running wheel 230 and the fourth running wheel 240 are connected by using a second connection shaft 260. The at least one driving device is in transmission connection to the first connection shaft 250 and/or the second connection shaft 260.

Figure 49:
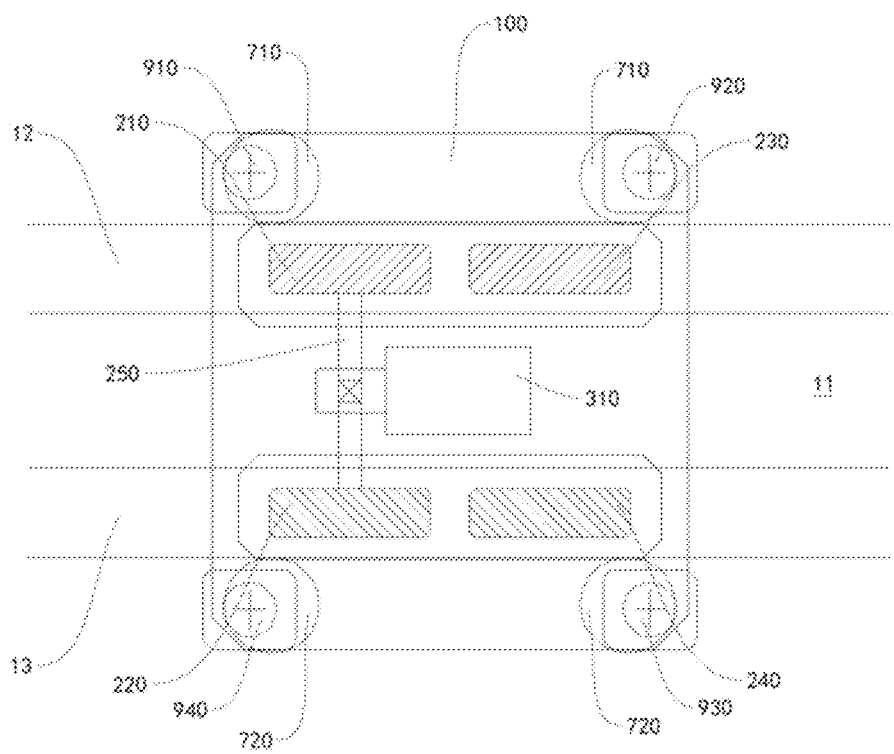
FIG. 49 is a schematic structural diagram of a bogie of a rail vehicle according to another embodiment of the present disclosure.

For example, as shown in FIG. 49, the first running wheel 210 and the second running wheel 220 are connected by using a first connection shaft 250, the third running wheel 230 and the fourth running wheel 240 are connected without a connection shaft and are follower wheels, the at least one driving device includes a first driving device 310, and the first driving device 310 is in transmission connection to the first connection shaft 250.

In other words, FIG. 10 shows the bogie 21 having two running wheels, FIG. 46 to FIG. 49 show the bogie 21 having four running wheels, and the bogie 21 having four running wheels may have a single connection shaft, or may have two connection shafts. The structure of two connection shafts may be used, and stability performance and safety performance of the system can be greatly improved.

In some embodiments of the present disclosure, the bogie 21 further includes a first horizontal wheel 710 and a second horizontal wheel 720, where there may be one or more first horizontal wheels 710 and one or more second horizontal wheels 720 respectively.

The first horizontal wheel 710 is pivotably mounted onto the bogie frame 100 and fits in on a side surface of the first rail beam 12. The second horizontal wheel 720 is pivotably mounted onto the bogie frame 100 and fits in on a side surface of the second rail beam 13. On one hand, when the rail 10 is steered, the first horizontal wheel 710 and the second horizontal wheel 720 fit in on a side surface of the rail 10, thereby being passively steered along the rail 10, and then driving the rail vehicle 20 to be steered. On the other hand, stability of the rail vehicle 20 during travelling may be improved.

Figure 4:
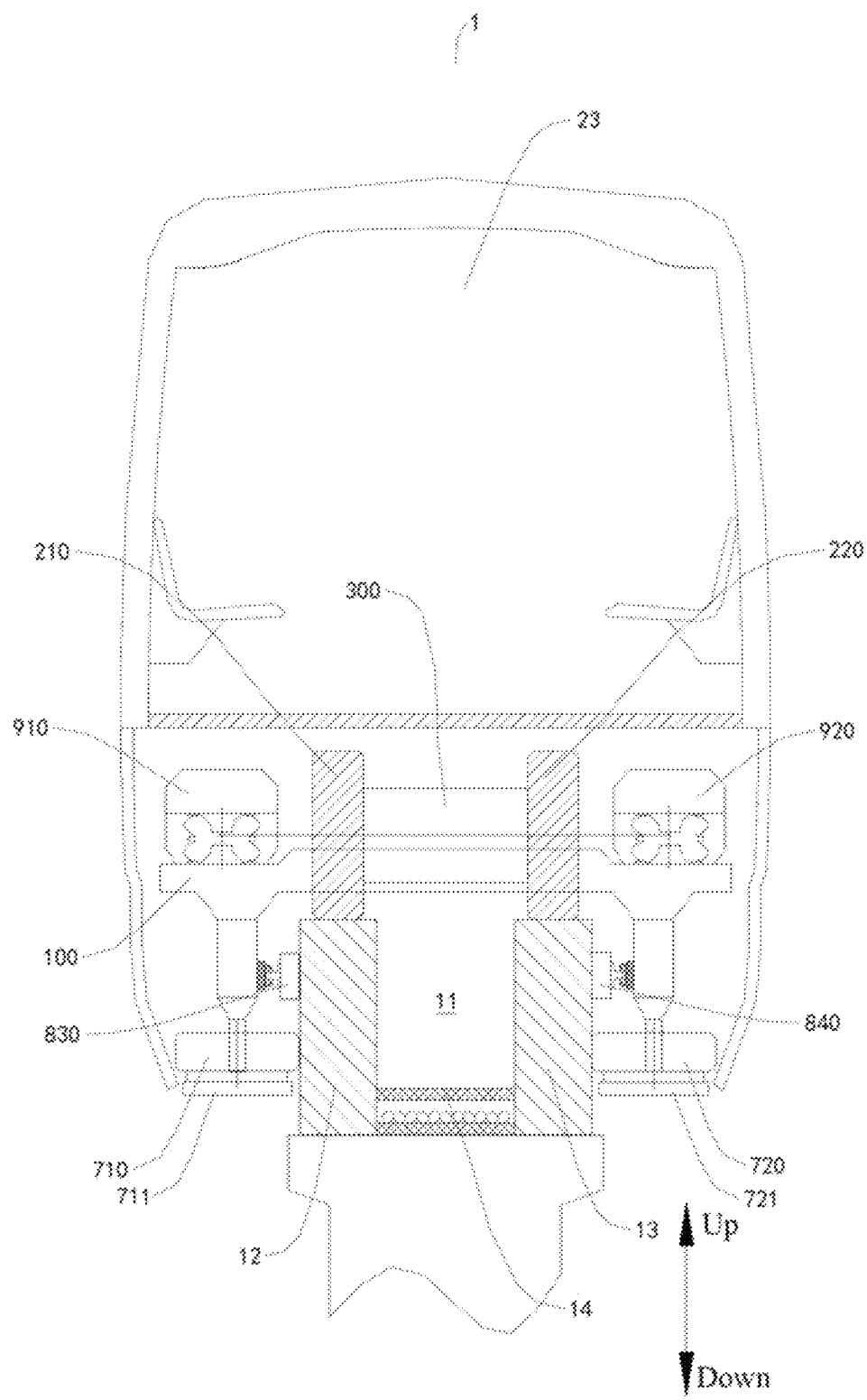
FIG. 4 is a sectional view of a rail transport system according to an embodiment of the present disclosure.
Figure 5:
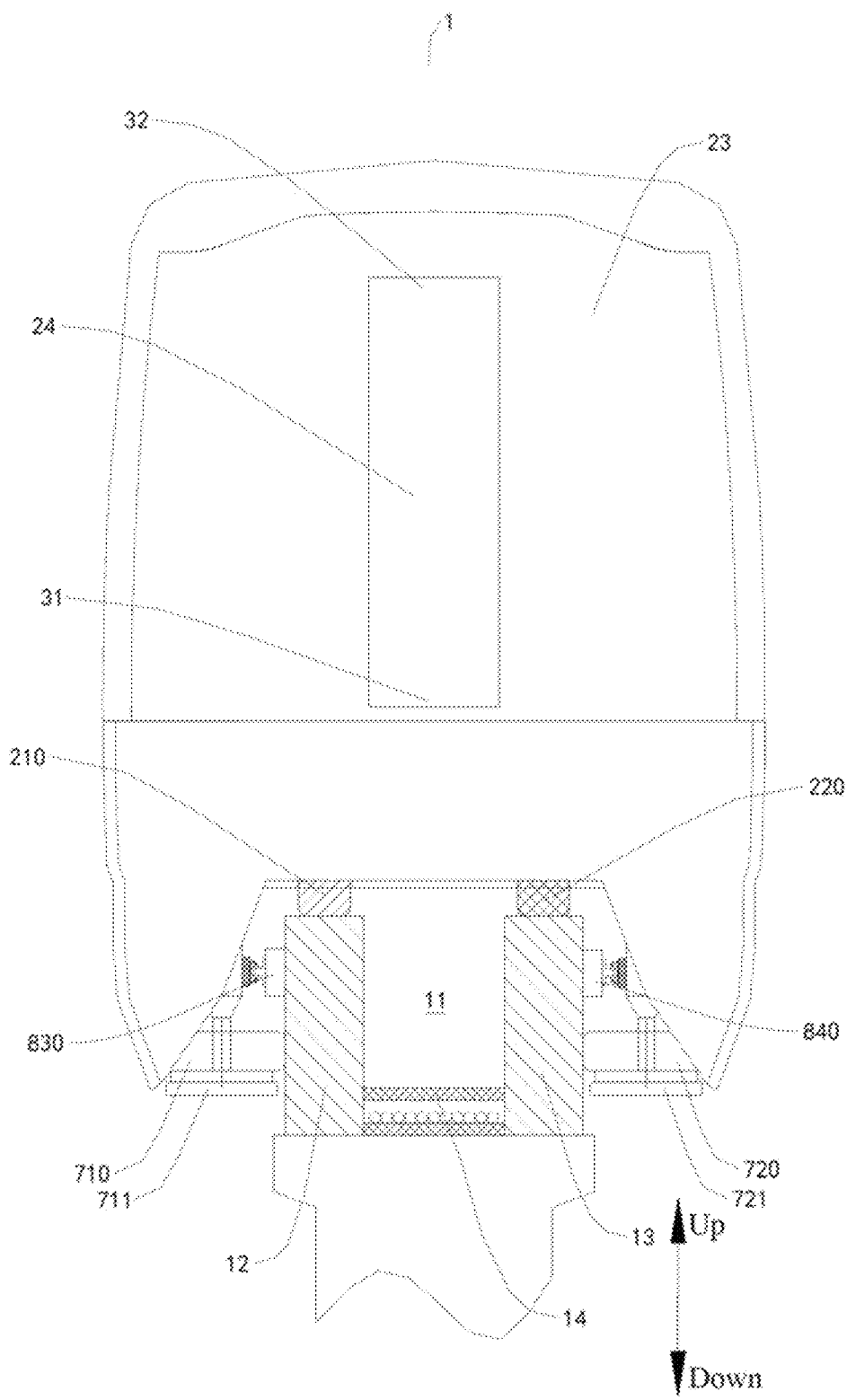
FIG. 5 is a sectional view of a rail transport system according to another embodiment of the present disclosure.
Figure 7:
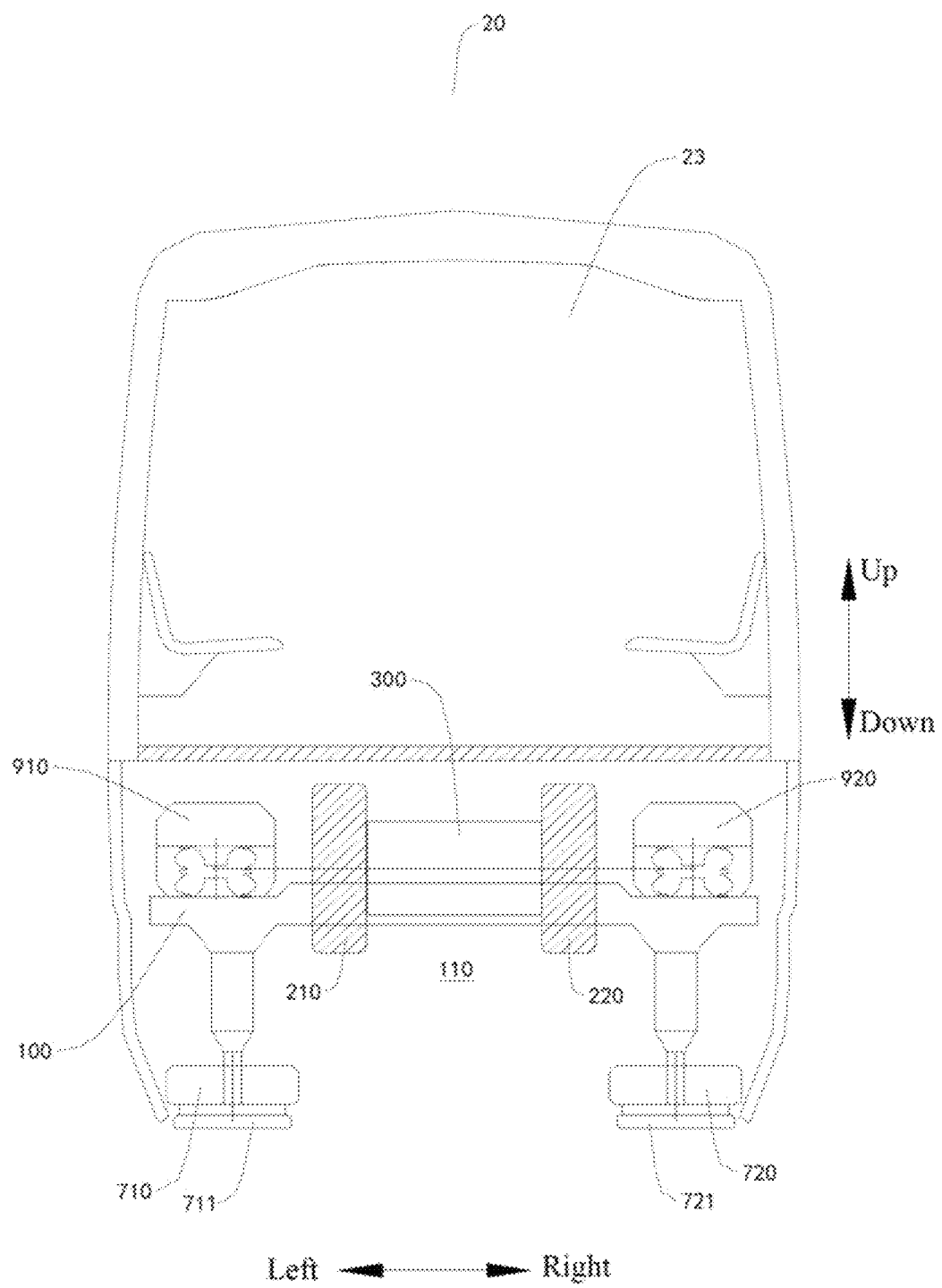
FIG. 7 is a schematic structural diagram of a rail vehicle according to an embodiment of the present disclosure.

Further, the bogie 21 further includes a first horizontal safety wheel 711 connected to the first horizontal wheel 710 and moving in synchronization with the first horizontal wheel 710, and a second horizontal safety wheel 721 connected to the second horizontal wheel 720 and moving in synchronization with the second horizontal wheel 720, the outer diameter of the first horizontal safety wheel 711 is less than the outer diameter of the first horizontal wheel 710, and the outer diameter of the second horizontal safety wheel 721 is less than the outer diameter of the second horizontal wheel 720. As shown in FIG. 4, FIG. 5, and FIG. 7, the bottom of the first horizontal wheel 710 is connected to a first horizontal safety wheel 711 moving in synchronization with the first horizontal wheel 710, and the outer diameter of the first horizontal safety wheel 711 is less than the outer diameter of the first horizontal wheel 710. The bottom of the second horizontal wheel 720 is connected to a second horizontal safety wheel 721 moving in synchronization with the second horizontal wheel 720, and the outer diameter of the second horizontal safety wheel 721 is less than the outer diameter of the second horizontal wheel 720. Normally, the first horizontal safety wheel 711 and the second horizontal safety wheel 721 are not in contact with a rail beam. When a tyre of a horizontal wheel is flat, a horizontal safety wheel in place of the horizontal wheel is in contact with the rail beam, to ensure stability of the rail vehicle 20 during travelling. For example, when the first horizontal wheel 710 is normal, the first horizontal safety wheel 711 is not in contact with the first rail beam 12. When a tyre of the first horizontal wheel 710 is flat, the first horizontal safety wheel 711 is in contact with a side surface of the first rail beam 12, thereby replacing the first horizontal wheel 710.

Figure 11:
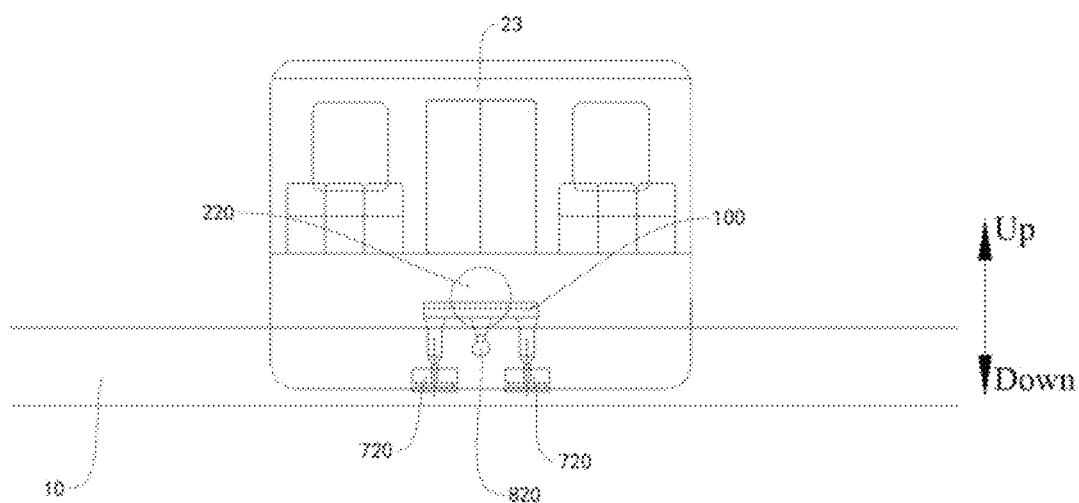
FIG. 11 is a partial schematic structural diagram of a rail transport system according to an embodiment of the present disclosure.
Figure 50:
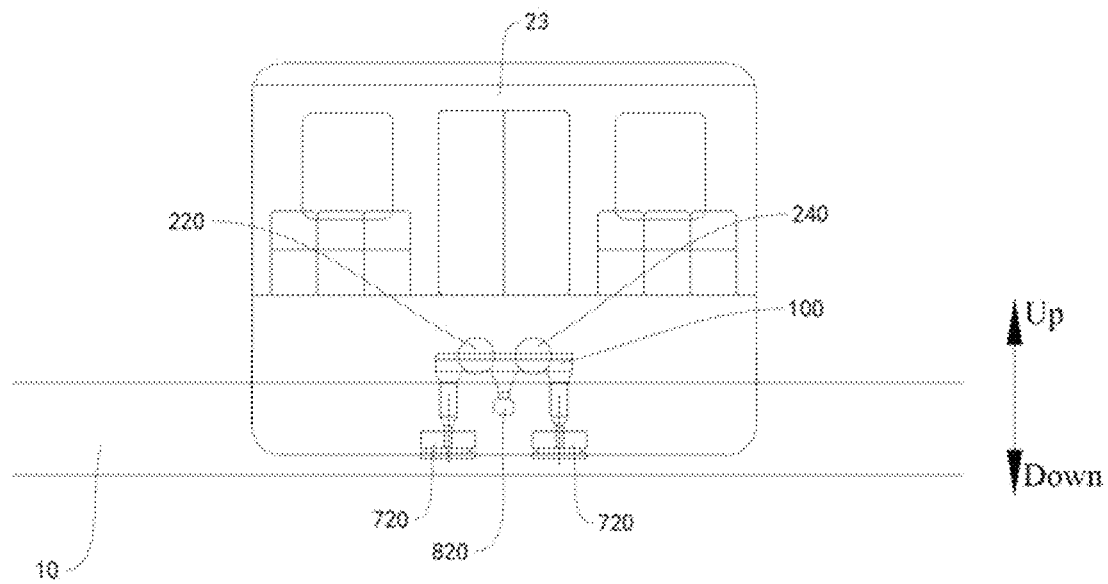
FIG. 50 is a partial schematic structural diagram of a rail transport system according to another embodiment of the present disclosure.

In some specific examples of the present disclosure, as shown in FIG. 11 and FIG. 50, there is a plurality of first horizontal wheels 710 located at a same height in an up and down direction and there is a plurality of second horizontal wheels 720 located at a same height in the up and down direction. FIG. 11 shows an example in which a second horizontal wheel 720 and another second horizontal wheel 720 of a bogie 21 having two running wheels are located at a same height, and FIG. 50 shows an example in which a second horizontal wheel 710 and another second horizontal wheel 720 of a bogie 21 having four running wheels are located at a same height. Therefore, balance of entire steering performance of the rail vehicle 20 may be facilitated, and a force applied during forward movement or backward movement is uniform, thereby facilitating improvement in bend performance of the rail vehicle 20.

Figure 12:
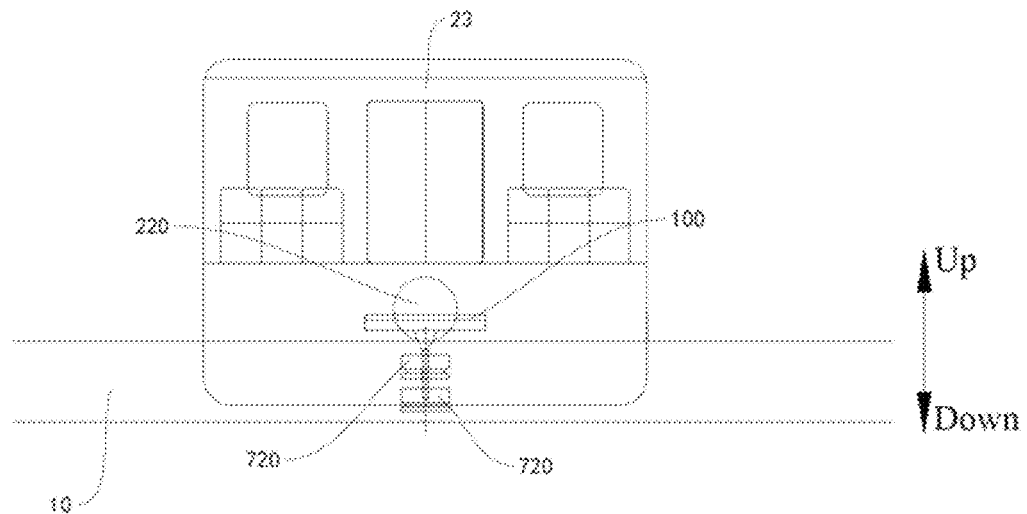
FIG. 12 is a partial schematic structural diagram of a rail transport system according to another embodiment of the present disclosure.
Figure 51:
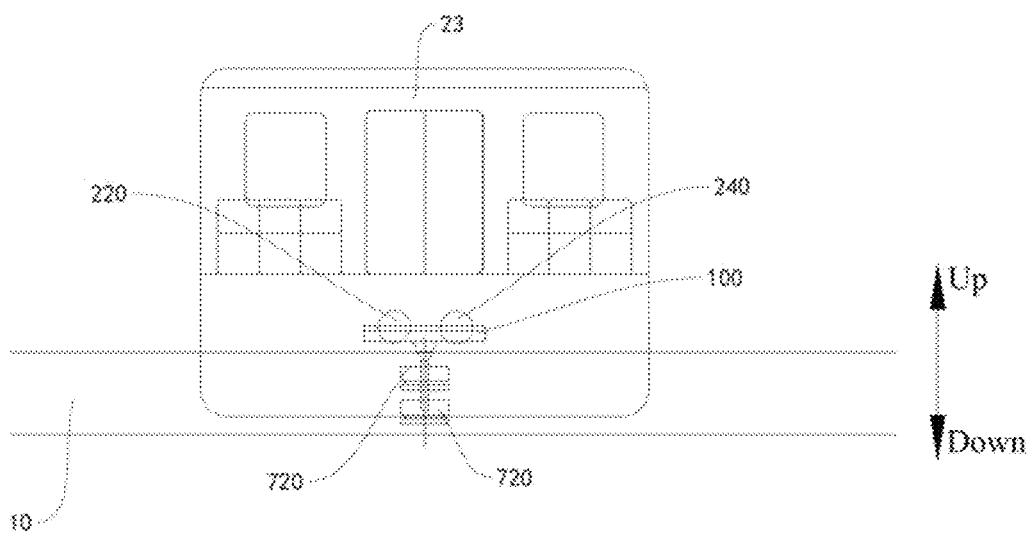
FIG. 51 is a partial schematic structural diagram of a rail transport system according to another embodiment of the present disclosure.

In some specific examples of the present disclosure, as shown in FIG. 12 and FIG. 51, there is a plurality of first horizontal wheels 710 spaced apart and coaxially disposed along an up and down direction and there is a plurality of second horizontal wheels 720 spaced apart and coaxially disposed along the up and down direction. FIG. 12 shows an example in which a plurality of first horizontal wheels 710 of a bogie 21 having two running wheels is coaxially disposed vertically and a plurality of second horizontal wheels 720 is coaxially disposed vertically, and FIG. 51 shows an example in which a plurality of first horizontal wheels 710 of a bogie 21 having four running wheels is coaxially disposed vertically and a plurality of second horizontal wheels 720 is coaxially disposed vertically. In this way, stability performance of the entire vehicle can be improved, and the horizontal wheel on the bottom plays a role of stabilization, thereby reducing an overturn risk of the rail vehicle 20 during bend or high-speed travelling.

Figure 13:
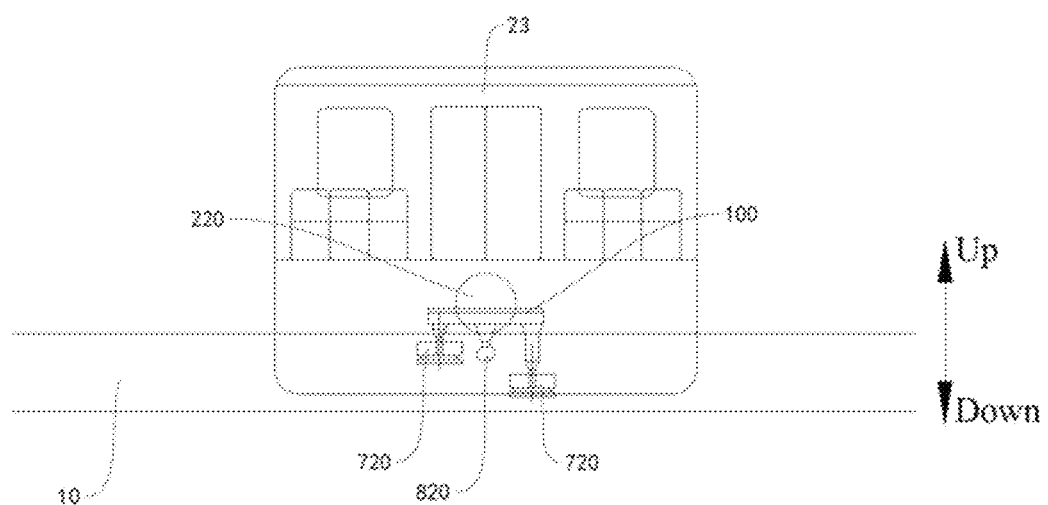
FIG. 13 is a partial schematic structural diagram of a rail transport system according to another embodiment of the present disclosure.
Figure 14:
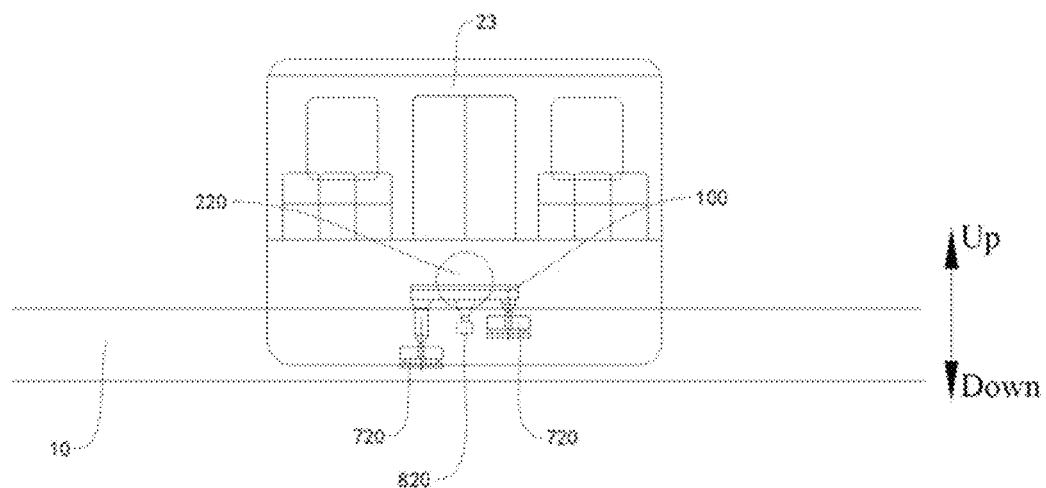
FIG. 14 is a partial schematic structural diagram of a rail transport system according to another embodiment of the present disclosure.
Figure 52:
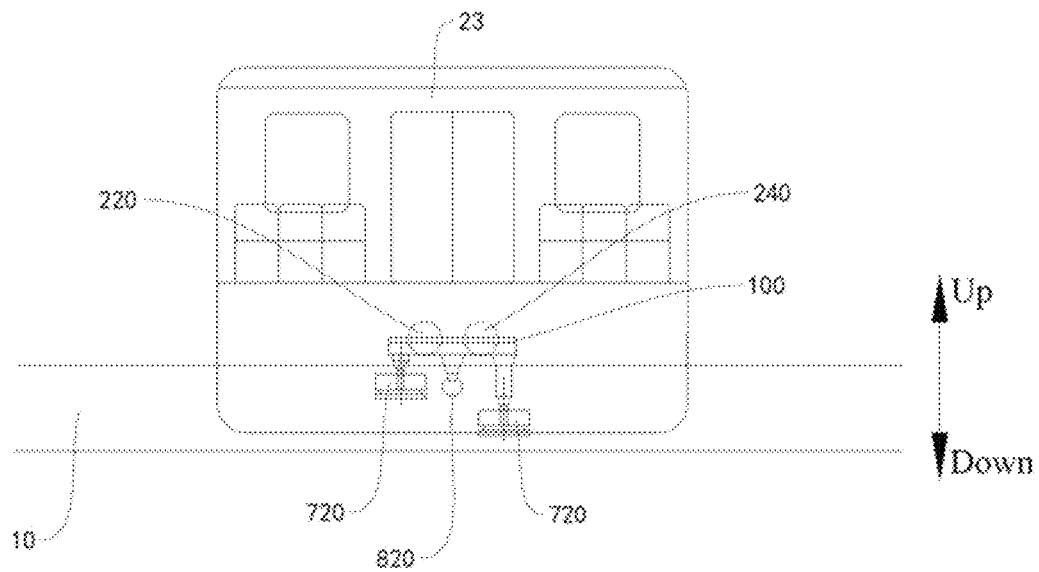
FIG. 52 is a partial schematic structural diagram of a rail transport system according to another embodiment of the present disclosure.
Figure 53:
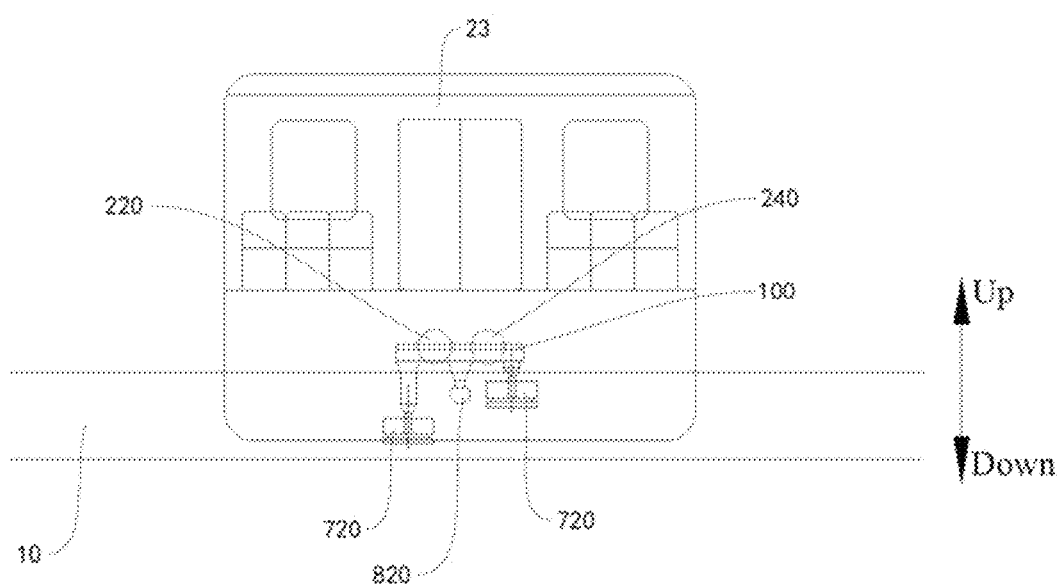
FIG. 53 is a partial schematic structural diagram of a rail transport system according to another embodiment of the present disclosure.
Figure 54:
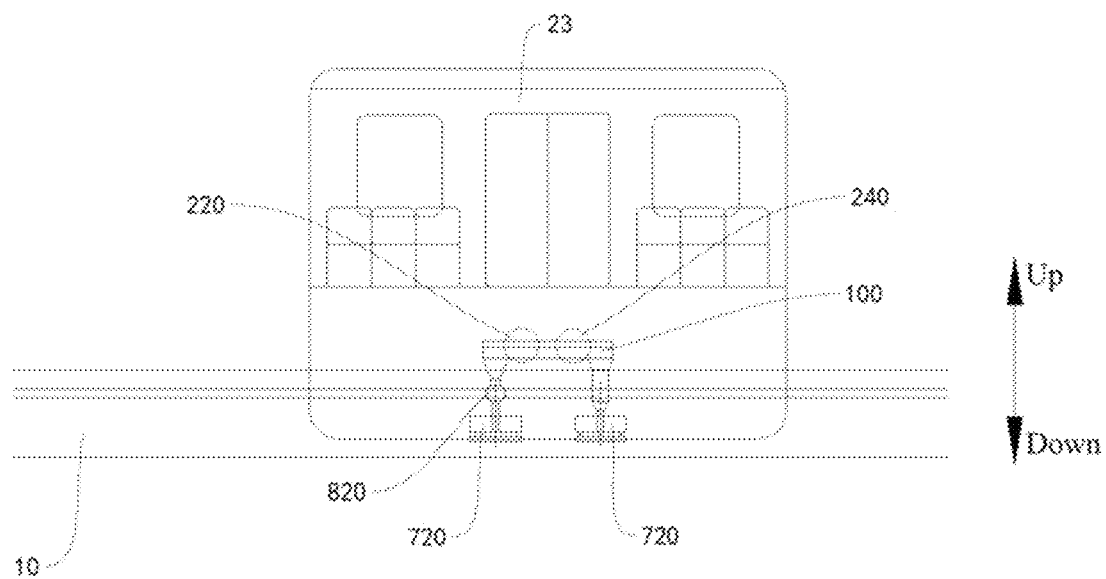
FIG. 54 is a partial schematic structural diagram of a rail transport system according to another embodiment of the present disclosure.
Figure 55:
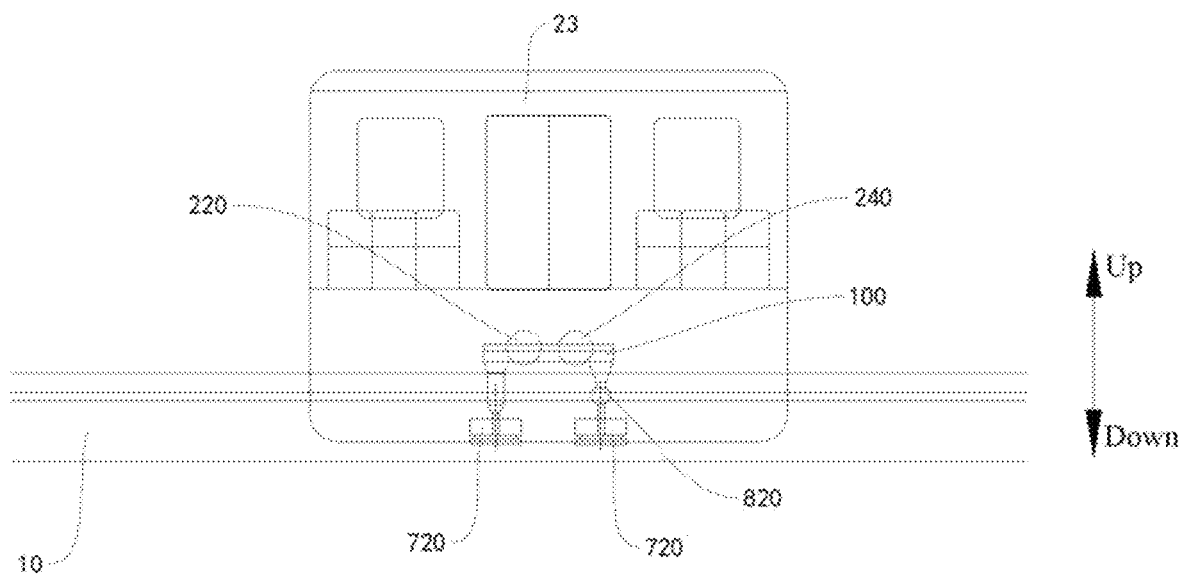
FIG. 55 is a partial schematic structural diagram of a rail transport system according to another embodiment of the present disclosure.
Figure 56:
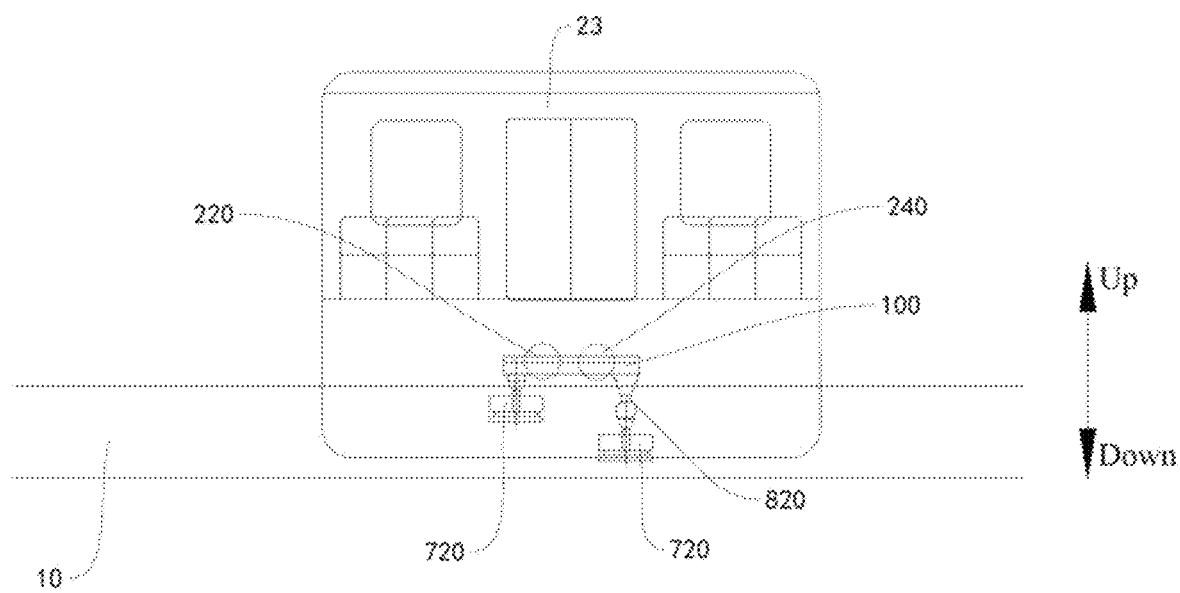
FIG. 56 is a partial schematic structural diagram of a rail transport system according to another embodiment of the present disclosure.
Figure 57:
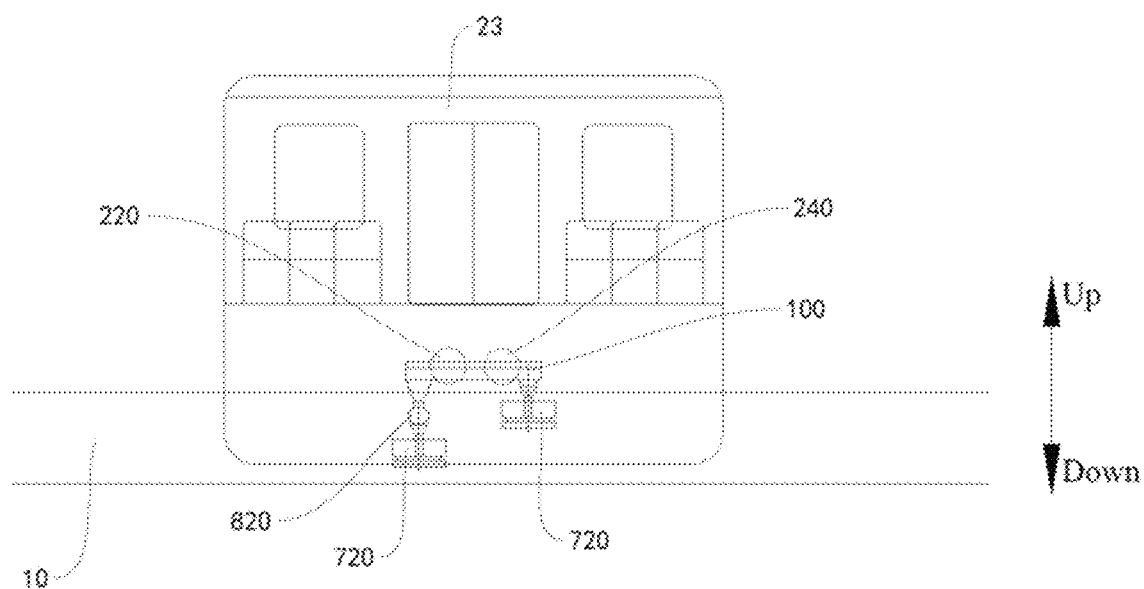
FIG. 57 is a partial schematic structural diagram of a rail transport system according to another embodiment of the present disclosure.

In some specific examples of the present disclosure, as shown in FIG. 13, FIG. 14, FIG. 52, and FIG. 53, there is a plurality of first horizontal wheels 710 spaced apart along the up and down direction and the length direction of the first rail beam 12 respectively, and there is a plurality of second horizontal wheels 720 spaced apart along the up and down direction and the length direction of the second rail beam 13 respectively. To be specific, the first horizontal wheels 710 are staggered vertically, and the second horizontal wheels 720 are staggered vertically. To be specific, an $n^{th}$ first horizontal wheel 710 may be located above or below an $(n+1)^{th}$ first horizontal wheel 720, and an $(n+2)^{th}$ first horizontal wheel 720 may be located above or below the $(n+1)^{th}$ first horizontal wheel 720. Specifically, the $n^{th}$ first horizontal wheel 710 and the $(n+2)^{th}$ first horizontal wheel 720 are located at a same height, where n is an integer greater than or equal to 1. The first horizontal wheel 710 may be located above the second horizontal wheel 720, or may be located below the second horizontal wheel 720. FIG. 13 and FIG. 14 show an example in which first horizontal wheels 710 of a bogie 21 having two running wheels are staggered vertically and second horizontal wheels 720 are staggered vertically, and FIG. 52 and FIG. 53 show an example in which first horizontal wheels 710 of a bogie 21 having four running wheels are staggered vertically and second horizontal wheels 720 are staggered vertically. In this way, the horizontal wheel on the top can play a role of guiding during travelling, and the horizontal wheel on the bottom is relatively far away from the vehicle body 22, and can play a role of stabilization and overturn prevention.

Figure 15:
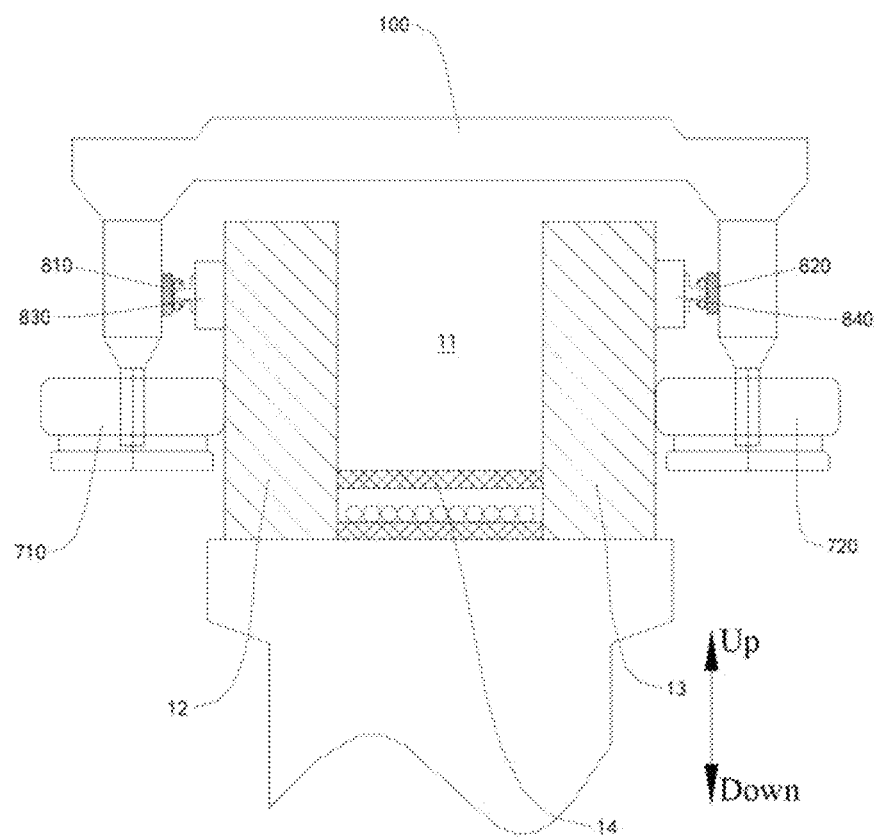
FIG. 15 is a schematic structural diagram of a bogie and a rail of a rail vehicle according to an embodiment of the present disclosure.

In some embodiments of the present disclosure, as shown in FIG. 15, the first horizontal wheel 710 fits in on the outer side surface of the first rail beam 12, and the second horizontal wheel 720 fits in on the outer side surface of the second rail beam 13, that is, both of the horizontal wheels fit in on the outer side surface of the rail 10. Therefore, a center distance between the two horizontal wheels is designed as a possible maximum distance, which can improve stability performance of the system, and also facilitate gravity center distribution of the bogie 21 and the entire vehicle.

Figure 16:
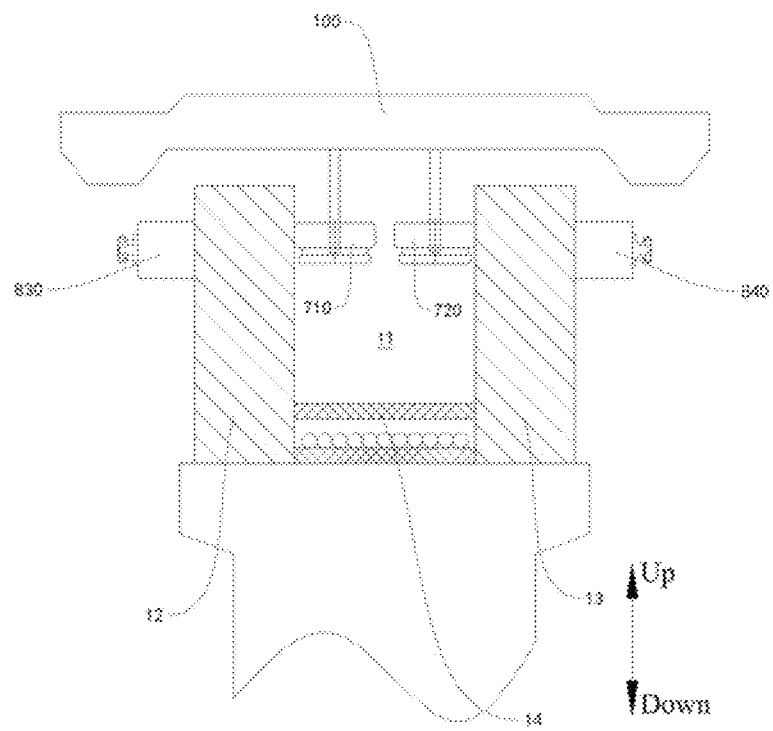
FIG. 16 is a schematic structural diagram of a bogie and a rail of a rail vehicle according to another embodiment of the present disclosure.

In some embodiments of the present disclosure, as shown in FIG. 16, the first horizontal wheel 710 fits in on the inner side surface of the first rail beam 12, and the second horizontal wheel 720 fits in on the inner side surface of the second rail beam 13, that is, both of the horizontal wheels fit in on the inner side surface of the rail 10. In this way, space inside the rail 10 can be effectively used, to improve space utilization of the entire vehicle, and a horizontal wheel and a conductive rail are respectively located on two sides of a rail beam, which can effectively reduce space on the bottom of the vehicle body 22 and reduce the height of the entire vehicle.

Figure 17:
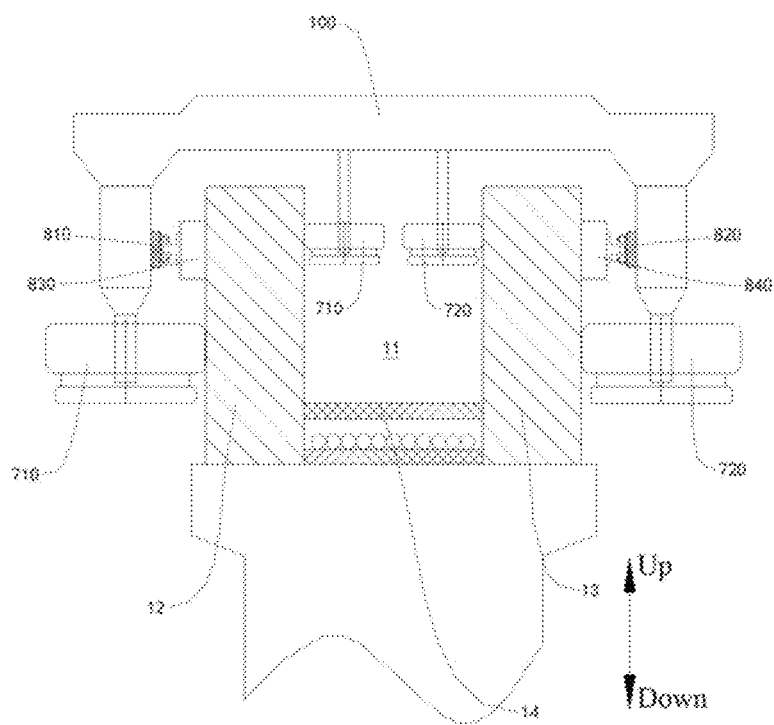
FIG. 17 is a schematic structural diagram of a bogie and a rail of a rail vehicle according to another embodiment of the present disclosure.
Figure 18:
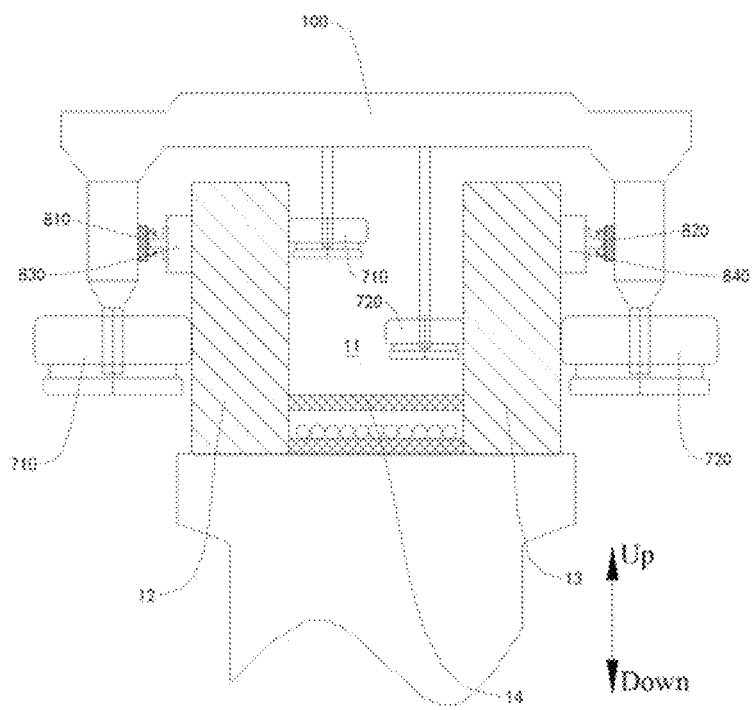
FIG. 18 is a schematic structural diagram of a bogie and a rail of a rail vehicle according to another embodiment of the present disclosure.
Figure 19:
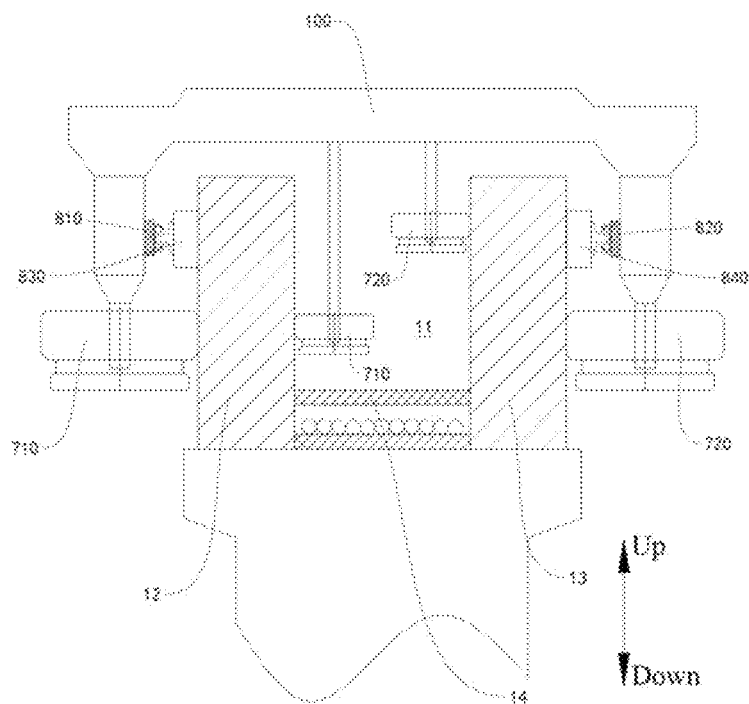
FIG. 19 is a schematic structural diagram of a bogie and a rail of a rail vehicle according to another embodiment of the present disclosure.
Figure 20:
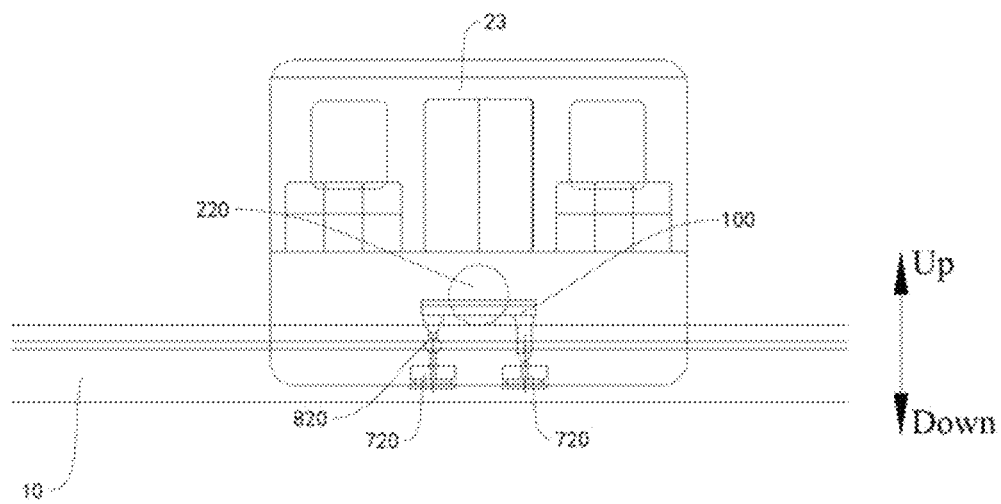
FIG. 20 is a partial schematic structural diagram of a rail transport system according to another embodiment of the present disclosure.
Figure 21:
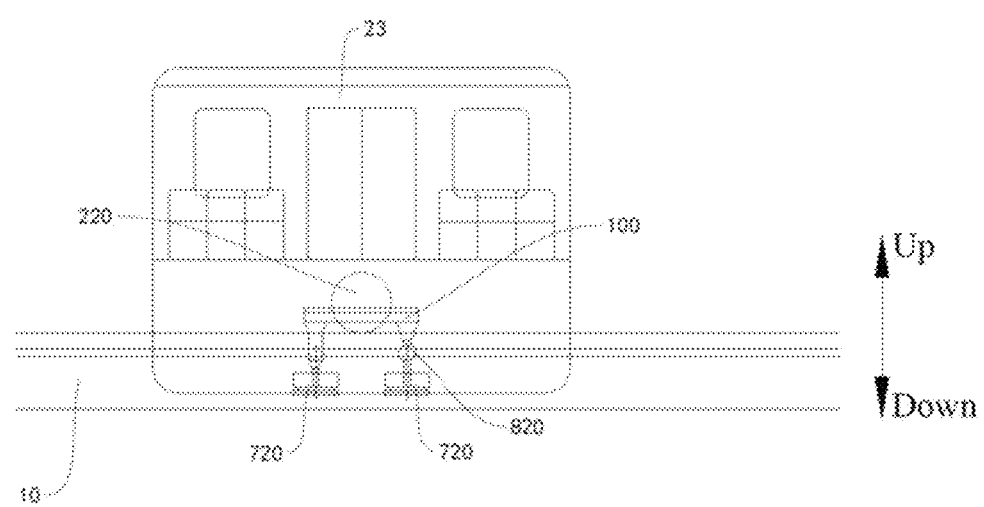
FIG. 21 is a partial schematic structural diagram of a rail transport system according to another embodiment of the present disclosure.
Figure 22:
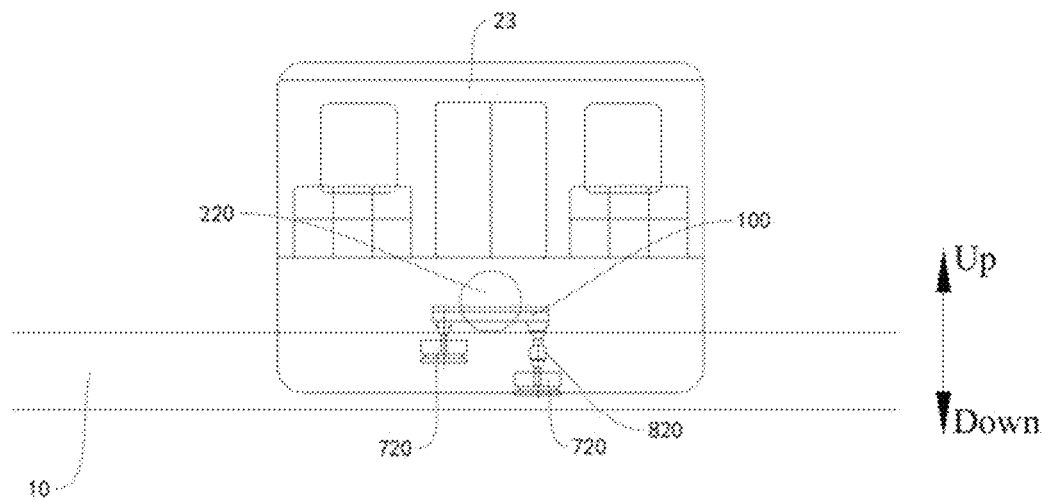
FIG. 22 is a partial schematic structural diagram of a rail transport system according to another embodiment of the present disclosure.
Figure 23:
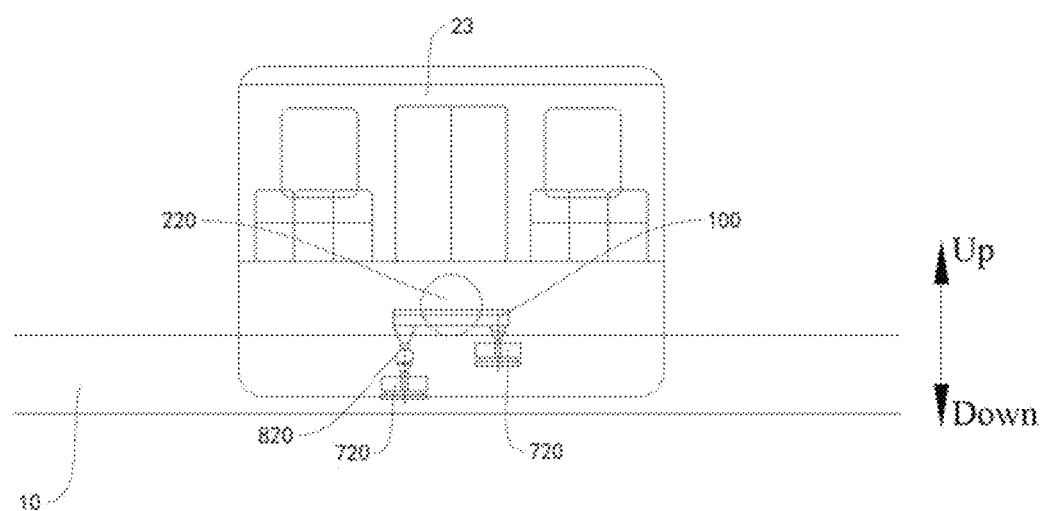
FIG. 23 is a partial schematic structural diagram of a rail transport system according to another embodiment of the present disclosure.

In some other embodiments of the present disclosure, as shown in FIG. 17 to FIG. 19, there is a plurality of first horizontal wheels 710 respectively fitting in on the outer side surface and the inner side surface of the first rail beam 12, and there is a plurality of second horizontal wheels 720 respectively fitting in on the outer side surface and the inner side surface of the second rail beam 13. To be specific, horizontal wheels are fitting in on both the outer side surface and the inner side surface of the rail 10. The horizontal wheels are simultaneously arranged on the inner side and the outer side, to play a role of stabilization and overturn prevention, and stability performance and safety performance of the rail vehicle 20 can be greatly improved.

Optionally, as shown in FIG. 17, the first horizontal wheel 710 fitting in on the inner side surface of the first rail beam 12 and the second horizontal wheel 720 fitting in on the inner side surface of the second rail beam 13 are located at a same height in the up and down direction. As shown in FIG. 18 and FIG. 19, the first horizontal wheel 710 fitting in on the inner side surface of the first rail beam 12 and the second horizontal wheel 720 fitting in on the inner side surface of the second rail beam 13 are located at different heights in the up and down direction. For example, as shown in FIG. 18, the first horizontal wheel 710 fitting in on the inner side surface of the first rail beam 12 is higher than the second horizontal wheel 720 fitting in on the inner side surface of the second rail beam 13. For another example, as shown in FIG. 19, the first horizontal wheel 710 fitting in on the inner side surface of the first rail beam 12 is lower than the second horizontal wheel 720 fitting in on the inner side surface of the second rail beam 13.

During specific implementation, the first horizontal wheel 710 fitting in on the inner side surface of the first rail beam 12 and the second horizontal wheel 720 fitting in on the inner side surface of the second rail beam 13 may be located at a same height or located at different heights, and the first horizontal wheel 710 fitting in on the outer side surface of the first rail beam 12 and the second horizontal wheel 720 fitting in on the outer side surface of the second rail beam 13 may also be located at a same height or located at different heights.

In some examples of the present disclosure, as shown in FIG. 11 to FIG. 41 and FIG. 50 to FIG. 57, the bogie 21 further includes a first collector shoe 810 and a second collector shoe 820.

A first conductive rail 830 extending along the length direction of the first rail beam 12 is disposed on the outer side surface of the first rail beam 12, and a second conductive rail 840 extending along the length direction of the second rail beam 13 is disposed on the outer side surface of the second rail beam 13. The first collector shoe 810 is disposed on the bogie frame 100 and fits in with the first conductive rail 830, and the second collector shoe 820 is disposed on the bogie frame 100 and fits in with the second conductive rail 840. The first collector shoe 810 is powered by using the first conductive rail 830, and the second collector shoe 820 is powered by using the second conductive rail 840, so as to be used by the rail vehicle 20.

In some specific examples of the present disclosure, as shown in FIG. 11, FIG. 13, FIG. 14, FIG. 50, FIG. 52, and FIG. 53, there is a plurality of first horizontal wheels 710 spaced apart along the length direction of the first rail beam 12, and the first collector shoe 810 is located between neighboring first horizontal wheels 710 in the length direction of the first rail beam 12; and there is a plurality of second horizontal wheels 720 spaced apart along the length direction of the second rail beam 13, and the second collector shoe 820 is located between neighboring second horizontal wheels 720 in the length direction of the second rail beam 13. Therefore, a force applied to the first horizontal wheel 710 does not affect the first collector shoe 810 and a force applied to the second horizontal wheel 720 does not affect the second collector shoe 820. Moreover, space utilization can be improved, and the structure of the bogie 21 can be simplified.

For example, FIG. 11, FIG. 13, and FIG. 14 show an example in which the first collector shoe 810 of the bogie 21 having two running wheels is located between neighboring first horizontal wheels 710 in the length direction of the first rail beam 12 and the second collector shoe 820 is located between neighboring second horizontal wheels 720 in the length direction of the second rail beam 13. The plurality of first horizontal wheels 710 may be located at a same height and the plurality of second horizontal wheels 720 may be located at a same height; or the plurality of first horizontal wheels 710 may be staggered vertically and the plurality of second horizontal wheels 720 may be staggered vertically.

FIG. 50, FIG. 52, and FIG. 53 show an example in which the first collector shoe 810 of the bogie 21 having four running wheels is located between neighboring first horizontal wheels 710 in the length direction of the first rail beam 12 and the second collector shoe 820 is located between neighboring second horizontal wheels 720 in the length direction of the second rail beam 13. The plurality of first horizontal wheels 710 may be located at a same height and the plurality of second horizontal wheels 720 may be located at a same height; or the plurality of first horizontal wheels 710 may be staggered vertically and the plurality of second horizontal wheels 720 may be staggered vertically.

In some specific examples of the present disclosure, as shown in FIG. 20 to FIG. 23 and FIG. 54 to FIG. 57, there is a plurality of first horizontal wheels 710 spaced apart along the length direction of the first rail beam 12, and the first collector shoe 810 and one of the first horizontal wheels 710 are disposed facing each other in the up and down direction. For example, the central axis of the first collector shoe 810 coincides with the central axis of one of the first horizontal wheels 710. There is a plurality of second horizontal wheels 720 spaced apart along the length direction of the second rail beam 13, and the second collector shoe 820 and one of the second horizontal wheels 720 are disposed facing each other in the up and down direction. For example, the central axis of the second collector shoe 820 coincides with the central axis of one of the second horizontal wheels 720. In other words, the collector shoes are disposed in front or disposed behind. Therefore, mounting space of the horizontal wheels can be fully used, and no mounting mechanism needs to be additional disposed, to facilitate structure simplification and weight reduction of the bogie 21.

For example, FIG. 20 to FIG. 23 show an example in which collector shoes of the bogie 21 having two running wheels are disposed in front or disposed behind. The plurality of first horizontal wheels 710 may be located at a same height and the plurality of second horizontal wheels 720 may be located at a same height; or the plurality of first horizontal wheels 710 may be located at different heights and the plurality of second horizontal wheels 720 may be located at different heights.

FIG. 54 to FIG. 57 show an example in which collector shoes of the bogie 21 having four running wheels are disposed in front or disposed behind. The plurality of first horizontal wheels 710 may be located at a same height and the plurality of second horizontal wheels 720 may be located at a same height; or the plurality of first horizontal wheels 710 may be located at different heights and the plurality of second horizontal wheels 720 may be located at different heights.

In some embodiments of the present disclosure, as shown in FIG. 24 to FIG. 28, a first collector shoe 810 is located above each first horizontal wheel 710, and a second collector shoe 820 is located above each second horizontal wheel 720. Reduction in a distance between a collector shoe and the driving device 300 facilitates energy transfer and improvement in space utilization.

Figure 24:
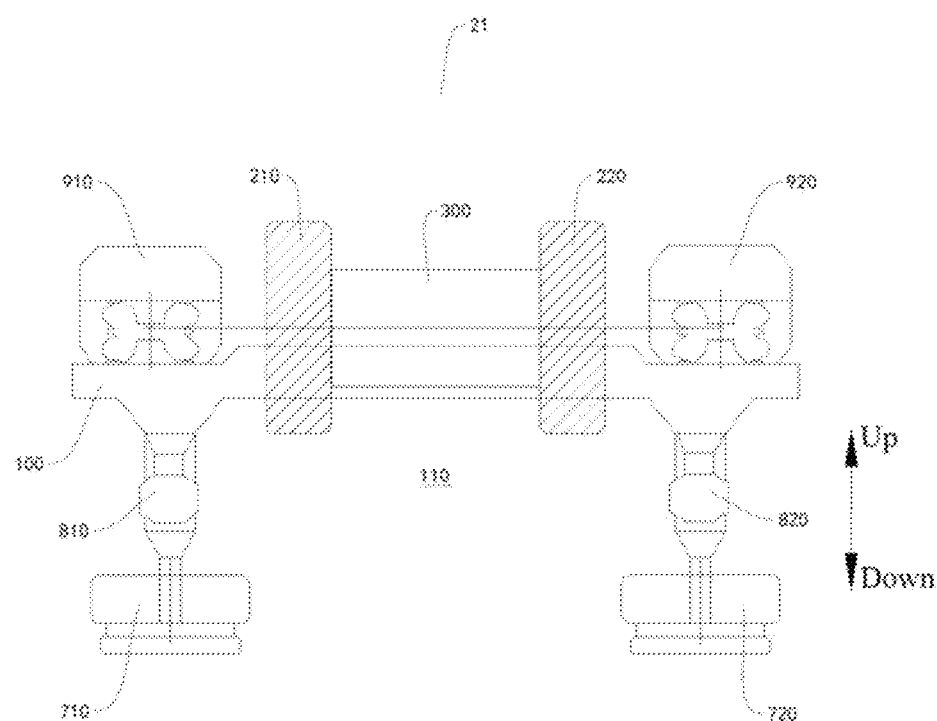
FIG. 24 is a sectional view of a bogie of a rail vehicle according to an embodiment of the present disclosure.
Figure 25:
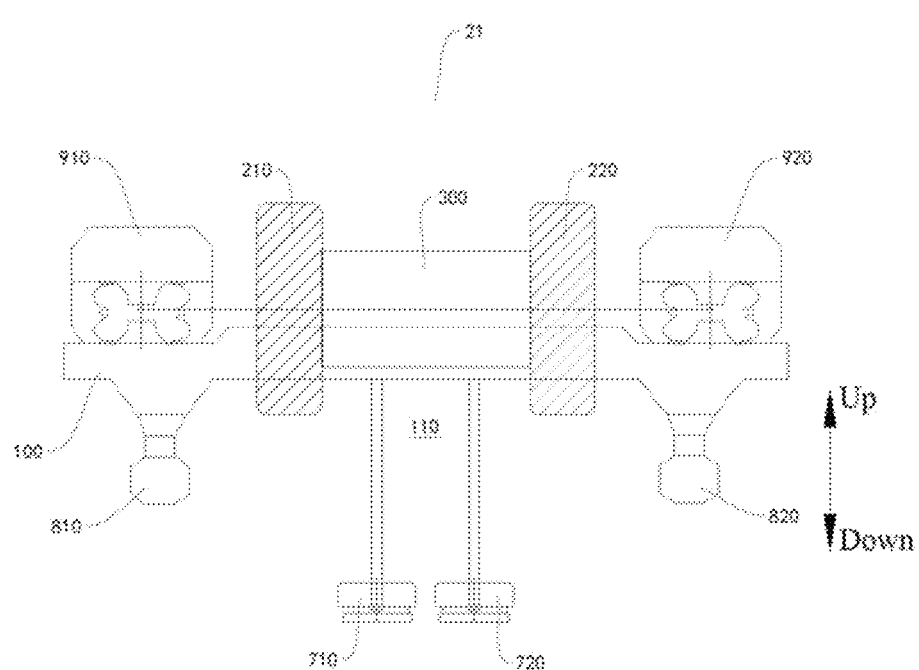
FIG. 25 is a sectional view of a bogie of a rail vehicle according to another embodiment of the present disclosure.
Figure 26:
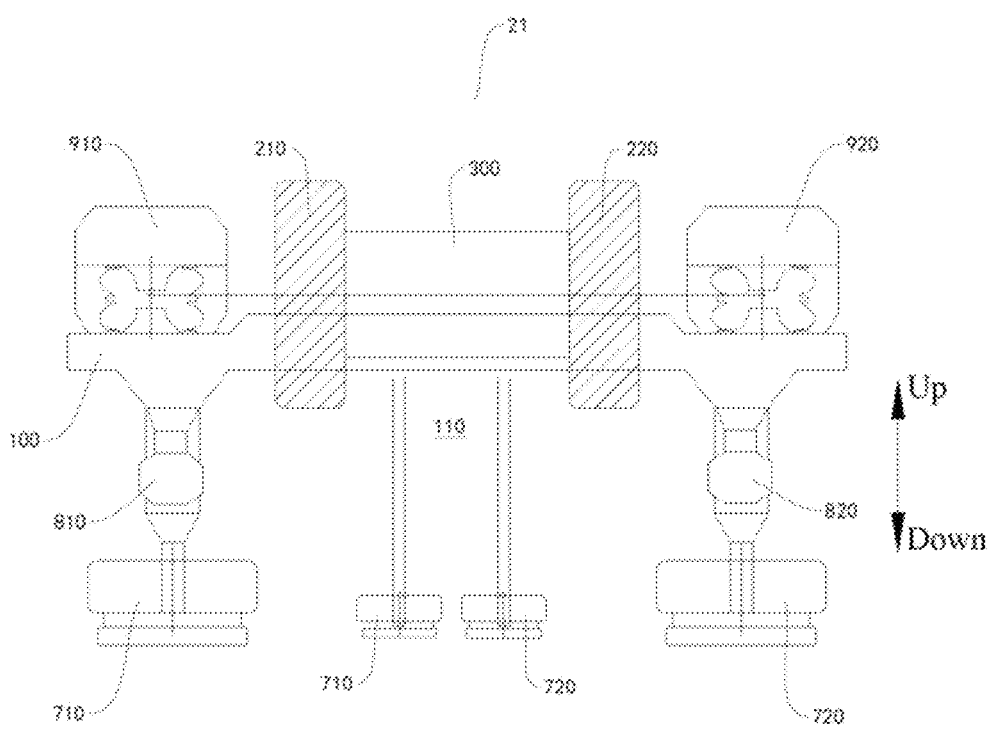
FIG. 26 is a sectional view of a bogie of a rail vehicle according to another embodiment of the present disclosure.
Figure 27:
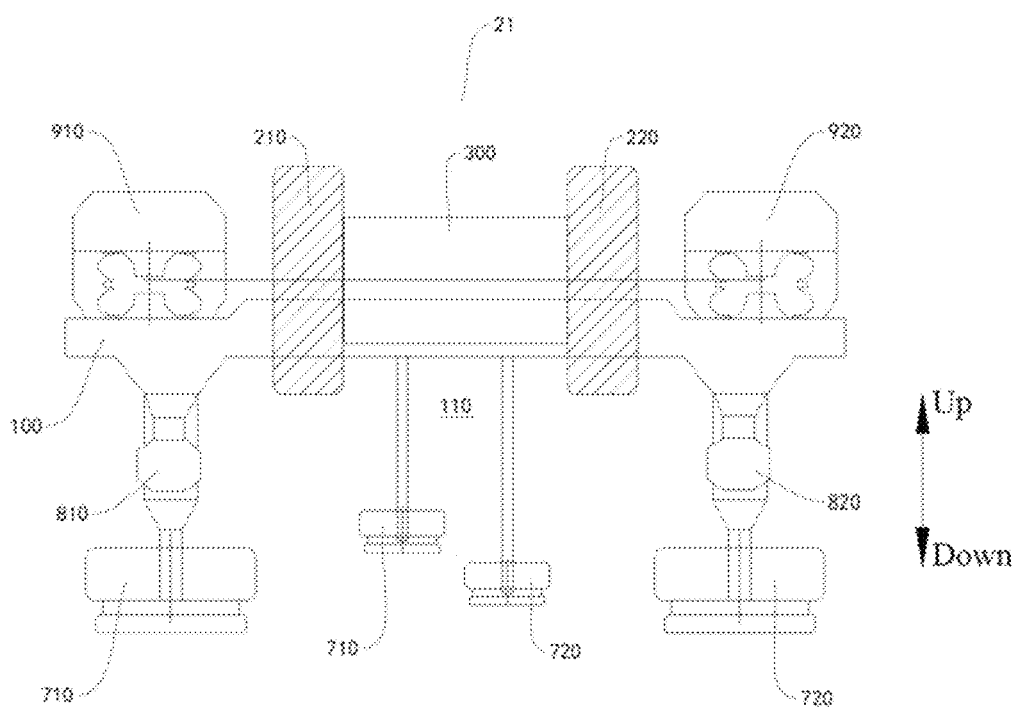
FIG. 27 is a sectional view of a bogie of a rail vehicle according to another embodiment of the present disclosure.
Figure 28:
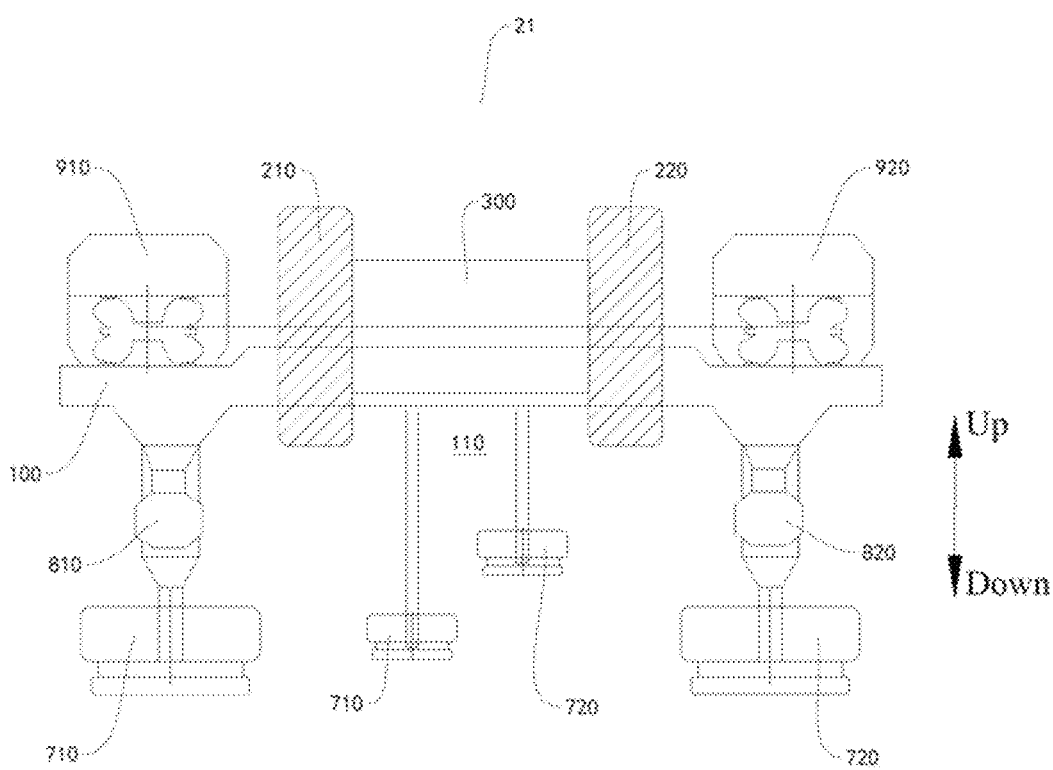
FIG. 28 is a sectional view of a bogie of a rail vehicle according to another embodiment of the present disclosure.

For example, the first horizontal wheel 710 may fit in on the outer side surface of the first rail beam 12 and the second horizontal wheel 720 may fit in on the outer side surface of the second rail beam 13 (as shown in FIG. 24). Alternatively, the first horizontal wheel 710 may fit in on the inner side surface of the first rail beam 12 and the second horizontal wheel 720 may fit in on the inner side surface of the second rail beam 13 (as shown in FIG. 25). A plurality of first horizontal wheels 710 may further fit in on the inner side surface and the outer side surface of the first rail beam 12 respectively and a plurality of second horizontal wheels 720 may further fit in on the inner side surface and the outer side surface of the second rail beam 13 respectively (as shown in FIG. 26 to FIG. 28). The first horizontal wheel 710 fitting in on the inner side surface of the first rail beam 12 and the second horizontal wheel 720 fitting in on the inner side surface of the second rail beam 13 are located at a same height or located at different heights.

In some embodiments of the present disclosure, as shown in FIG. 29 to FIG. 33, a first collector shoe 810 is located below each first horizontal wheel 710, and a second collector shoe 820 is located below each second horizontal wheel 720. Therefore, a horizontal wheel is arranged at a location close to an upper portion of a rail beam to facilitate travelling stability of the rail vehicle 20.

Figure 29:
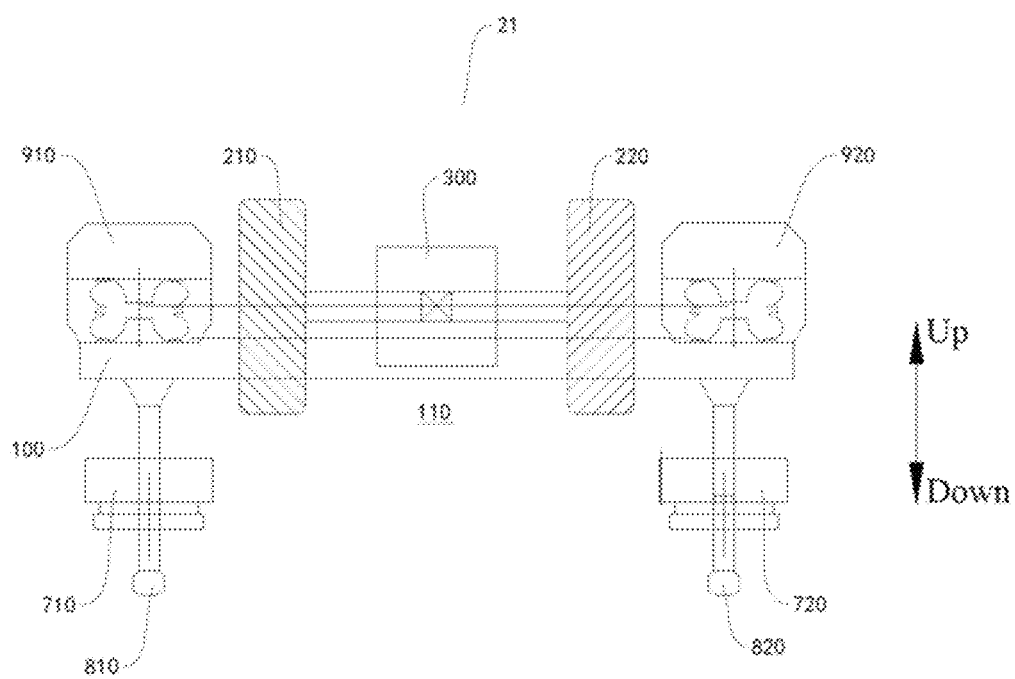
FIG. 29 is a sectional view of a bogie of a rail vehicle according to another embodiment of the present disclosure.
Figure 30:
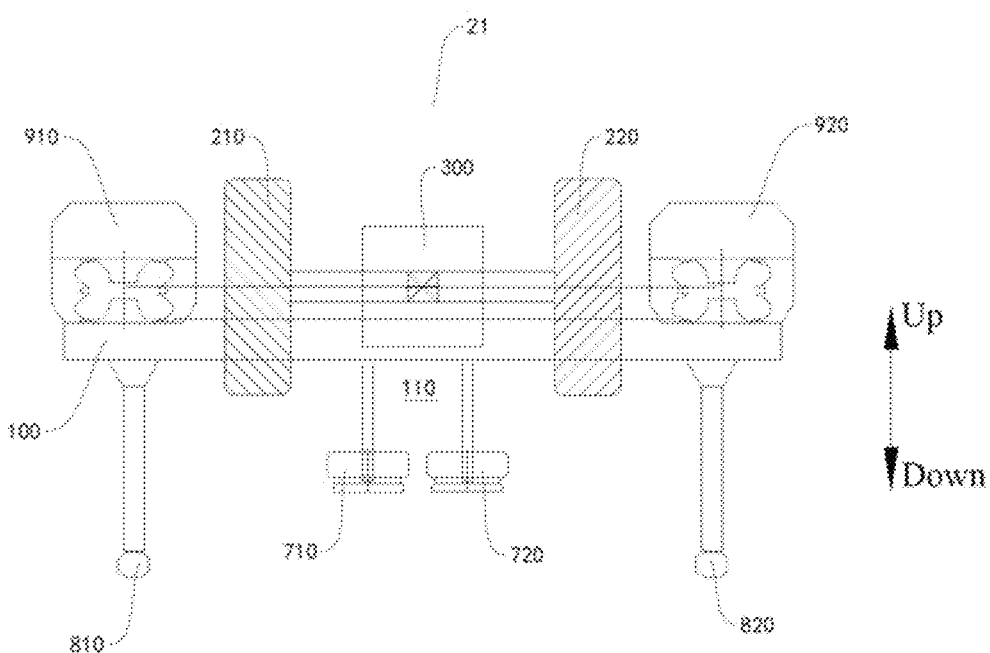
FIG. 30 is a sectional view of a bogie of a rail vehicle according to another embodiment of the present disclosure.
Figure 31:
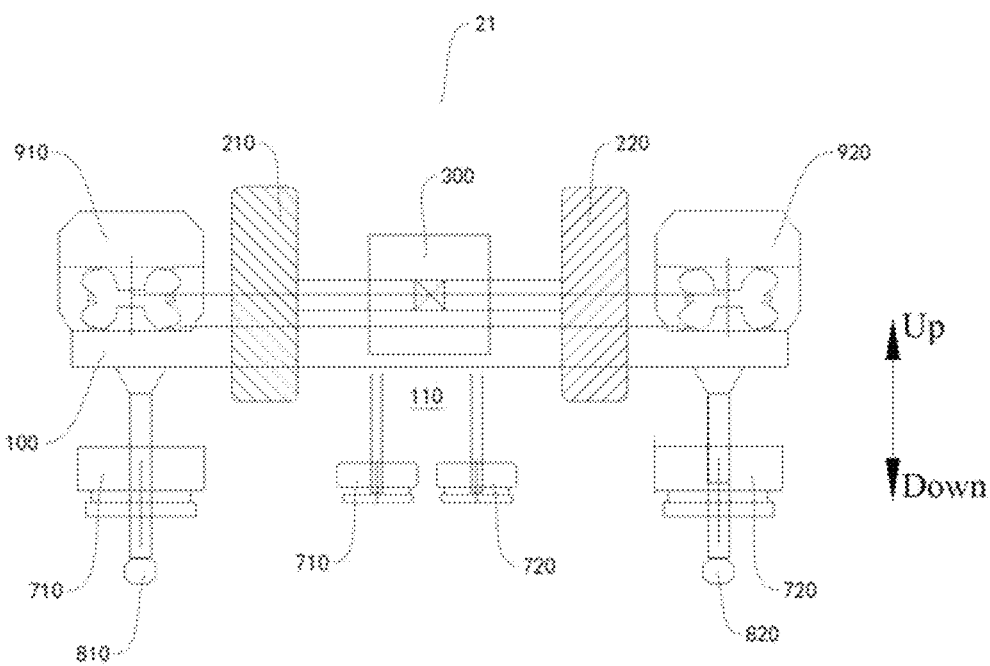
FIG. 31 is a sectional view of a bogie of a rail vehicle according to another embodiment of the present disclosure.
Figure 32:
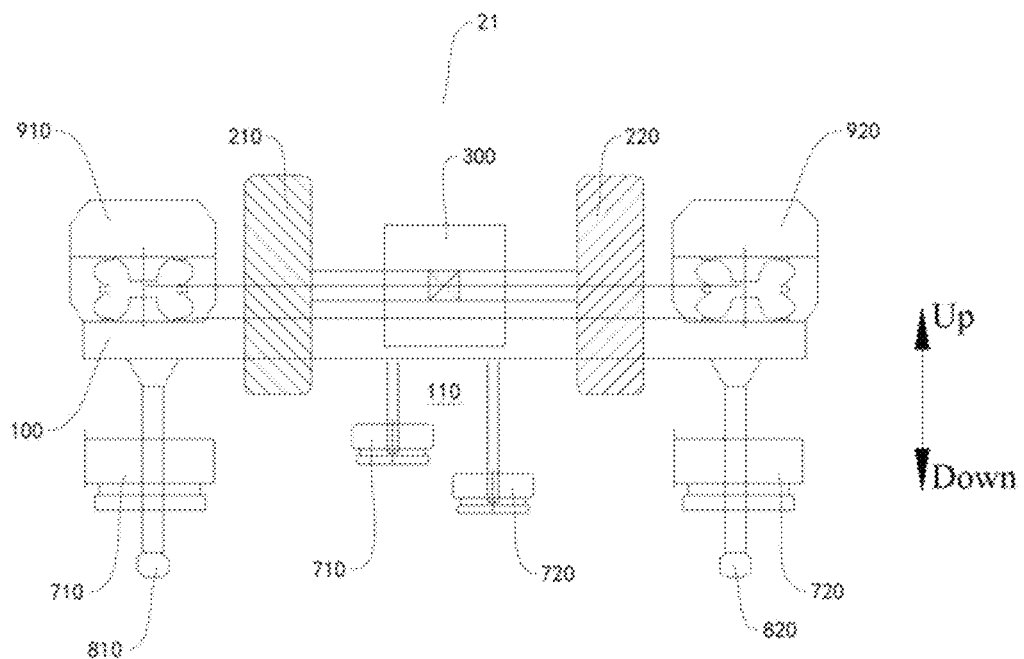
FIG. 32 is a sectional view of a bogie of a rail vehicle according to another embodiment of the present disclosure.
Figure 33:
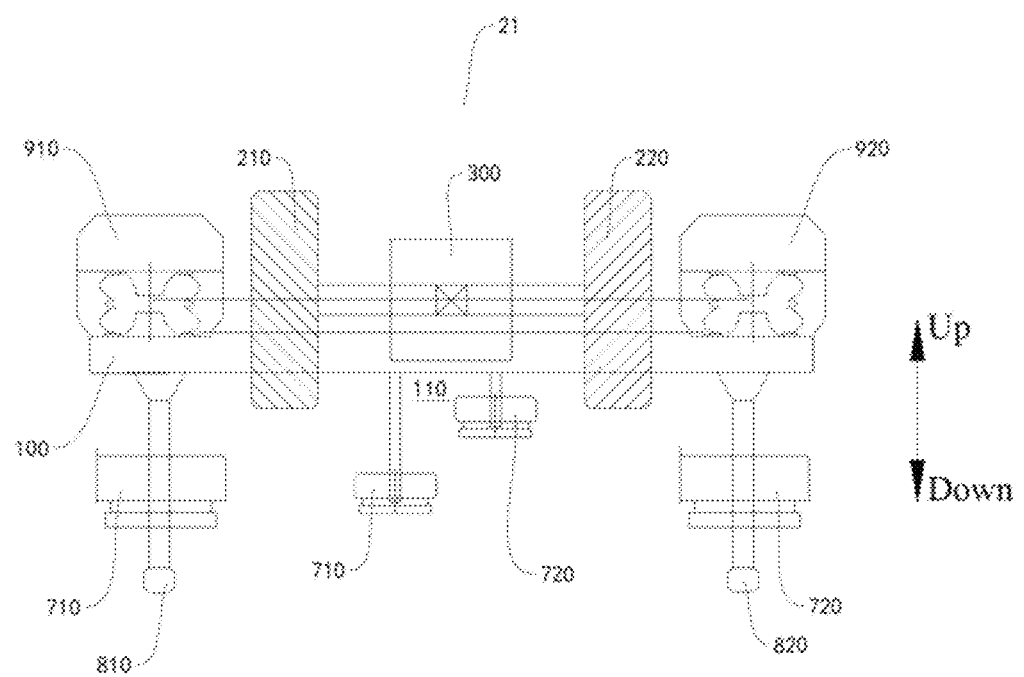
FIG. 33 is a sectional view of a bogie of a rail vehicle according to another embodiment of the present disclosure.

For example, the first horizontal wheel 710 may fit in on the outer side surface of the first rail beam 12 and the second horizontal wheel 720 may fit in on the outer side surface of the second rail beam 13 (as shown in FIG. 29). Alternatively, the first horizontal wheel 710 may fit in on the inner side surface of the first rail beam 12 and the second horizontal wheel 720 may fit in on the inner side surface of the second rail beam 13 (as shown in FIG. 30). A plurality of first horizontal wheels 710 may further fit in on the inner side surface and the outer side surface of the first rail beam 12 respectively and a plurality of second horizontal wheels 720 may further fit in on the inner side surface and the outer side surface of the second rail beam 13 respectively (as shown in FIG. 31 to FIG. 33). The first horizontal wheel 710 fitting in on the inner side surface of the first rail beam 12 and the second horizontal wheel 720 fitting in on the inner side surface of the second rail beam 13 are located at a same height or located at different heights.

Figure 34:
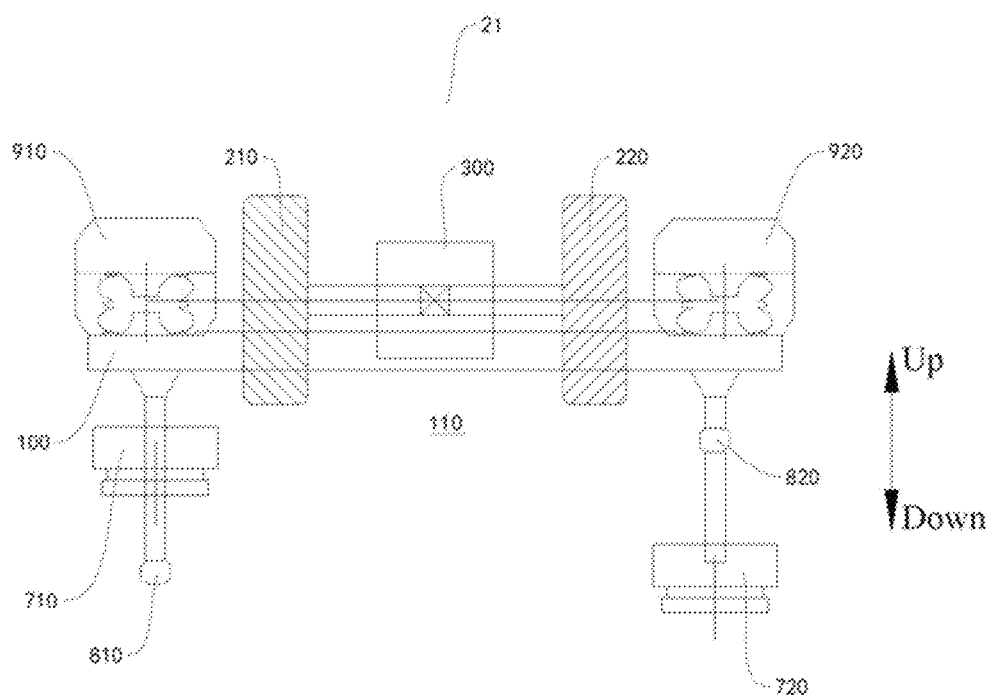
FIG. 34 is a sectional view of a bogie of a rail vehicle according to another embodiment of the present disclosure.
Figure 35:
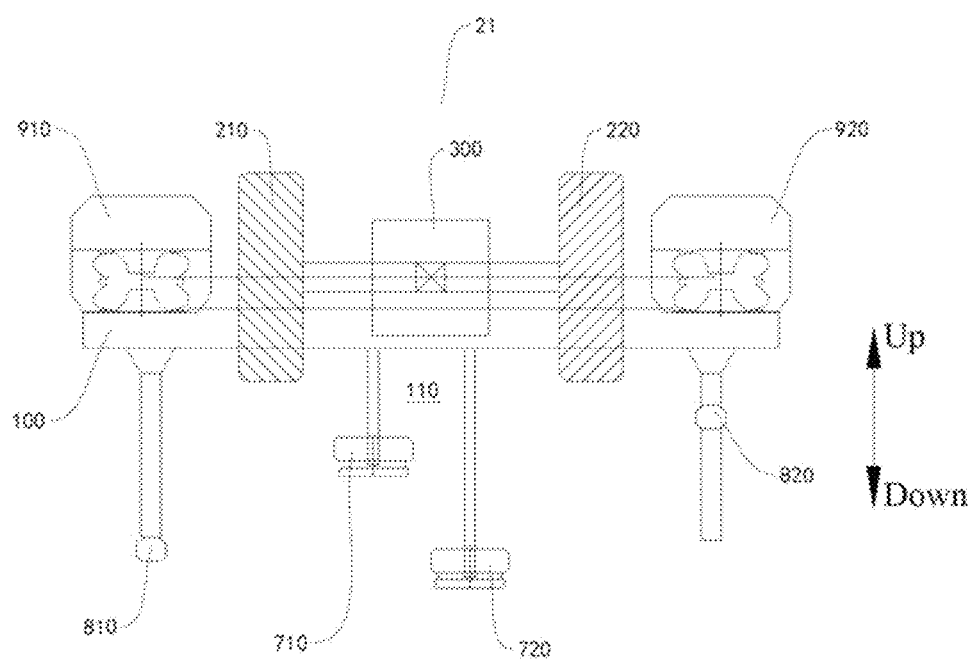
FIG. 35 is a sectional view of a bogie of a rail vehicle according to another embodiment of the present disclosure.
Figure 36:
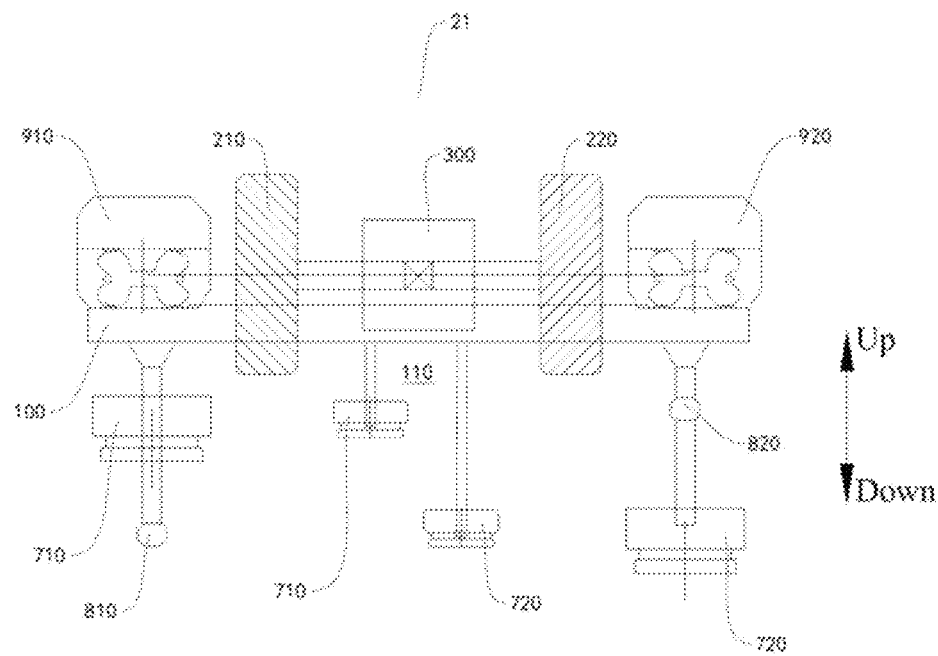
FIG. 36 is a sectional view of a bogie of a rail vehicle according to another embodiment of the present disclosure.

In some embodiments of the present disclosure, as shown in FIG. 34 to FIG. 36, a first collector shoe 810 is located below each first horizontal wheel 710, and a second collector shoe 820 is located above each second horizontal wheel 720. Therefore, collector shoes are arranged vertically according to different polarities of a collected current. For example, a collector shoe arranged above is connected to a positive electrode of the current, and a collector shoe arranged below is connected to a negative electrode of the current on an opposite side, so as to facilitate space distribution and improvement in safety of the collected current.

For example, the first horizontal wheel 710 may fit in on the outer side surface of the first rail beam 12 and the second horizontal wheel 720 may fit in on the outer side surface of the second rail beam 13 (as shown in FIG. 34). Alternatively, the first horizontal wheel 710 may fit in on the inner side surface of the first rail beam 12 and the second horizontal wheel 720 may fit in on the inner side surface of the second rail beam 13 (as shown in FIG. 35). A plurality of first horizontal wheels 710 may further fit in on the inner side surface and the outer side surface of the first rail beam 12 respectively and a plurality of second horizontal wheels 720 may further fit in on the inner side surface and the outer side surface of the second rail beam 13 respectively (as shown in FIG. 36). The first horizontal wheel 710 fitting in on the inner side surface of the first rail beam 12 and the second horizontal wheel 720 fitting in on the inner side surface of the second rail beam 13 are located at a same height or located at different heights.

In some embodiments of the present disclosure, as shown in FIG. 37 to FIG. 41, there is a plurality of first horizontal wheels 710 spaced apart along an up and down direction and the first collector shoe 810 is located between neighboring first horizontal wheels 710 in the up and down direction. There is a plurality of second horizontal wheels 720 spaced apart along the up and down direction and the second collector shoe 820 is located between neighboring second horizontal wheels 720 in the up and down direction. Therefore, space distribution and stabilization of the entire structure may be facilitated.

Figure 37:
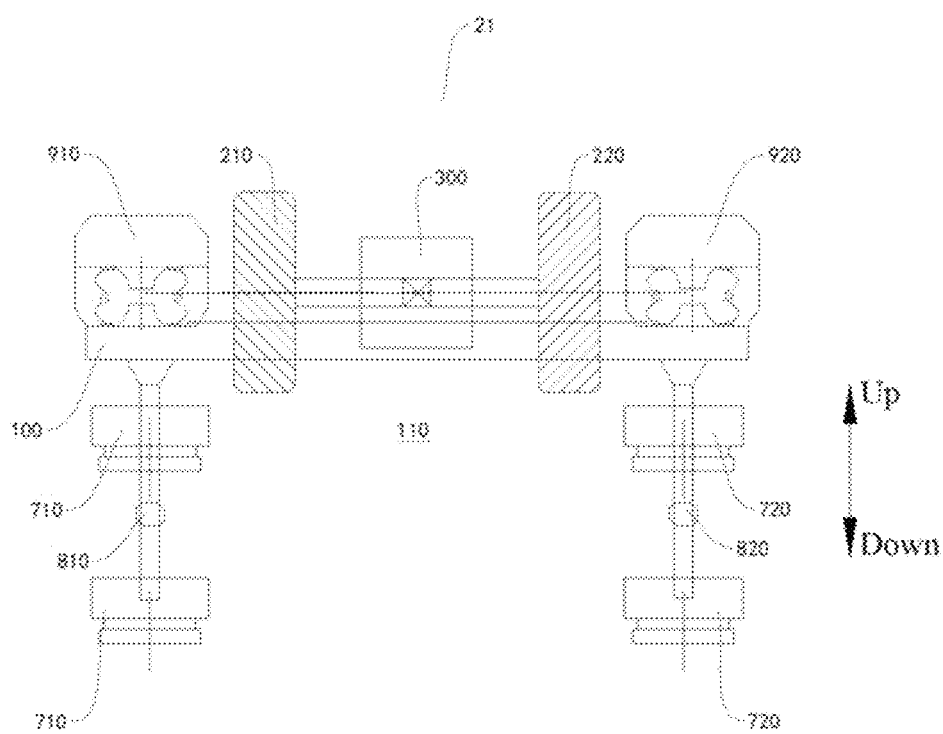
FIG. 37 is a sectional view of a bogie of a rail vehicle according to another embodiment of the present disclosure.
Figure 38:
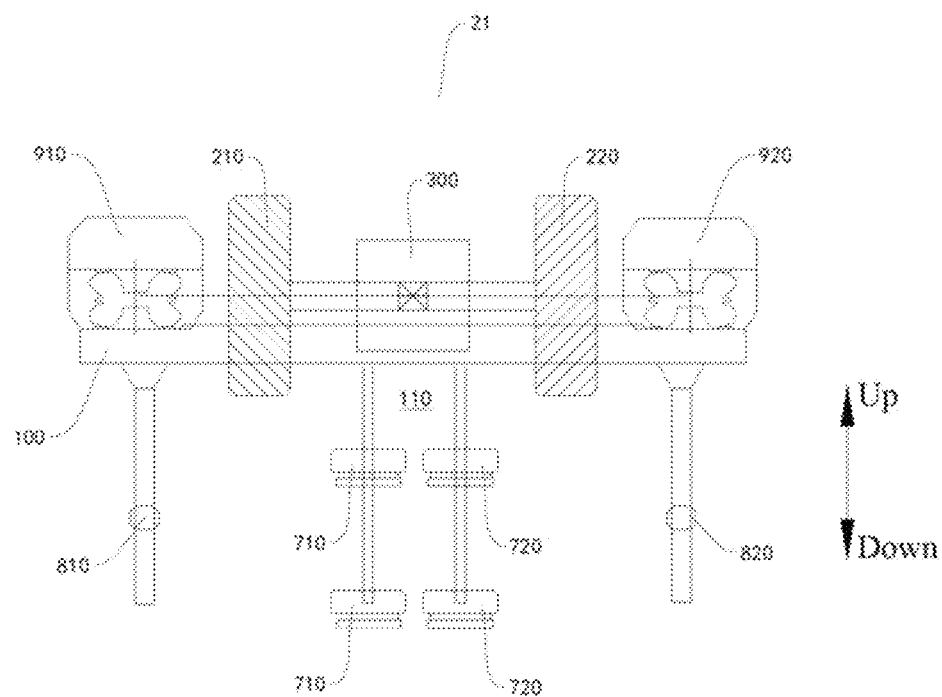
FIG. 38 is a sectional view of a bogie of a rail vehicle according to another embodiment of the present disclosure.
Figure 39:
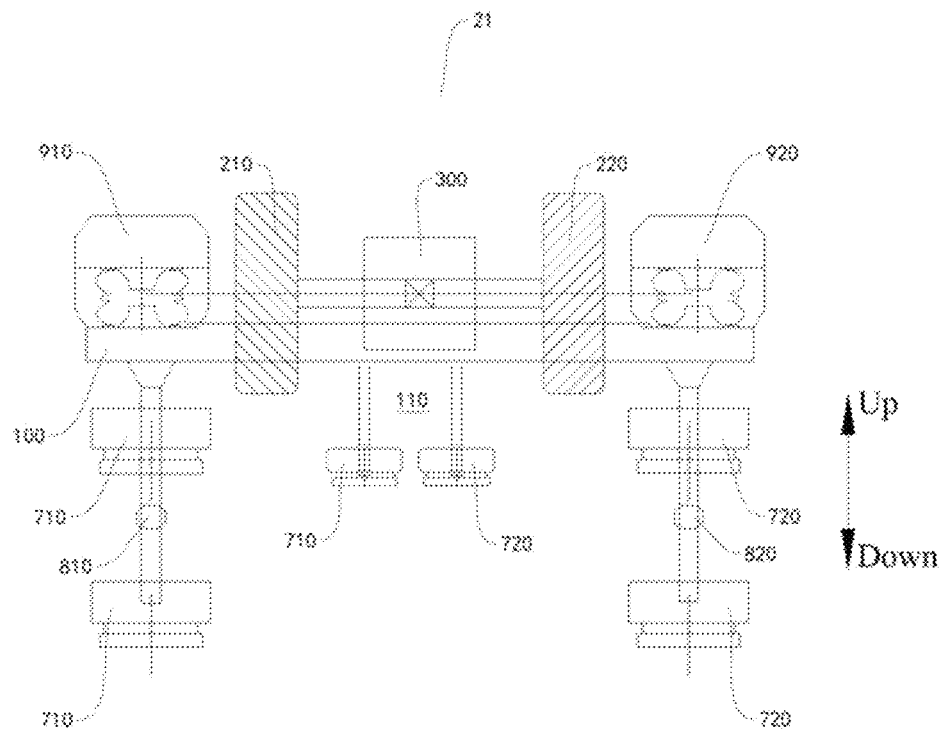
FIG. 39 is a sectional view of a bogie of a rail vehicle according to another embodiment of the present disclosure.
Figure 40:
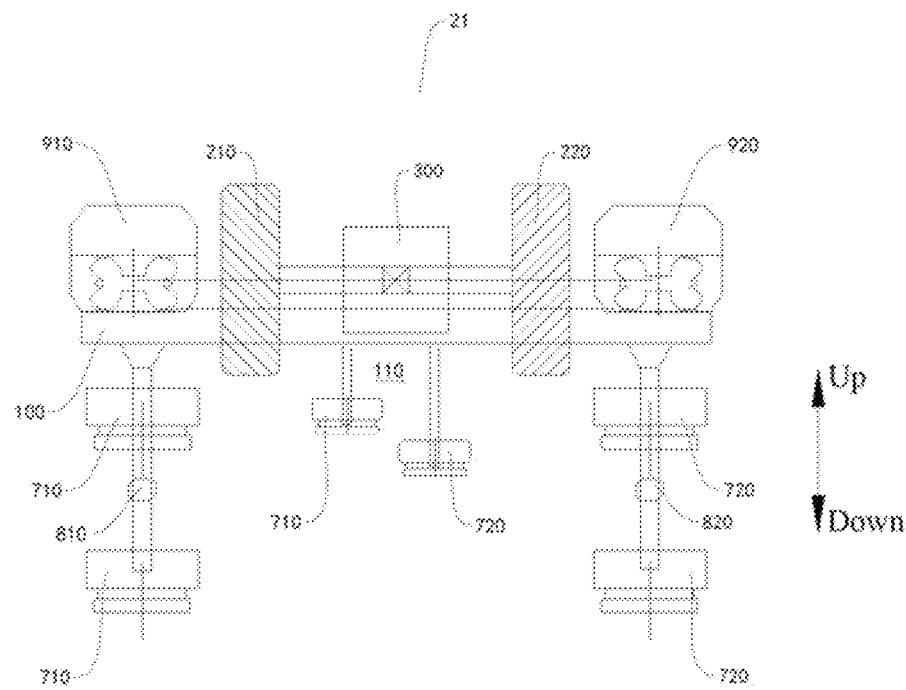
FIG. 40 is a sectional view of a bogie of a rail vehicle according to another embodiment of the present disclosure.
Figure 41:
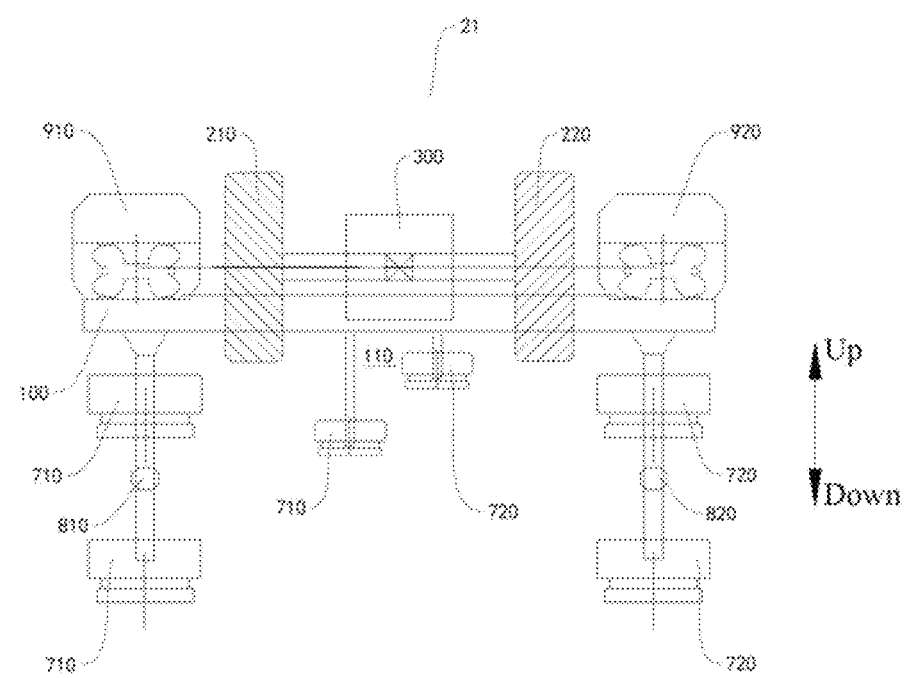
FIG. 41 is a sectional view of a bogie of a rail vehicle according to another embodiment of the present disclosure.

For example, a plurality of first horizontal wheels 710 may fit in on the outer side surface of the first rail beam 12 and a plurality of second horizontal wheels 720 may fit in on the outer side surface of the second rail beam 13 (as shown in FIG. 37). Alternatively, a plurality of first horizontal wheels 710 may fit in on the inner side surface of the first rail beam 12 and a plurality of second horizontal wheels 720 may fit in on the inner side surface of the second rail beam 13 (as shown in FIG. 38). A plurality of first horizontal wheels 710 may further fit in on the inner side surface and the outer side surface of the first rail beam 12 respectively and a plurality of second horizontal wheels 720 may further fit in on the inner side surface and the outer side surface of the second rail beam 13 respectively (as shown in FIG. 39 to FIG. 41). The first horizontal wheel 710 fitting in on the inner side surface of the first rail beam 12 and the second horizontal wheel 720 fitting in on the inner side surface of the second rail beam 13 are located at a same height or located at different heights. The first collector shoe 810 is located, in the up and down direction, between neighboring first horizontal wheels 710 fitting in on the outer side surface of the first rail beam 12, and the second collector shoe 820 is located, in the up and down direction, between neighboring second horizontal wheels 720 fitting in on the outer side surface of the second rail beam 13.

Figure 69:
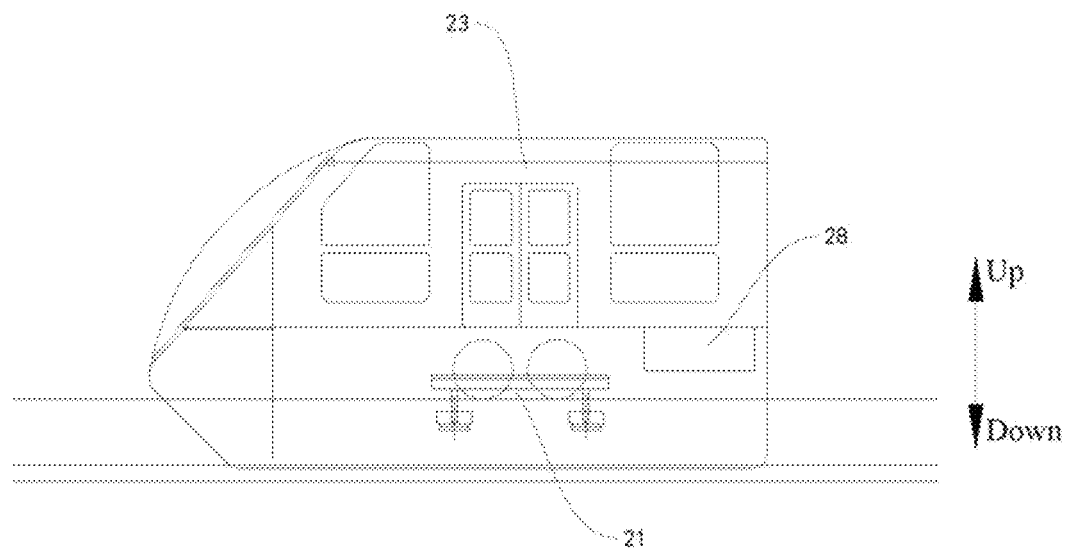
FIG. 69 is a partial schematic structural diagram of a rail transport system according to another embodiment of the present disclosure.

In another embodiment of the present disclosure, as shown in FIG. 69, the rail transport system 1 according to this embodiment of the present disclosure may be applied to transport connection between a main line and each living community. Therefore, the volume of the rail vehicle 20 is smaller than the volume of a rail vehicle on the main line, so that a conductive rail and a collector shoe may be removed, and a power battery 28 is used for power supply. The power battery 28 supplies power to travelling of the rail vehicle 20, and certainly may also supply power to other power utilization situations of the rail vehicle 20. This may simplify the structure and power supply lines, and reduce costs.

Specifically, the power battery 28 may be disposed on a position outside the bogie 21. For example, the power battery 28 may be mounted on the bottom of the compartment 23, or may be mounted inside the compartment 23. The power battery 28 can ensure operating at a normal needed speed, and is automatically charged when passenger traffic is relatively small.

In some specific examples of the present disclosure, as shown in FIG. 42, FIG. 43, and FIG. 58 to FIG. 63, the bogie 21 further includes a first support suspension device 910 and a second support suspension device 920.

The first support suspension device 910 and the second support suspension device 920 are respectively mounted onto the bogie frame 100 and respectively connected to the vehicle body 22. The first support suspension device 910 and the second support suspension device 920 are spaced apart along the length direction of the rail 10; and in the horizontal plane, the central axis of the first support suspension device 910 and the central axis of the second support suspension device 920 are located on the central axis of the bogie frame 100 and the central axis of the bogie frame 100 equally divides the bogie frame 100 in the width direction of the rail 10.

Alternatively, the first support suspension device 910 and the second support suspension device 920 are spaced apart along the width direction of the rail 10; and in the horizontal plane, the central axis of the first support suspension device 910 and the central axis of the second support suspension device 920 are located on the central axis of the bogie frame 100 and the central axis of the bogie frame 100 equally divides the bogie frame 100 in the length direction of the rail 10.

The first support suspension device 910 and the second support suspension device 920 are used to support the vehicle body 22 and play a role of shock absorption and buffering, and the first support suspension device 910 and the second support suspension device 920 are uniformly loaded and supported, thereby ensuring stability and comfort of the rail vehicle 20. Moreover, costs are relatively low.

Figure 42:
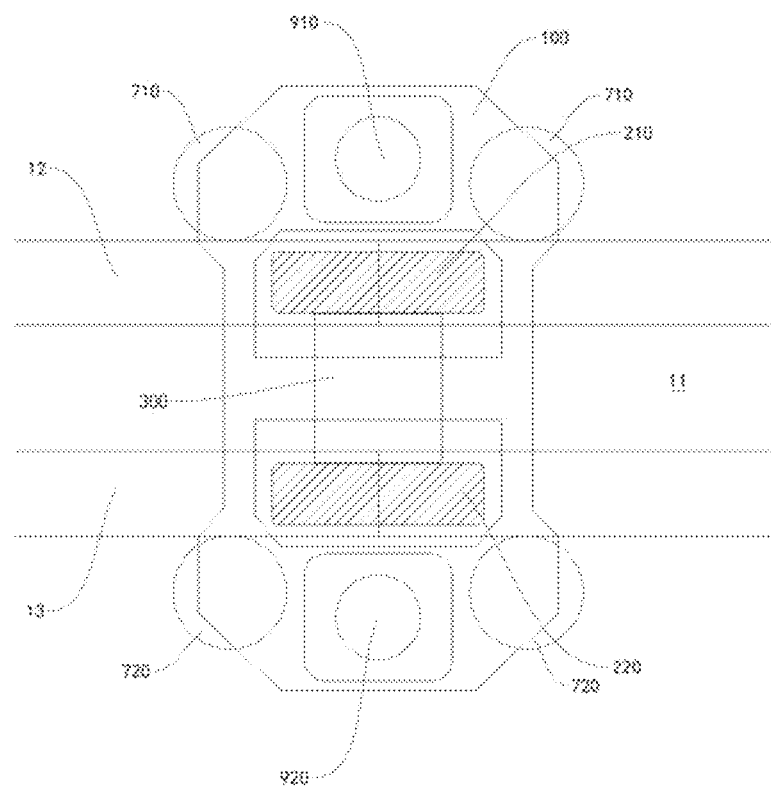
FIG. 42 is a schematic structural diagram of a bogie of a rail vehicle according to another embodiment of the present disclosure.
Figure 43:
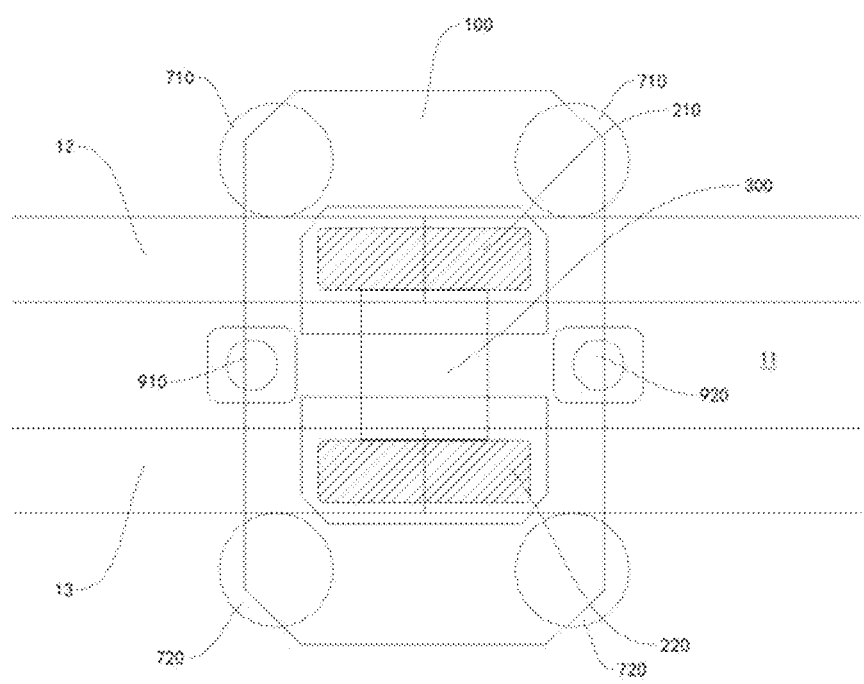
FIG. 43 is a schematic structural diagram of a bogie of a rail vehicle according to another embodiment of the present disclosure.

For example, FIG. 42 and FIG. 43 show the bogie 21 having two running wheels and two support suspension devices, and the first support suspension device 910 and the second support suspension device 920 may be spaced apart along the length direction of the rail 10 and located on the central axis equally dividing the bogie frame 100 in the width direction of the rail 10 (as shown in FIG. 43). Alternatively, the first support suspension device 910 and the second support suspension device 920 may be spaced apart along the width direction of the rail 10 and located on the central axis equally dividing the bogie frame 100 in the length direction of the rail 10 (as shown in FIG. 42).

Figure 58:
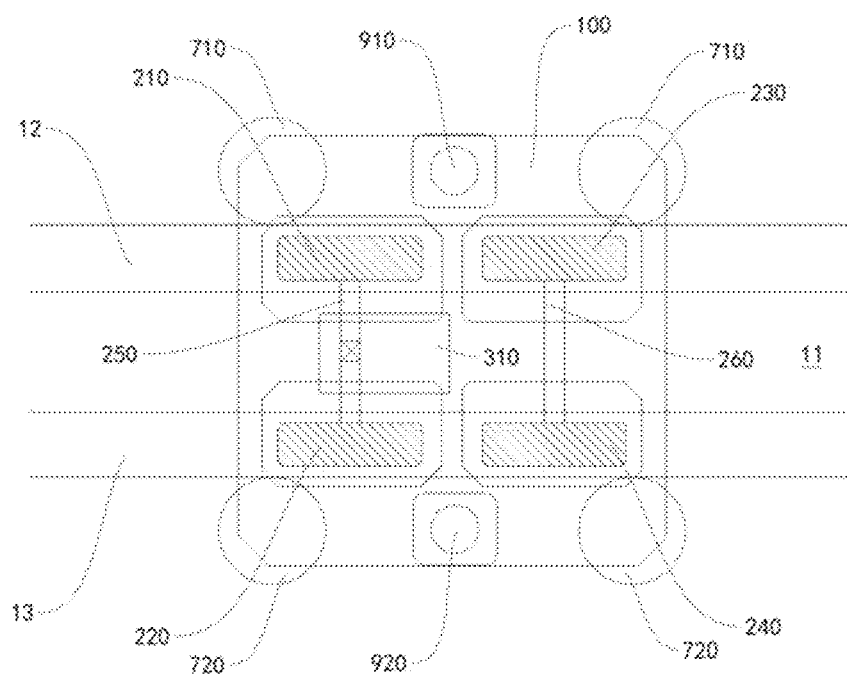
FIG. 58 is a schematic structural diagram of a bogie of a rail vehicle according to another embodiment of the present disclosure.
Figure 59:
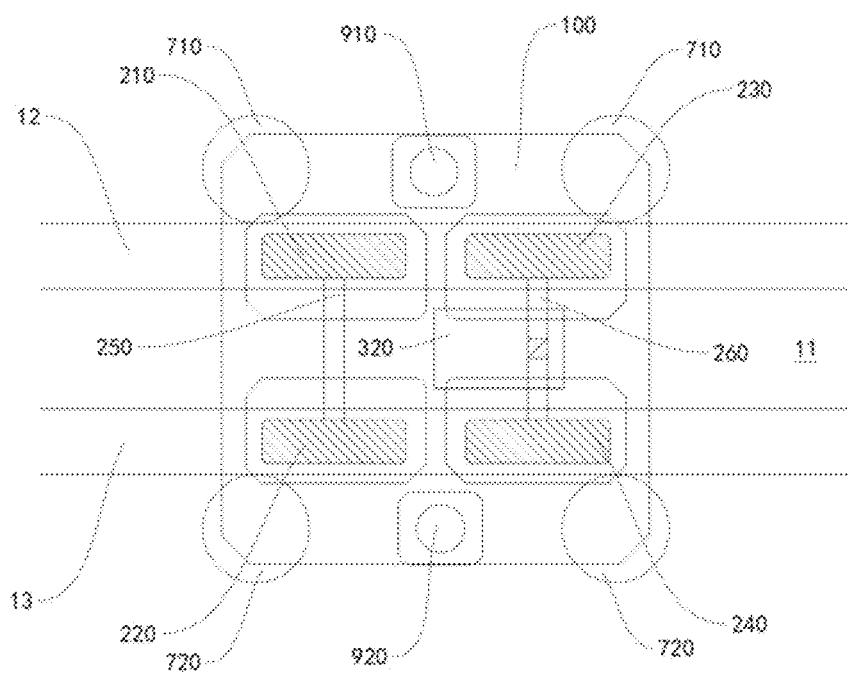
FIG. 59 is a schematic structural diagram of a bogie of a rail vehicle according to another embodiment of the present disclosure.
Figure 60:
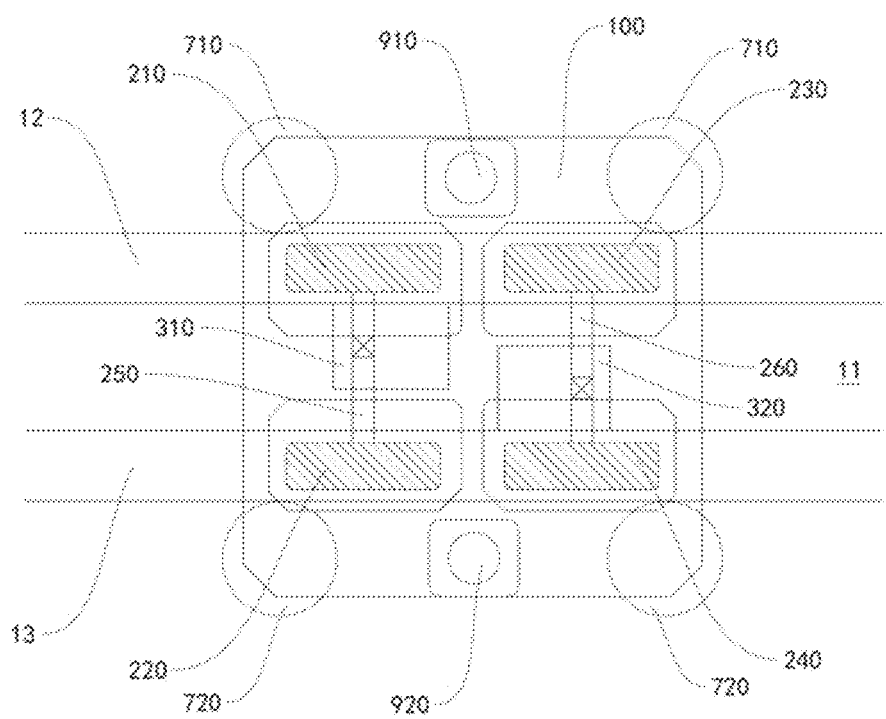
FIG. 60 is a schematic structural diagram of a bogie of a rail vehicle according to another embodiment of the present disclosure.
Figure 61:
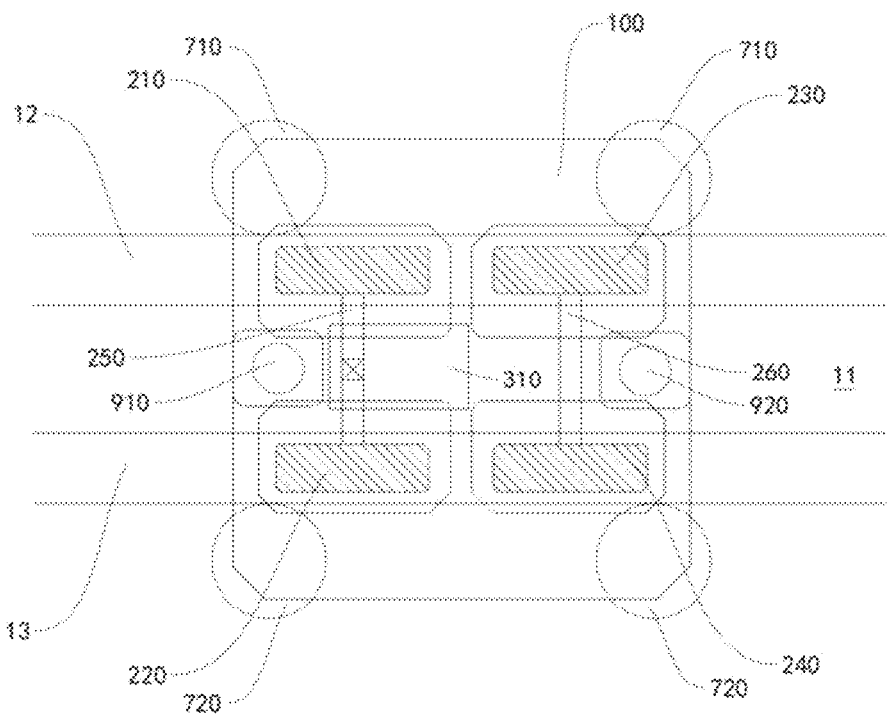
FIG. 61 is a schematic structural diagram of a bogie of a rail vehicle according to another embodiment of the present disclosure.
Figure 62:
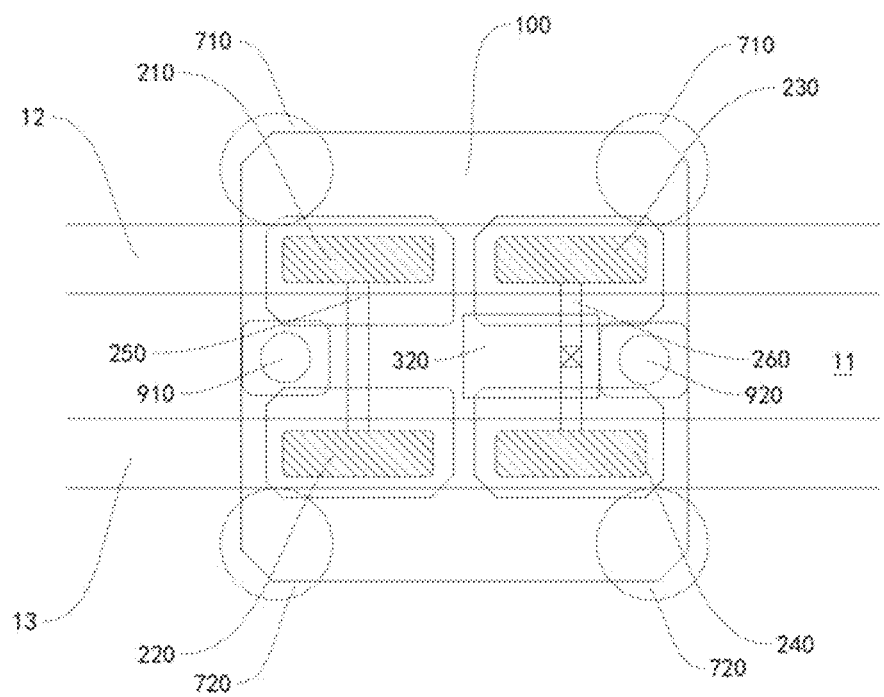
FIG. 62 is a schematic structural diagram of a bogie of a rail vehicle according to another embodiment of the present disclosure.
Figure 63:
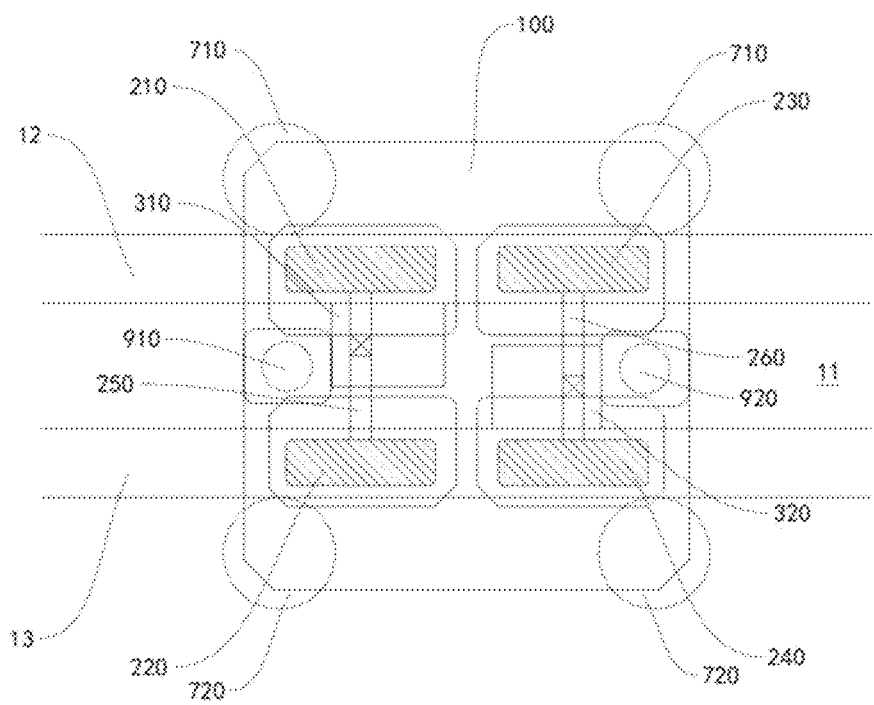
FIG. 63 is a schematic structural diagram of a bogie of a rail vehicle according to another embodiment of the present disclosure.

FIG. 58 to FIG. 63 show the bogie 21 having four running wheels and two support suspension devices, and the first support suspension device 910 and the second support suspension device 920 may be spaced apart along the length direction of the rail 10 and located on the central axis equally dividing the bogie frame 100 in the width direction of the rail 10 (as shown in FIG. 61 to FIG. 63). Alternatively, the first support suspension device 910 and the second support suspension device 920 may be spaced apart along the width direction of the rail 10 and located on the central axis equally dividing the bogie frame 100 in the length direction of the rail 10 (as shown in FIG. 58 to FIG. 60).

The at least one driving device may include a first driving device 310, and the first driving device 310 is disposed between the first running wheel 210 and the second running wheel 220 (as shown in FIG. 58 and FIG. 61). The at least one driving device may include a second driving device 320, and the second driving device 320 is disposed between the third running wheel 230 and the fourth running wheel 240 (as shown in FIG. 59 and FIG. 62). The at least one driving device may include two driving devices respectively defined as a first driving device 310 and a second driving device 320, the first driving device 310 is disposed between the first running wheel 210 and the second running wheel 220, the second driving device 320 is disposed between the third running wheel 230 and the fourth running wheel 240, the first driving device 310 is closer to the first running wheel 210 than the second running wheel 220, and the second driving device 320 is closer to the fourth running wheel 240 than the third running wheel 230 (as shown in FIG. 60 and FIG. 63).

In some other embodiments of the present disclosure, as shown in FIG. 44 and FIG. 64 to FIG. 66, the bogie 21 further includes a first support suspension device 910, a second support suspension device 920, a third support suspension device 930, and a fourth support suspension device 940.

The first support suspension device 910, the second support suspension device 920, the third support suspension device 930, and the fourth support suspension device 940 are respectively mounted onto the bogie frame 100 and respectively connected to the vehicle body 22. The first support suspension device 910, the second support suspension device 920, the third support suspension device 930, and the fourth support suspension device 940 are respectively located at four corners of a rectangle in the horizontal plane, and the rectangle is symmetrical about the center of the bogie frame 100, that is, the symmetrical center of the rectangle is the center of the bogie frame 100. In other words, in the horizontal plane, the rectangle is rotated by 180° around the center of the bogie frame 100, and a rectangle formed after rotation coincides with the rectangle before rotation. The first support suspension device 910, the second support suspension device 920, the third support suspension device 930 and the fourth support suspension device 940 are used to support the vehicle body 22 and play a role of shock absorption and buffering, and first support suspension device 910, the second support suspension device 920, the third support suspension device 930 and the fourth support suspension device 940 are uniformly loaded and supported, thereby improving stability and comfort of the rail vehicle 20.

Figure 44:
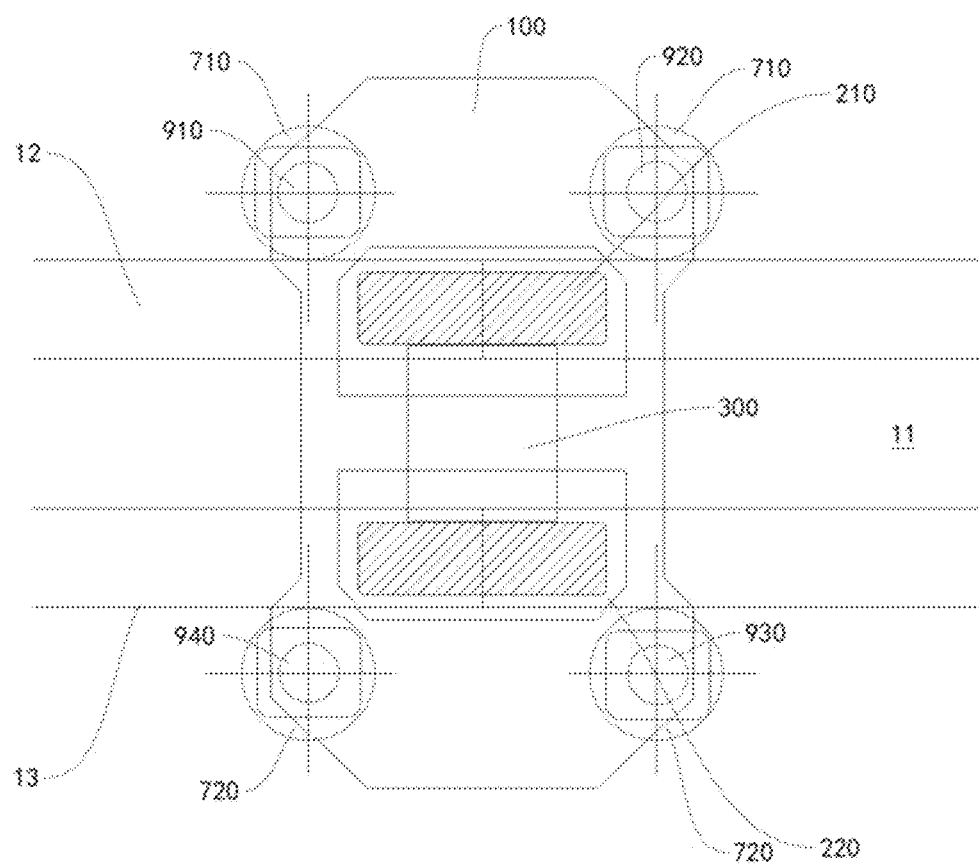
FIG. 44 is a schematic structural diagram of a bogie of a rail vehicle according to another embodiment of the present disclosure.

For example, FIG. 44 shows the bogie 21 having two running wheels and four support suspension devices, the first support suspension device 910, the second support suspension device 920, the third support suspension device 930, and the fourth support suspension device 940 are arranged at four corners of a rectangle, and the symmetrical center of the rectangle is the center of the bogie frame 100.

Figure 64:
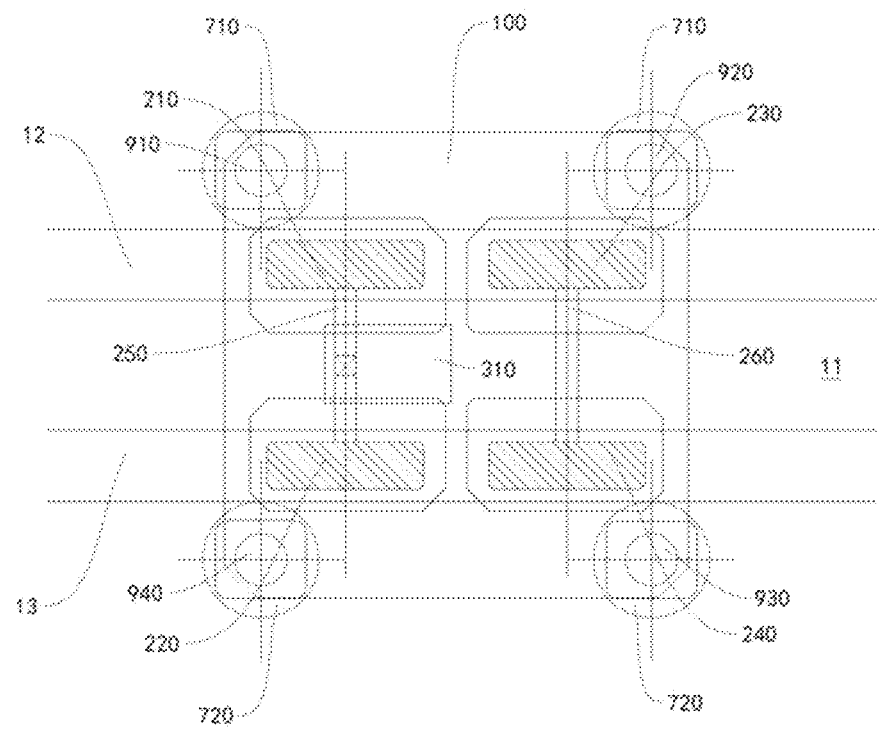
FIG. 64 is a schematic structural diagram of a bogie of a rail vehicle according to another embodiment of the present disclosure.
Figure 65:
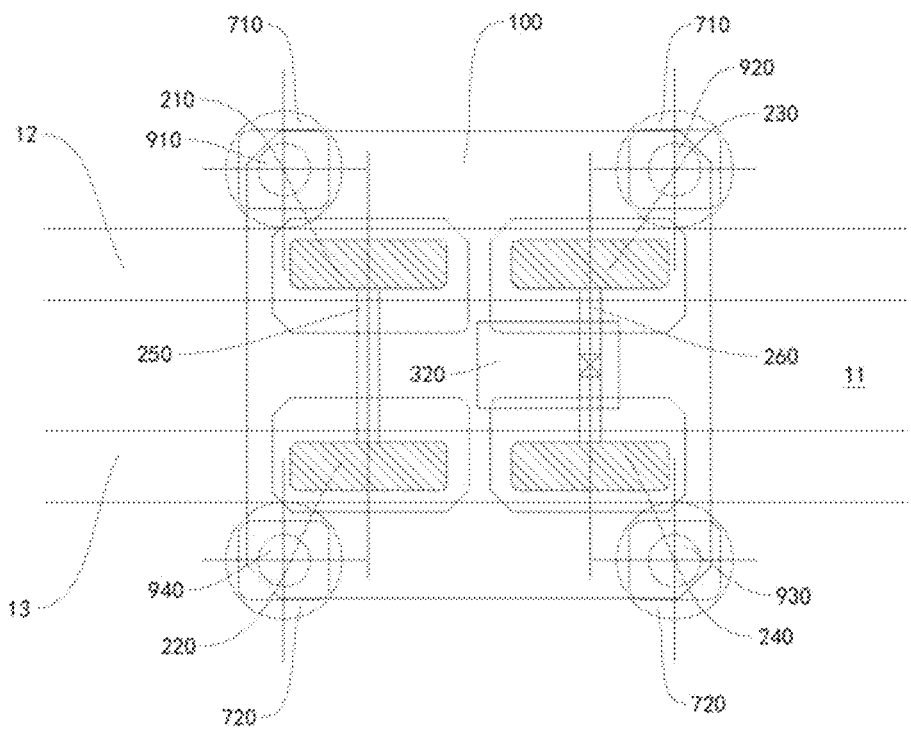
FIG. 65 is a schematic structural diagram of a bogie of a rail vehicle according to another embodiment of the present disclosure.

FIG. 64 and FIG. 65 show the bogie 21 having four running wheels and four support suspension devices, the first support suspension device 910, the second support suspension device 920, the third support suspension device 930, and the fourth support suspension device 940 are arranged at four corners of a rectangle, and the symmetrical center of the rectangle is the center of the bogie frame 100.

Figure 66:
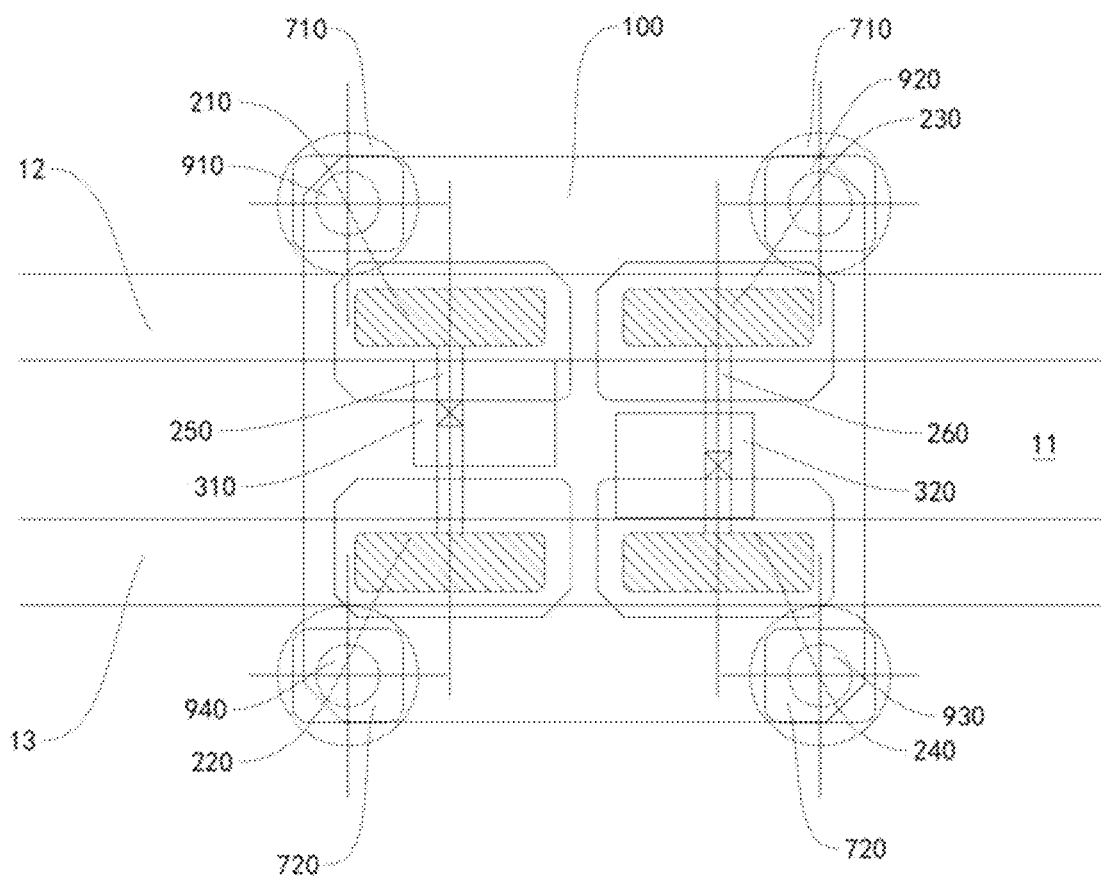
FIG. 66 is a schematic structural diagram of a bogie of a rail vehicle according to another embodiment of the present disclosure.

The at least one driving device may include a first driving device 310, and the first driving device 310 is disposed between the first running wheel 210 and the second running wheel 220 (as shown in FIG. 64). The at least one driving device may include a second driving device 320, and the second driving device 320 is disposed between the third running wheel 230 and the fourth running wheel 240 (as shown in FIG. 65). The at least one driving device may include two driving devices respectively defined as a first driving device 310 and a second driving device 320, the first driving device 310 is disposed between the first running wheel 210 and the second running wheel 220, the second driving device 320 is disposed between the third running wheel 230 and the fourth running wheel 240, the first driving device 310 is closer to the first running wheel 210 than the second running wheel 220, and the second driving device 320 is closer to the fourth running wheel 240 than the third running wheel 230 (as shown in FIG. 66).

In some embodiments of the present disclosure, as shown in FIG. 10, FIG. 42 to FIG. 44, FIG. 46 to FIG. 49, and FIG. 58 to FIG. 66, there are two first horizontal wheels 710 spaced apart along the length direction of the first rail beam 12, and There are two second horizontal wheels 720 spaced apart along the length direction of the second rail beam 13. The central axes of the two first horizontal wheels 710 and the central axes of the two second horizontal wheels 720 are respectively located at four corners of a rectangle in the horizontal plane, and the rectangle is symmetrical about the center of the bogie frame 100, that is, the symmetrical center of the rectangle is the center of the bogie frame 100. In other words, in the horizontal plane, the rectangle is rotated by 180° around the center of the bogie frame 100, and a rectangle formed after rotation coincides with the rectangle before rotation. Therefore, four horizontal wheels may be uniformly arranged in the horizontal plane, to ensure stability of the horizontal wheels to drive the rail vehicle 20 during steering and straight-line travelling.

A person skilled in the art may understand that, each of the foregoing rectangles is an assumed virtual rectangle, the rectangle is to clearly express an arrangement manner of the first support suspension device 910, the second support suspension device 920, the third support suspension device 930, and the fourth support suspension device 940 in the horizontal plane, and an arrangement manner of the two first horizontal wheels 710 and the two second horizontal wheels 720 in the horizontal plane.

In the example shown in FIG. 44 and FIG. 64 to FIG. 66, the central axes of the two first horizontal wheels 710 and the central axes of the two second horizontal wheels 720 may respectively coincide with the central axis of the first support suspension device 910, the central axis of the second support suspension device 920, the central axis of the third support suspension device 930, and the central axis of the fourth support suspension device 940.

Figure 70:
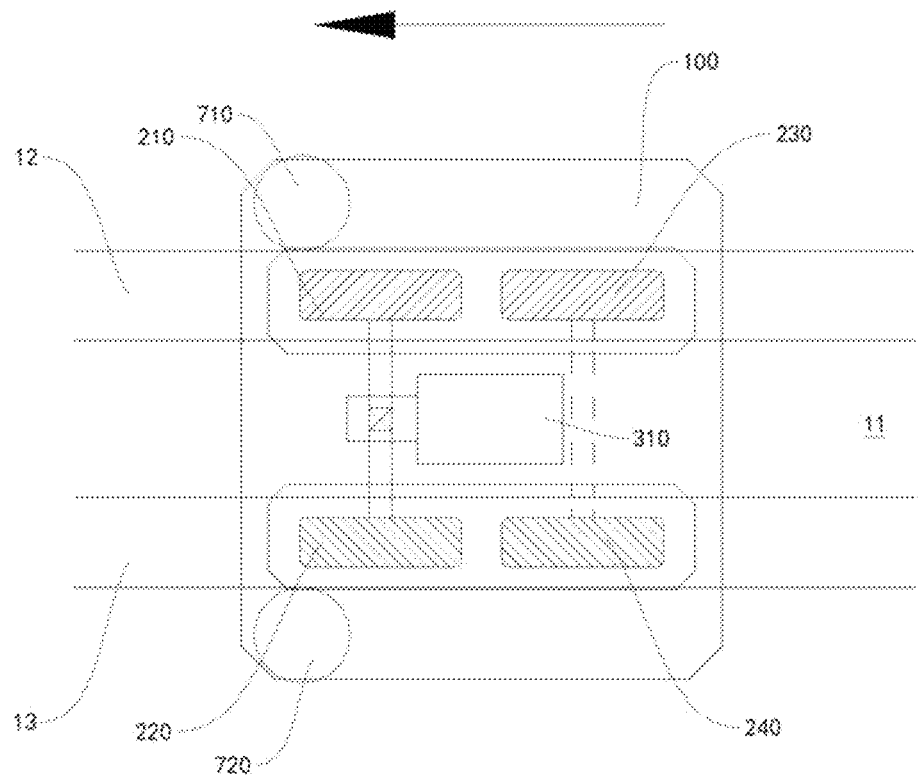
FIG. 70 is a schematic structural diagram of a bogie of a rail vehicle according to another embodiment of the present disclosure.

In some embodiments of the present disclosure, as shown in FIG. 70, there are one first horizontal wheel 710 and one second horizontal wheel 720 respectively, the first horizontal wheel 710 and the second horizontal wheel 720 are spaced apart along the width direction of the rail 10, and the first horizontal wheel 710 and the second horizontal wheel 720 deviate from the center of the bogie frame 100 to a travelling direction of the rail vehicle 20 in the length direction of the rail 10 (an arrow in FIG. 70 shows the travelling direction of the rail vehicle 20). In other words, the first horizontal wheel 710 and the second horizontal wheel 720 deviate from the center of the bogie frame 100 in the length direction of the rail 10 and deviation directions of the first horizontal wheel 710 and the second horizontal wheel 720 are consistent with the travelling direction of the rail vehicle 20. During a travelling process of the rail vehicle 20, a front horizontal wheel in the travelling direction plays a main guiding function, and during bending, a rear horizontal wheel in the travelling direction interferes with the bogie frame 100 to generate a side effect, so that for a one-way rail transport system 1 or a circular rail transport system 1, the rear horizontal wheel in the travelling direction is removed, thereby eliminating interference with the bogie frame 100 during bending, reducing the weight of the rail vehicle 20, and reducing costs of the rail vehicle 20.

Figure 45:
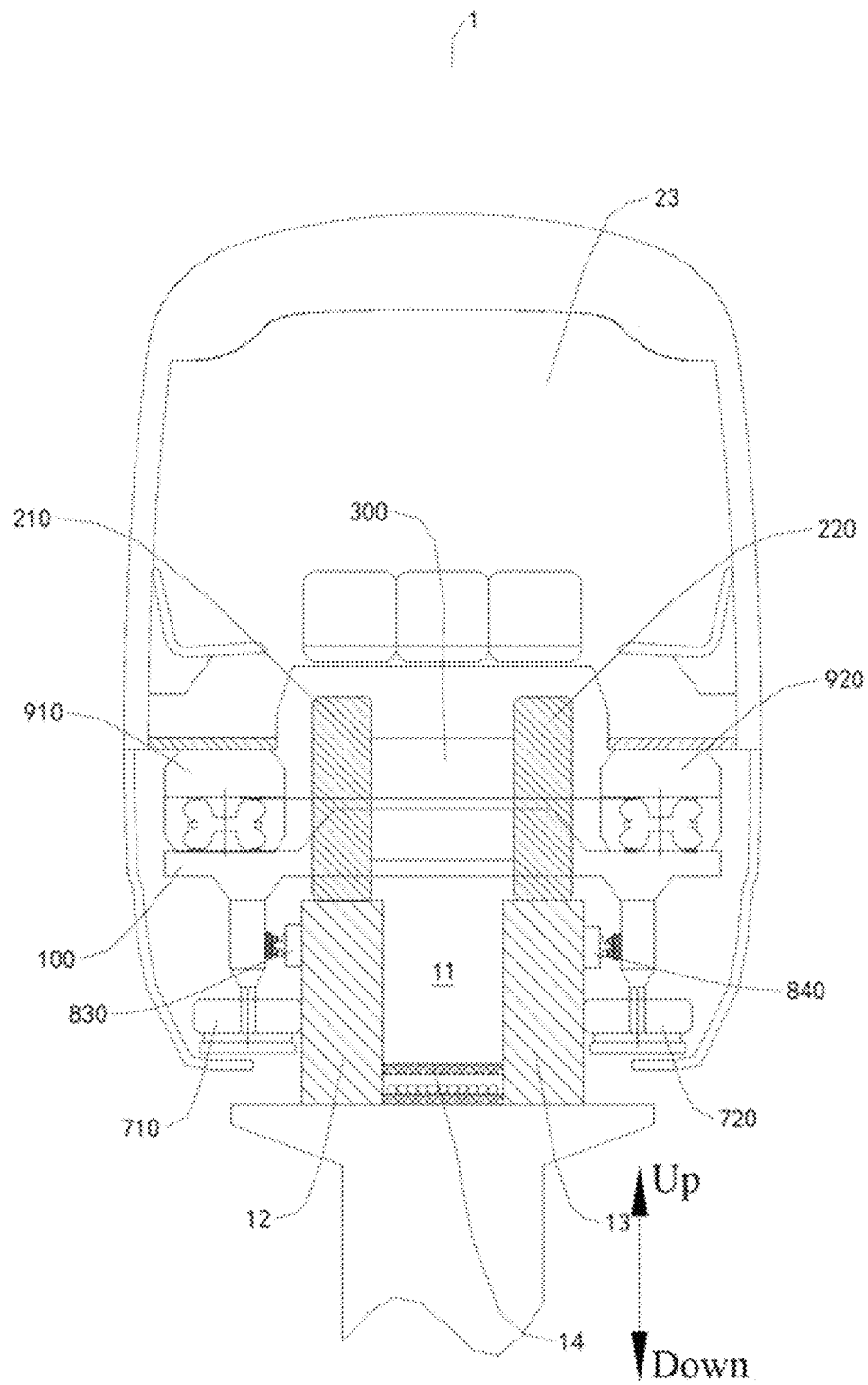
FIG. 45 is a sectional view of a rail transport system according to another embodiment of the present disclosure.

In some specific examples of the present disclosure, as shown in FIG. 45, for the bogie 21 having two running wheels, and the outer diameter of a first running wheel 210 and the outer diameter of a second running wheel 220 are the same and are 900 to 1100 millimeters. For the bogie 21 having four running wheels, and the outer diameter of a first running wheel 210, the outer diameter of a second running wheel 220, the outer diameter of a third running wheel 230, and the outer diameter of a fourth running wheel 240 are the same and are 900 to 1100 millimeters. Therefore, an effect of a running wheel on the space in the compartment 23 may be reduced as much as possible in a case of improving the weight bearing capability of the running wheel, thereby improving the passenger capacity.

The rail transport system 1 according to an embodiment of the present disclosure is described below with reference to accompanying drawings.

As shown in FIG. 71 to FIG. 99, the rail transport system 1 according to this embodiment of the present disclosure includes a rail 10 and a rail vehicle 20.

The rail 10 includes a steering portion 111 and a travelling portion 112, the travelling portion 112 is connected to the top of the steering portion 111, and a first recess is constructed on the travelling portion 112 to form an escape passage 11. The rail vehicle 20 includes a bogie 21 and a vehicle body 22, the bogie 21 movably straddles the rail 10, and the vehicle body 22 is connected to the bogie 21 and pulled by the bogie 21 to travel along the rail 10. The bogie 21 straddles the steering portion 111 and the travelling portion 112, the bogie 21 fits in with an inner bottom surface of the escape passage 11 of the travelling portion 112 and the steering portion 111, and the bogie 21 travels by using the travelling portion 112 and is steered by using the steering portion 111.

Herein, a person skilled in the art needs to understand that, both the steering portion 111 and the travelling portion 112 are parts of the rail 10, the steering portion 111 and the travelling portion 112 may be integrally formed, and the escape passage 11 is disposed on the travelling portion 112. To be specific, the escape passage 11 is disposed on the rail 10, other than disposed on another additional component on the rail 10. To be specific, compared with the structure of the escape passage in the related art, in the rail transport system 1 according to this embodiment of the present disclosure, the rail 10 does not need to be provided with other components such as a frame and a floor, and the escape passage 11 is formed on the rail 10.

In the rail transport system 1 according to this embodiment of the present disclosure, the escape passage 11 is disposed on the rail 10, and when an emergency occurs, passengers can be evacuated in time by using the escape passage 11. Moreover, because the escape passage 11 is disposed on the rail 10, no other additional structure needs to be added to the rail 10, and only the escape passage 11 needs to be disposed on the rail 10 along the length direction of the rail 10. Therefore, the amount of work of the rail transport system 1 may be greatly reduced. On one hand, costs are reduced, and on the other hand, occupied space is reduced. Moreover, the weight borne by the rail 10 does not need to be increased, which is favorable to stability of the rail 10. Therefore, the rail transport system 1 according to this embodiment of the present disclosure has advantages such as facilitation of evacuation of passengers in an emergency, low costs, small occupied space, small rail weight bearing, and high stability.

The rail transport system 1 according to an embodiment of the present disclosure is described below with reference to accompanying drawings.

As shown in FIG. 71 to FIG. 99, the rail transport system 1 according to this embodiment of the present disclosure includes a rail 10 and a rail vehicle 20.

The rail 10 includes a steering portion 111 and a travelling portion 112, the travelling portion 112 is connected to the top of the steering portion 111, and a first recess is constructed on the travelling portion 112 to form an escape passage 11. The rail vehicle 20 includes a bogie 21 and a vehicle body 22, the bogie 21 movably straddles the rail 10, and the vehicle body 22 is connected to the bogie 21 and pulled by the bogie 21 to travel along the rail 10. The bogie 21 straddles the steering portion 111 and the travelling portion 112, the bogie 21 fits in with an inner bottom surface of the escape passage 11 of the travelling portion 112 and the steering portion 111, and the bogie 21 travels by using the travelling portion 112 and is steered by using the steering portion 111.

It can be understood that that, both the steering portion 111 and the travelling portion 112 are parts of the rail 10, the steering portion 111 and the travelling portion 112 may be integrally formed, and the escape passage 11 is disposed on the travelling portion 112. To be specific, the escape passage 11 is disposed on the rail 10, other than disposed on another additional component on the rail 10. To be specific, compared with the structure of the escape passage in the related art, in the rail transport system 1 according to this embodiment of the present disclosure, the rail 10 does not need to be provided with other components such as a frame and a floor, and the escape passage 11 is formed on the rail 10.

In the rail transport system 1 according to this embodiment of the present disclosure, the escape passage 11 is disposed on the rail 10, and when an emergency occurs, passengers can be evacuated in time by using the escape passage 11. Moreover, because the escape passage 11 is disposed on the rail 10, no other additional structure needs to be added to the rail 10, and only the escape passage 11 needs to be disposed on the rail 10 along the length direction of the rail 10. Therefore, the amount of work of the rail transport system 1 may be greatly reduced. On one hand, costs are reduced, and on the other hand, occupied space is reduced. Moreover, the weight borne by the rail 10 does not need to be increased, which is favorable to stability of the rail 10. Therefore, the rail transport system 1 according to this embodiment of the present disclosure has advantages such as facilitation of evacuation of passengers in an emergency, low costs, small occupied space, small rail weight bearing, and high stability.

The rail transport system 1 according to an embodiment of the present disclosure is described below with reference to accompanying drawings.

As shown in FIG. 71 to FIG. 99, the rail transport system 1 according to this embodiment of the present disclosure includes a rail 10 and a rail vehicle 20.

A bogie 21 is provided with a first dodge groove 120 and a second dodge groove 130 used to respectively dodge two side walls of the escape passage 11. Therefore, running of the bogie 21 on the rail 10 is more stable, thereby improving stability of the rail vehicle 20 during travelling, and the entire height of the rail vehicle 20 may be reduced.

In some embodiments of the present disclosure, as shown in FIG. 71 to FIG. 74 and FIG. 1 to FIG. 3, a vehicle body 22 includes a plurality of compartments 23 hinged sequentially along a length direction of a rail 10, and in the length direction of the rail 10, a surface that is of a compartment 23 at at least one end of the vehicle body 22 and that faces away from an adjacent compartment 23 is provided with an escape door 24 that can be opened and closed. In other words, the escape door 24 is disposed on an end surface of at least one of two compartments 23 located at two ends of the vehicle body 22. To be specific, the escape door 24 is disposed on the compartment 23 at the at least one end of the vehicle body 22 in the length direction of the rail 10. Specifically, the escape door 24 is disposed on a first end surface of the compartment 23 at the at least one end, and the first end surface is a surface away from the adjacent compartment. The escape door 24 has a first end 31 and a second end 32, and the first end 31 of the escape door 24 is pivotably mounted onto the corresponding compartment 23. When opened, the escape door 24 is slant relative to a horizontal plane, and the second end 32 of the escape door 24 tilts downward and stretches into an escape passage 11. In this way, when an emergency occurs, a rail vehicle 20 is actively or passively parked, the escape door 24 is opened, and a lower end stretches into the escape passage 11. Passengers in the compartment 23 can slide downward to the escape passage 11 through the escape door 24, and then be evacuated from the escape passage 11.

Specifically, the first end 31 of the escape door 24 is disposed adjacent to the vehicle bottom, and the second end 32 of the escape door 24 is disposed adjacent to the vehicle top when the escape door 24 is closed. In other words, when the escape door 24 is closed, the second end 32 of the escape door 24 is located above the first end 31 of the escape door 24; and when the escape door 24 is opened, the second end 32 of the escape door 24 is located below the first end 31 of the escape door 24. Therefore, the escape door 24 is converted from a closed state to an opened state through downward flipping. A flipping-type structure is used for the escape door 24, and the passenger in the vehicle can quickly open the escape door 24 in need of only a simple operation, to effectively improve escape efficiency.

Further, an inner surface of the escape door 24 is provided with a slide rail to help a passenger slide on the slide rail to the escape passage 11. It may be understood herein that, the inner surface of the escape door 24 is a surface facing the inside of the vehicle when the escape door 24 is closed.

Figure 96:
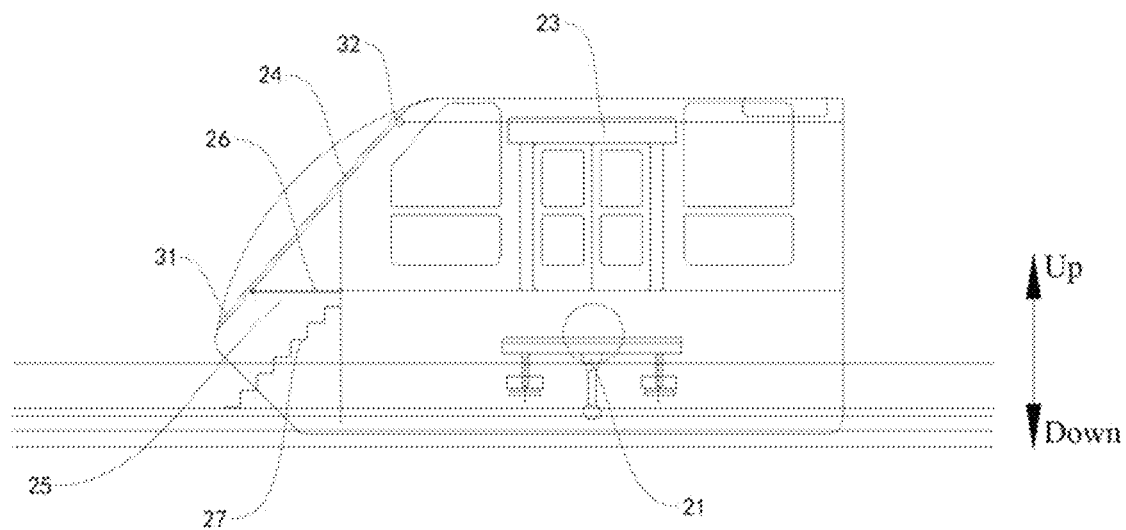
FIG. 96 is a partial schematic structural diagram of a rail transport system according to another embodiment of the present disclosure, where an escape door is in a closed state.
Figure 97:
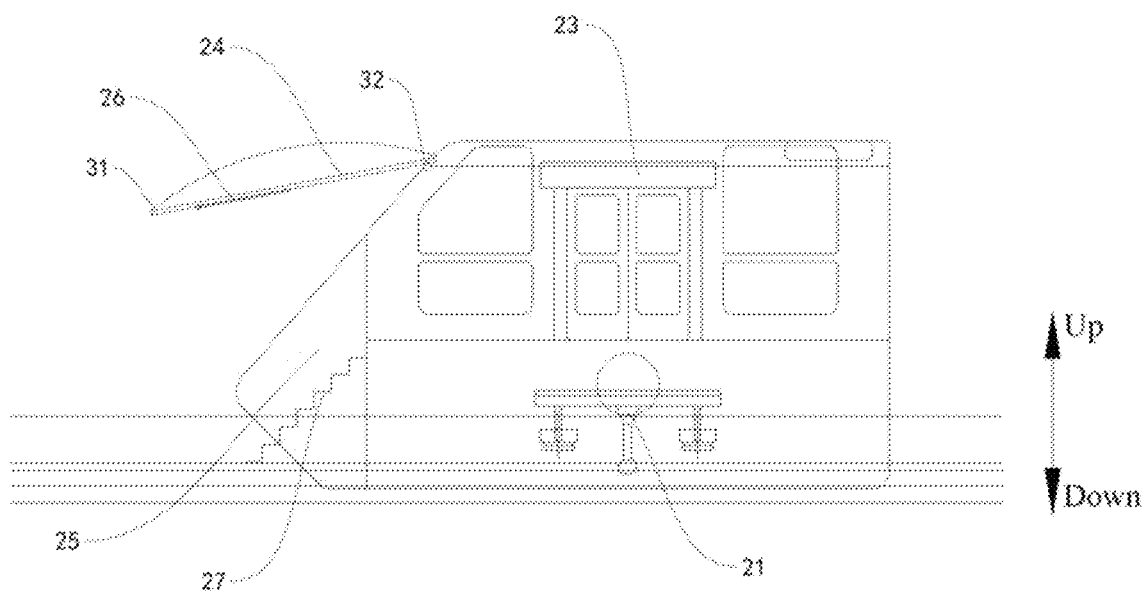
FIG. 97 is a partial schematic structural diagram of a rail transport system according to another embodiment of the present disclosure, where an escape door is in an opened state.

In some other embodiments of the present disclosure, as shown in FIG. 96 and FIG. 97, a vehicle body 22 includes a plurality of compartments 23 hinged sequentially along a length direction of a rail 10, and in the length direction of the rail 10, a surface that is of a compartment 23 at at least one end of the vehicle body 22 and that faces away from an adjacent compartment 23 is provided with an escape door 24 that can be opened and closed. Moreover, an escape port 25 and an escape cover plate 26 are disposed on an inner floor of the compartment 23 at the at least one end of the vehicle body 22, that is, the escape port 25 and the escape cover plate 26 are disposed on the inner floor of the compartment 23 provided with the escape door 24. The escape cover plate 26 collaborates with the escape door 24 and is used to open and close the escape port 25. When a rail vehicle 20 is normally running, the escape door 24 is closed and the escape cover plate 26 closes the escape port 25 (as shown in FIG. 96). When an emergency occurs, the rail vehicle 20 is actively or passively parked, the escape door 24 is opened and the escape cover plate 26 opens the escape port 25 (as shown in FIG. 97), and passengers in the compartment 23 can enter the escape passage 11 through the escape port 25, and then be evacuated from the escape passage 11. Moreover, even if the rail vehicle 20 is forcedly parked at a bend of the rail 10, because the escape door 24, when opened, does not need to fit in with the rail 10, the escape door 24 does not collide with the rail 10, to facilitate evacuation of the passengers at the bend of the rail 10.

Further, in the length direction of the rail 10, each of two end surfaces of two compartments 23 located at two ends of the vehicle body 22 is provided with an escape door 24, the end surface is a first end surface of the compartment 23, and the first end surface is a surface of a current compartment away from an adjacent compartment. In an emergency, the escape doors 24 are simultaneously opened at the two ends of the vehicle body 22, and a wide air convection passage can be formed, so that toxic gases such as smog in the vehicle body 22 can be quickly dissipated. Moreover, a flipping-type structure is used for the escape door 24, and the passenger in the vehicle can quickly open the escape door 24 in need of only a simple operation, to effectively improve escape efficiency.

Specifically, The escape door 24 has a first end 31 and a second end 32, and the second end 32 of the escape door 24 is pivotably mounted onto the corresponding compartment 23, where the second end 32 of the escape door 24 is disposed adjacent to the vehicle top, and the first end 31 of the escape door 24 is disposed adjacent to the vehicle bottom when the escape door 24 is closed. In other words, when the escape door 24 is closed, the first end 31 of the escape door 24 is located below the second end 32 of the escape door 24; and when the escape door 24 is opened, the first end 31 of the escape door 24 may be located below the second end 32 of the escape door 24, or may be located above the second end 32 of the escape door 24. Therefore, the escape door 24 is converted from a closed state to an opened state through upward flipping. A flipping-type structure is used for the escape door 24, and the passenger in the vehicle can quickly open the escape door 24 in need of only a simple operation, to effectively improve escape efficiency, and facilitate collaboration between the escape door 24 and the escape cover plate 26.

Optionally, collaboration between the escape cover plate 26 and the escape door 24, may be dominated by the escape door 24, or may be dominated by the escape cover plate 26. Specifically, when passengers need to be evacuated, the escape door 24 may be actively opened, and the escape door 24 drives the escape cover plate 26 to open the escape port 25; or the escape cover plate 26 may be actively opened, and the escape cover plate 26 drives the escape door 24 to be opened. Further, the foregoing collaboration is dominated by the escape cover plate 26, that is, the escape cover plate 26 is opened to drive the escape door 24 to be opened. In this way, when the escape cover plate 26 is opened, an article or a passenger above the escape cover plate 26 can be prevented from falling.

Further, as shown in FIG. 96 and FIG. 97, an escape ladder 27 leading to the escape passage 11 is disposed in the escape port 25, and after the escape port 25 is opened, a passenger in the vehicle may be transferred to the escape passage 11 through the escape ladder 27.

Optionally, the escape ladder 27 may be in a fixed state and is always suspending in the escape port 25, and a lower end of the escape ladder 27 and an inner bottom surface of the escape passage 11 are spaced apart, so as to avoid affecting travelling of the rail vehicle 20.

The escape ladder 27 may alternatively have two states, namely, a retraction state and a stretching state, and the vehicle body further includes a stretching/retraction driving device used to drive stretching/retraction of the escape ladder 27.

After the escape port 25 is opened, the escape ladder 27 may be manually controlled to stretch into the escape passage 11, or the escape ladder 27 may automatically stretch into the escape passage 11 through collaboration. In this embodiment, after stretching, the escape ladder 27 may be directly placed on the inner bottom surface of the escape passage 11, or the escape ladder 27 and the inner bottom surface of the escape passage 11 may be spaced apart.

Optionally, the escape cover plate 26 may be pivotably mounted onto the escape door 24. After the escape door 24 is flipped upward and is opened, the escape cover plate 26 rotates collaboratively to be laminated onto the inner surface of the escape door 24, thereby saving space, and preventing the escape cover plate 26 from affecting evacuation of passengers.

Figure 73:
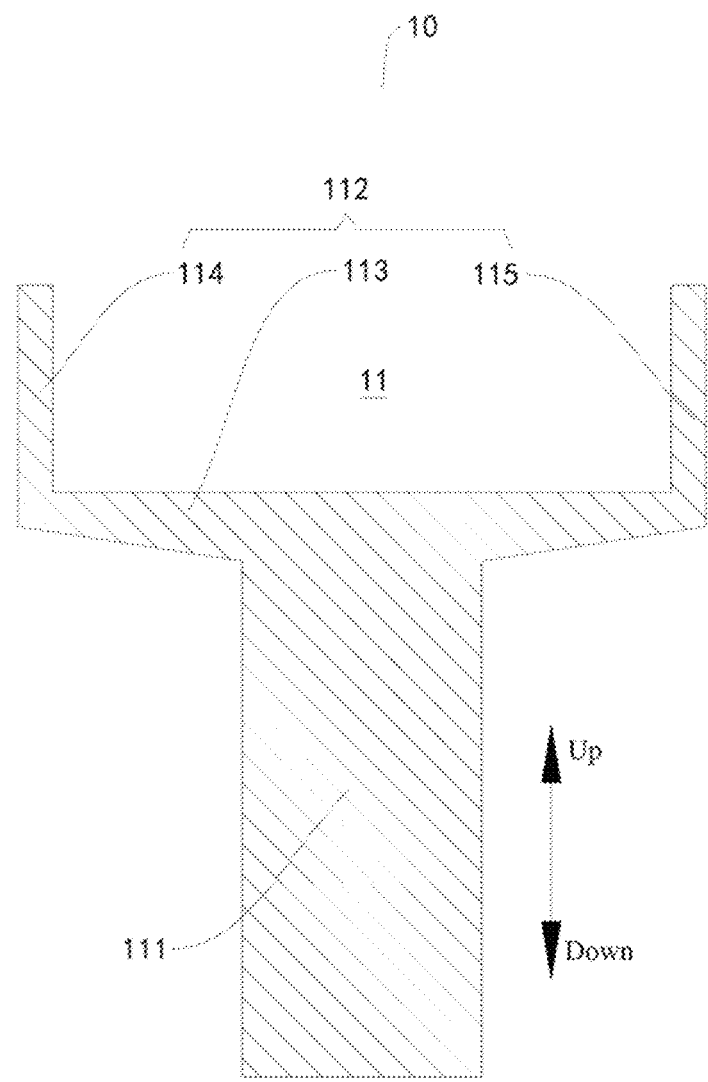
FIG. 73 is a schematic structural diagram of a rail of a rail transport system according to an embodiment of the present disclosure.
Figure 74:
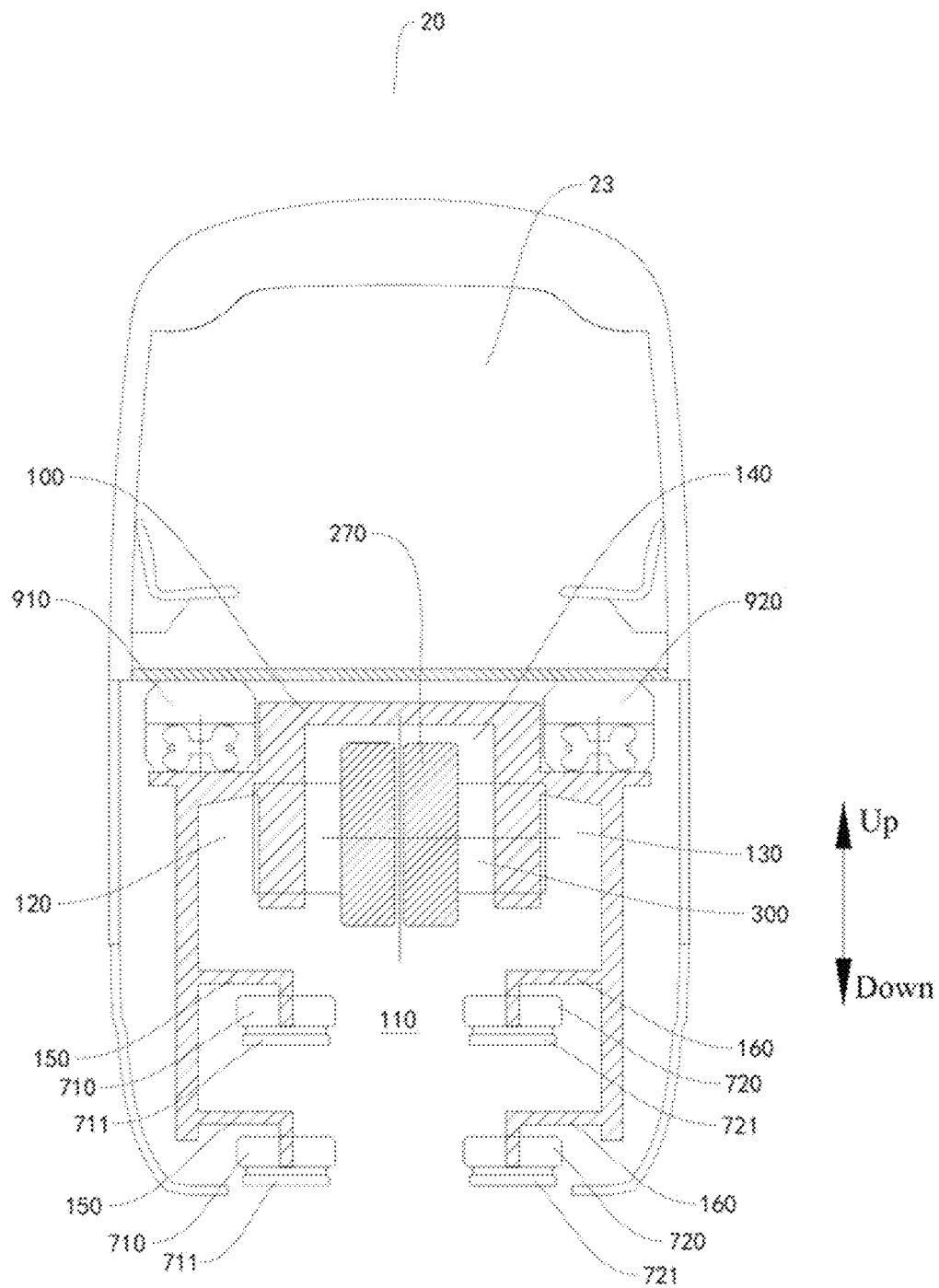
FIG. 74 is a schematic structural diagram of a rail vehicle according to an embodiment of the present disclosure.

In some embodiments of the present disclosure, as shown in FIG. 73, the travelling portion 112 includes a bottom plate 113, a first side plate 114, and a second side plate 115.

The bottom plate 113 is connected to the top of the steering portion 111. The first side plate 114 and the second side plate 115 are connected to the bottom plate 113 and are spaced apart along the width direction of the bottom plate 113, that is, the first side plate 114 and the second side plate 115 are spaced apart along the width direction of the rail 10. The escape passage 11 is defined among the first side plate 114, the second side plate 115, and the bottom plate 113, and the bottom plate 113 forms a bottom wall of the escape passage 11, and the first side plate 114 and the second side plate 115 respectively form two side walls of the escape passage 11. Therefore, the rail 10 may be provided with the escape passage 11 by using the structure of the rail 10, and no additional component needs to be disposed. Therefore, costs are low, occupied space is small, and it is favorable to reduction in the weight borne by the rail 10. Moreover, the size of the escape passage 11 is wide, which is convenient for passenger escape, and also facilitates repair and maintenance of the line during usual operating.

Optionally, as shown in FIG. 73, the longitudinal central axis of the cross section of the travelling portion 112 coincides with the longitudinal central axis of the cross section of the steering portion 111, and the width of the bottom plate 113 is greater than the width of the steering portion 111. The cross section of the travelling portion 112 is a section of the travelling portion 112 orthogonal to the length direction of the travelling portion 112. The bogie 21 is steered in dependence on the steering portion 111, and therefore a partial structure of the bogie 21 needs to be placed right below the bottom plate 113, thereby preventing the bogie 21 from being disengaged from the rail 10, and ensuring stability of the rail vehicle 20 in a travelling situation such as bending.

Figure 71:
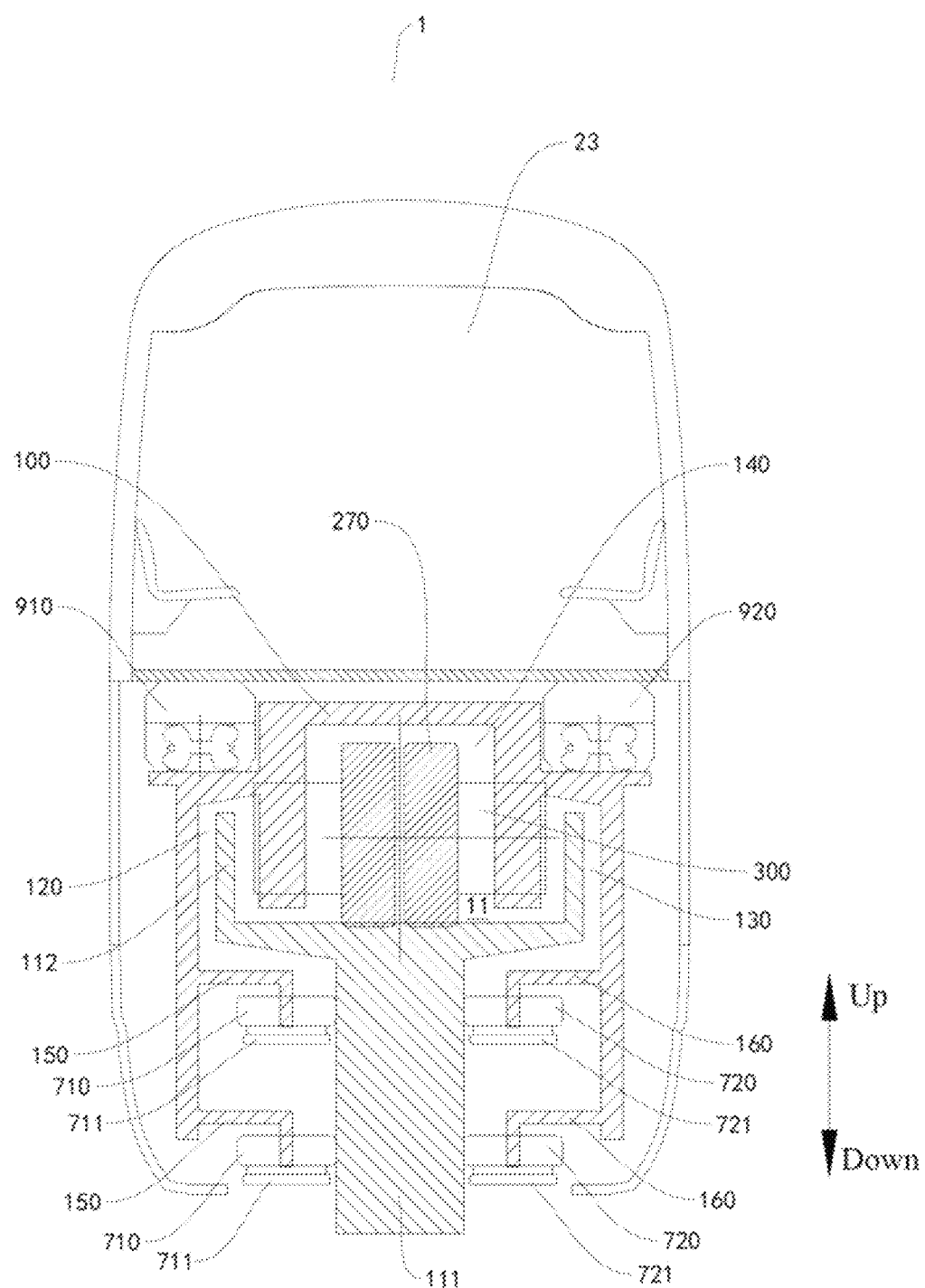
FIG. 71 is a sectional view of a rail transport system according to an embodiment of the present disclosure.
Figure 72:
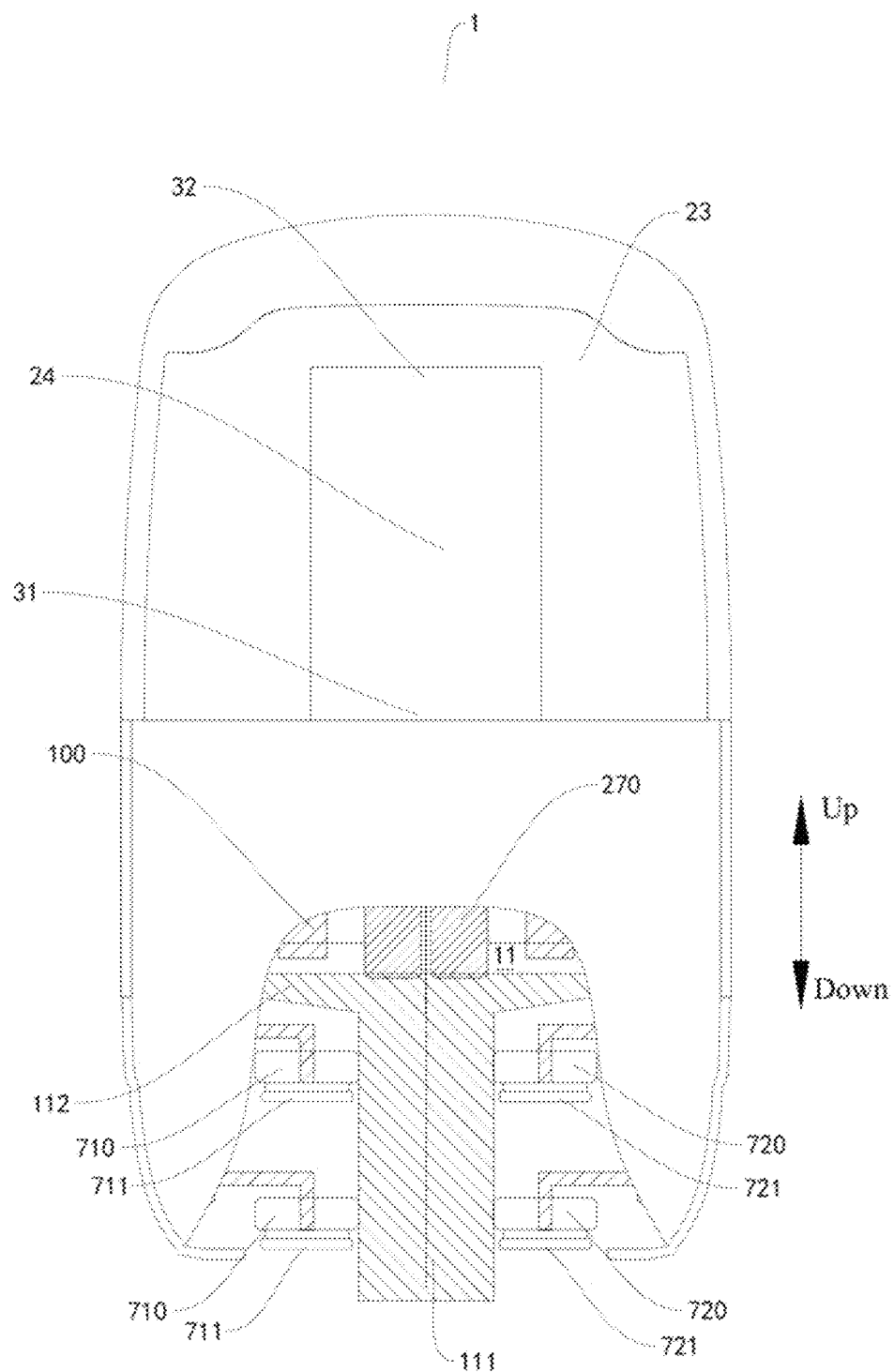
FIG. 72 is a sectional view of a rail transport system according to another embodiment of the present disclosure.

For example, as shown in FIG. 71, the first horizontal wheel 710 of the bogie 21 fits in on a first side surface of the steering portion 111 and is located right below a first side of the bottom plate 113, and the second horizontal wheel 720 of the bogie 21 fits in on a second side surface of the steering portion 111 and is located right below a second side of the bottom plate 113. In this way, parts of the bottom plate 113 that protrude from two sides of the steering portion 111 may respectively stop the first horizontal wheel 710 and the second horizontal wheel 720 from moving upward, thereby playing an anti-dropping role.

Further, the first side plate 114 and the second side plate 115 may be vertically disposed or may be obliquely disposed, and a minimum distance between the first side plate 114 and the second side plate 115 is greater than the width of the steering portion 111. In this way, on one hand, fitting-in of the running wheel 270 of the bogie 21 on the bottom plate 113 may be facilitated, and on the other hand, the width of the escape passage 11 may be increased, thereby improving a passenger evacuation speed in an emergency. Optionally, as shown in FIG. 73, the first side plate 114 and the second side plate 115 are respectively connected to two side edges of the bottom plate 113.

Optionally, as shown in FIG. 73, the thickness of a part of the bottom plate 113 connected to the steering portion 111 is greater than the thickness of a remaining part of the bottom plate 113. Therefore, the structural strength of a connection position between the travelling portion 112 and the steering portion 111 may be strengthened, thereby improving the weight bearing capability of the connection position between the travelling portion 112 and the steering portion 111, and ensuring structural stability and reliability of the rail 10.

Figure 75:
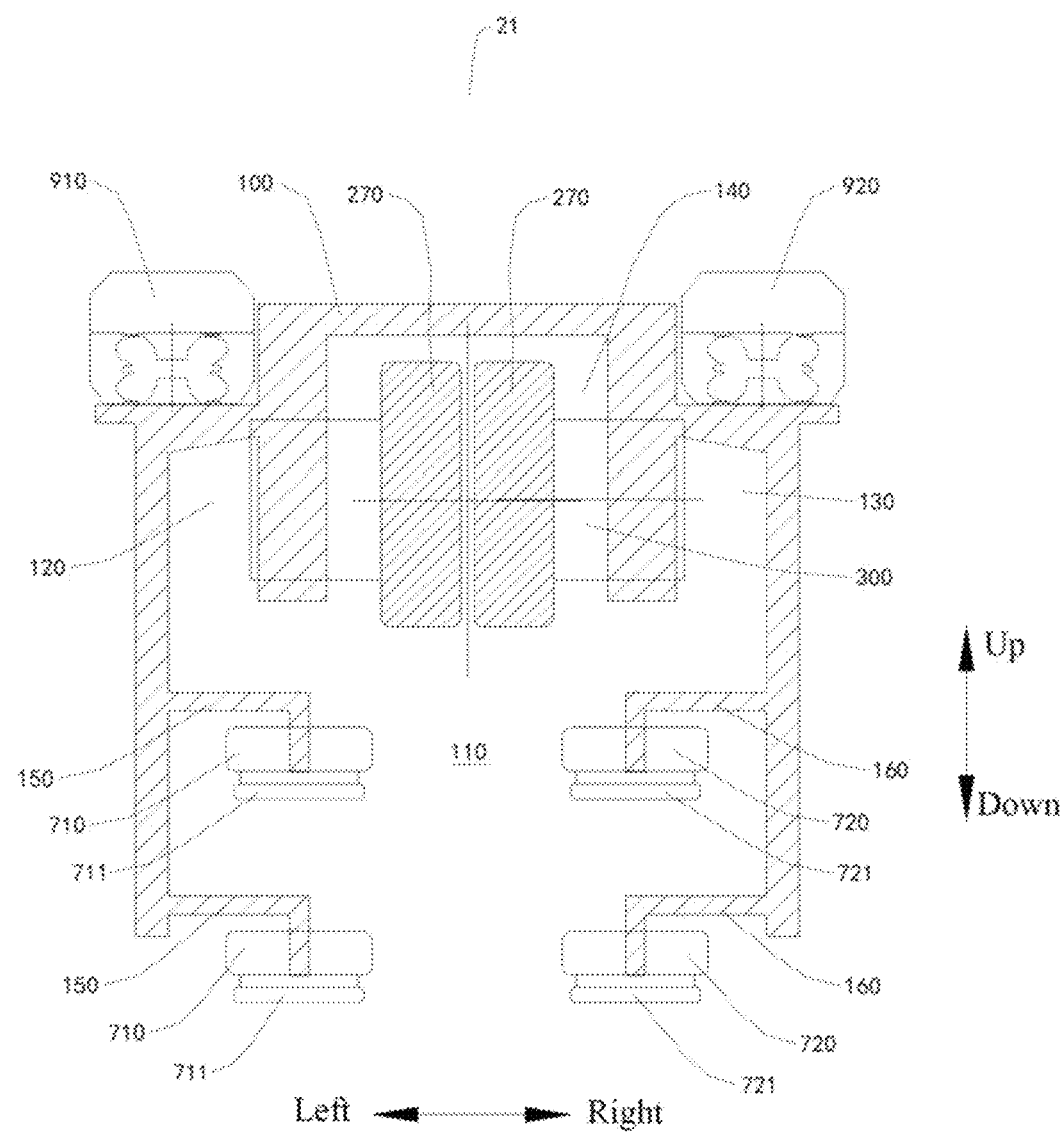
FIG. 75 is a sectional view of a bogie of a rail vehicle according to an embodiment of the present disclosure.
Figure 76:
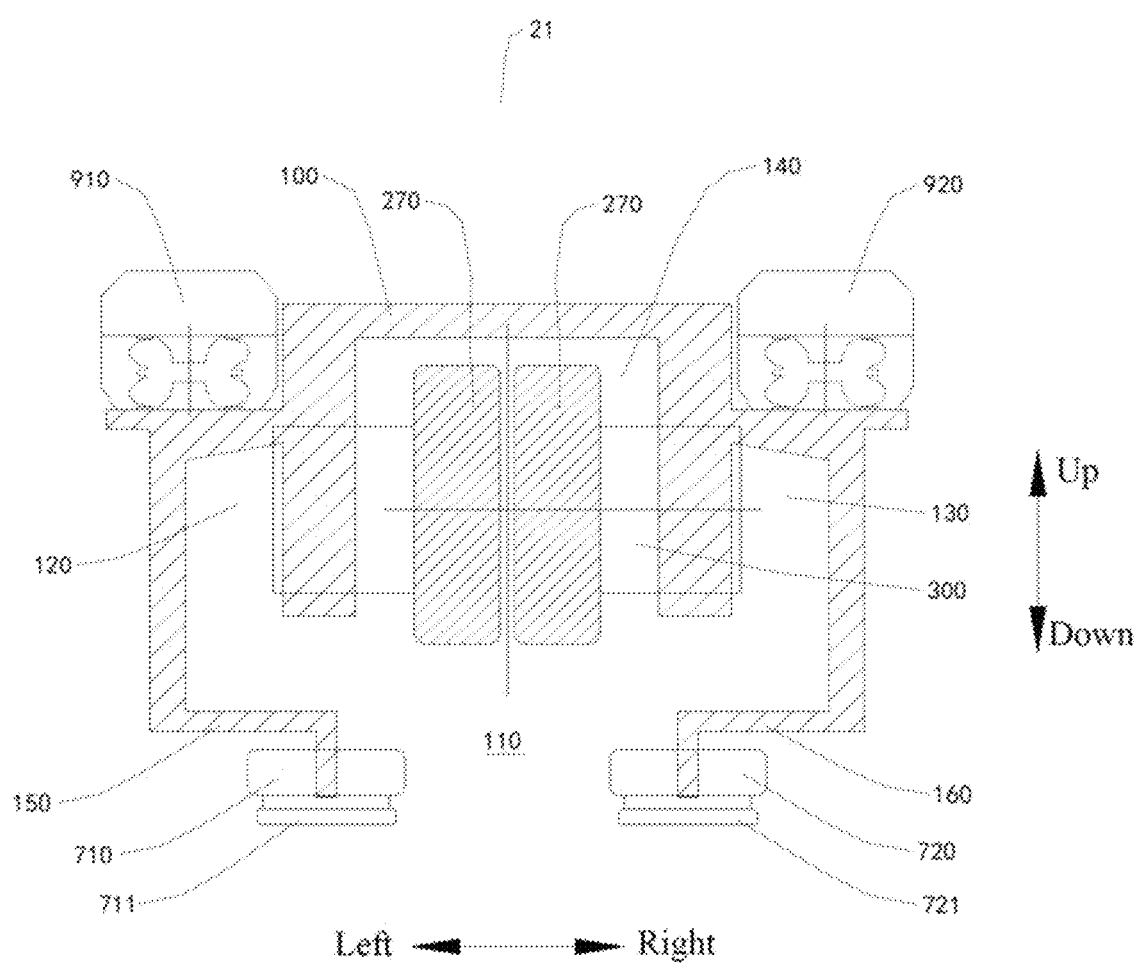
FIG. 76 is a sectional view of a bogie of a rail vehicle according to another embodiment of the present disclosure.

In some embodiments of the present disclosure, as shown in FIG. 75 and FIG. 76, the bogie 21 includes a bogie frame 100, a running wheel 270, and a driving device 300.

The bogie frame 100 has a second recess 110 straddling the rail 10, where the second recess is a straddle recess. The second recess 110 is formed by a hollow portion jointly defined by the bottom of the running wheel 270, a first horizontal wheel 710, and a second horizontal wheel 720, and the innermost sides of the first horizontal wheel 710 and the second horizontal wheel 720 is in contact with the outer side of the steering portion 111. The bogie frame 100 is provided with a first dodge groove 120 and a second dodge groove 130, the first dodge groove 120 and the second dodge groove 130 are respectively in communication with the top of the second recess 110, the first side plate 114 stretches into the first dodge groove 120, and the second side plate 115 stretches into the second dodge groove 130. The running wheel 270 is pivotably mounted onto the bogie frame 100 and fits in on the upper surface of the bottom plate 113, and the running wheel 270 is located between the first side plate 114 and the second side plate 115 and is located right above the steering portion 111. The driving device 300 is mounted onto the bogie frame 100, and the running wheel 270 is driven by the driving device 300. The bogie frame 100 is provided with the first dodge groove 120 and the second dodge groove 130 that are used to respectively dodge the first side plate 114 and the second side plate 115, and openings of both the first dodge groove 120 and the second dodge groove 130 are downward, which may eliminate an adverse effect caused by disposing the escape passage 11 on the rail 10, that is, may reduce the entire height of the rail vehicle 20 on one hand, and may facilitate mounting of the running wheel 270 on the other hand, thereby facilitating control over the size of the running wheel 270.

Further, as shown in FIG. 75 and FIG. 76, the bogie frame 100 is provided with a running wheel mounting groove 140 located between the first dodge groove 120 and the second dodge groove 130, the opening of the running wheel mounting groove 140 is downward, and the running wheel 270 is pivotably mounted onto two side walls of the running wheel mounting groove 140 and is located in the running wheel mounting groove 140, thereby facilitating mounting of the running wheel 270, so that the structure of the bogie 21 is more compact.

Optionally, as shown in FIG. 75 and FIG. 76, there is a plurality of running wheels 270, the plurality of running wheels 270 is pivotably mounted onto the bogie frame 100 respectively and fits in on the upper surface of the bottom plate 113, and each of the plurality of running wheels 270 is located between the first side plate 114 and the second side plate 115 and is located right above the steering portion 111. Therefore, the weight bearing capability of the bogie 21 can be improved, so as to stably support the vehicle body 22.

In some embodiments of the present disclosure, as shown in FIG. 75 to FIG. 95 and FIG. 99, the bogie 21 further includes a first horizontal wheel 710 and a second horizontal wheel 720, where there may be one or more first horizontal wheels 710 and one or more second horizontal wheels 720 respectively.

The first horizontal wheel 710 is pivotably mounted onto the bogie frame 100 and fits in on a first side surface of the steering portion 111. The second horizontal wheel 720 is pivotably mounted onto the bogie frame 100 and fits in on a second side surface of the steering portion 111. On one hand, when the rail 10 is steered, the first horizontal wheel 710 and the second horizontal wheel 720 fit in on a side surface of the rail 10, thereby being passively steered along the rail 10, and then driving the rail vehicle 20 to be steered. On the other hand, stability of the rail vehicle 20 during travelling may be improved. Moreover, both the first horizontal wheel 710 and the second horizontal wheel 720 are located right below the travelling portion 112, which may prevent the bogie 21 from being disengaged from the rail 10.

Optionally, as shown in FIG. 75 and FIG. 76, a first horizontal wheel mounting limb 150 stretching from a side of the bogie frame 100 to a location right below a first side of the bottom plate 113 and a second horizontal wheel mounting limb 160 stretching from another side of the bogie frame 100 to a location right below a second side of the bottom plate 113 are disposed on the bogie frame 100, the first horizontal wheel 710 is pivotably mounted onto the first horizontal wheel mounting limb 150, and the second horizontal wheel 720 is pivotably mounted onto the second horizontal wheel mounting limb 160. Therefore, it may be convenient for the first horizontal wheel 710 of the bogie 21 to fit in on a first side surface of the steering portion 111 and to be located right below a first side of the bottom plate 113, and it may be convenient for the second horizontal wheel 720 of the bogie 21 to fit in on a second side surface of the steering portion 111 and to be located right below a second side of the bottom plate 113. Therefore, the bogie frame 100 provides complete and firm protection, which can ensure safety performance of the rail vehicle 20 during running on the rail 10.

Further, the bogie 21 further includes a first horizontal safety wheel 711 connected to the first horizontal wheel 710 and moving in synchronization with the first horizontal wheel 710, and a second horizontal safety wheel 721 connected to the second horizontal wheel 720 and moving in synchronization with the second horizontal wheel 720, the outer diameter of the first horizontal safety wheel 711 is less than the outer diameter of the first horizontal wheel 710, and the outer diameter of the second horizontal safety wheel 721 is less than the outer diameter of the second horizontal wheel 720. As shown in FIG. 75 and FIG. 76, the bottom of the first horizontal wheel 710 is connected to a first horizontal safety wheel 711 moving in synchronization with the first horizontal wheel 710, and the outer diameter of the first horizontal safety wheel 711 is less than the outer diameter of the first horizontal wheel 710. The bottom of the second horizontal wheel 720 is connected to a second horizontal safety wheel 721 moving in synchronization with the second horizontal wheel 720, and the outer diameter of the second horizontal safety wheel 721 is less than the outer diameter of the second horizontal wheel 720. Normally, the first horizontal safety wheel 711 and the second horizontal safety wheel 721 are not in contact with a steering portion 111. When a tyre of a horizontal wheel is flat, a horizontal safety wheel in place of the horizontal wheel is in contact with the steering portion 111, to ensure stability of the rail vehicle 20 during travelling.

Figure 88:
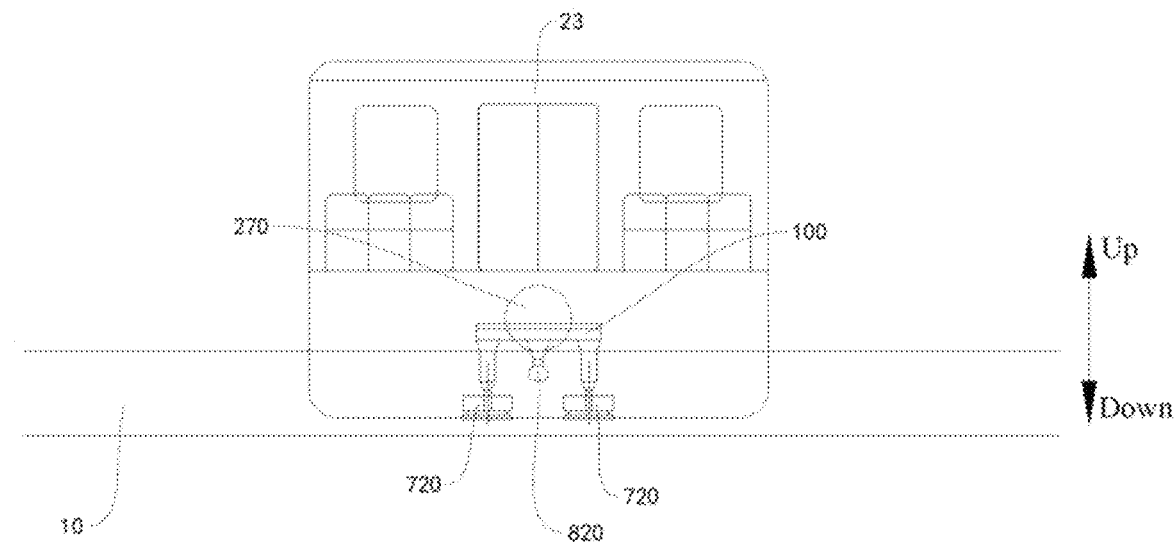
FIG. 88 is a partial schematic structural diagram of a rail transport system according to an embodiment of the present disclosure.

In some specific examples of the present disclosure, as shown in FIG. 88, the first horizontal wheel 710 and the second horizontal wheel 720 are located at a same height in the up and down direction. Therefore, balance of entire steering performance of the rail vehicle 20 may be facilitated, and a force applied during forward movement or backward movement is uniform, thereby facilitating improvement in bend performance of the rail vehicle 20.

Figure 89:
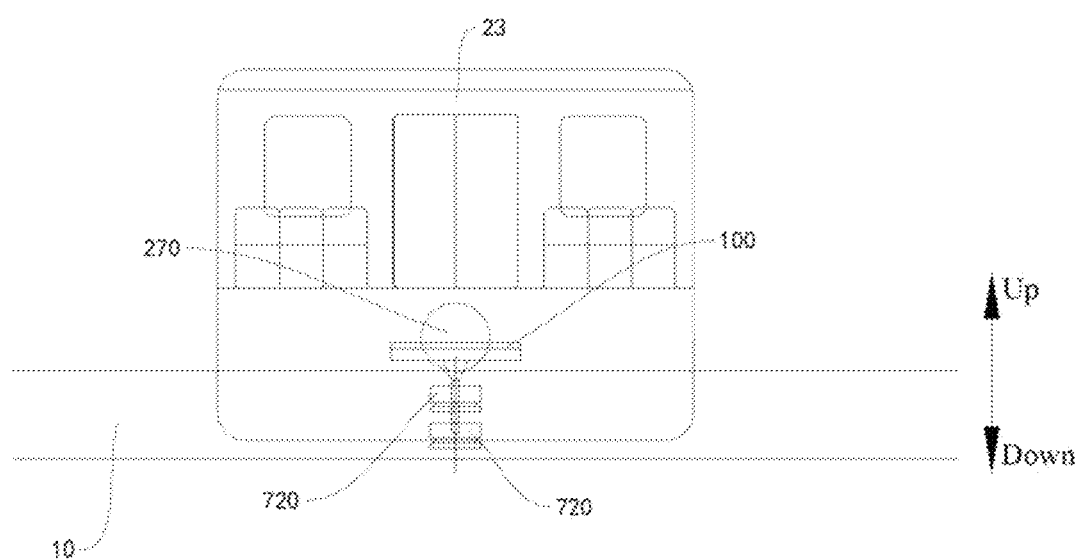
FIG. 89 is a partial schematic structural diagram of a rail transport system according to an embodiment of the present disclosure.

In some specific examples of the present disclosure, as shown in FIG. 89, there is a plurality of first horizontal wheels 710 spaced apart and coaxially disposed along an up and down direction and there is a plurality of second horizontal wheels 720 spaced apart and coaxially disposed along the up and down direction. In this way, stability performance of the entire vehicle can be improved, and the horizontal wheel on the bottom plays a role of stabilization, thereby reducing an overturn risk of the rail vehicle 20 during bend or high-speed travelling.

Figure 90:
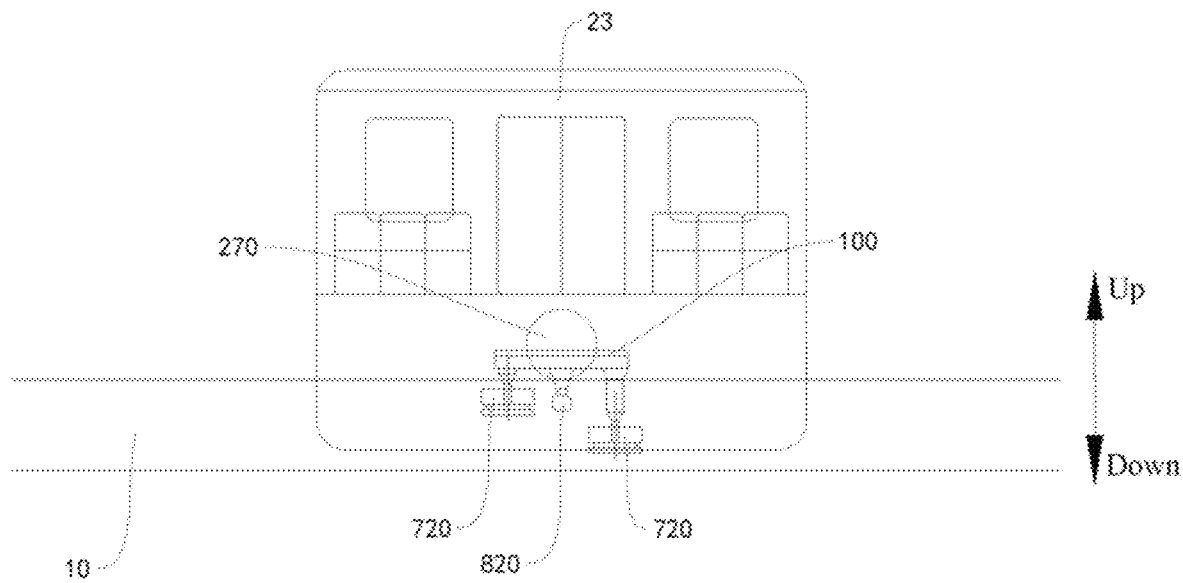
FIG. 90 is a partial schematic structural diagram of a rail transport system according to an embodiment of the present disclosure.
Figure 91:
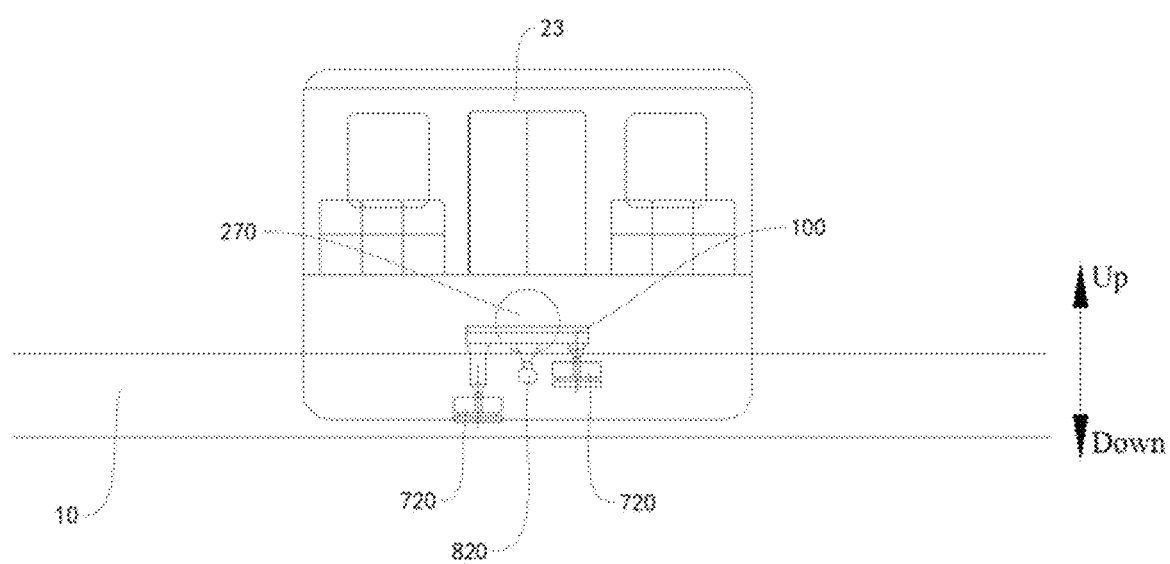
FIG. 91 is a partial schematic structural diagram of a rail transport system according to an embodiment of the present disclosure.
Figure 92:
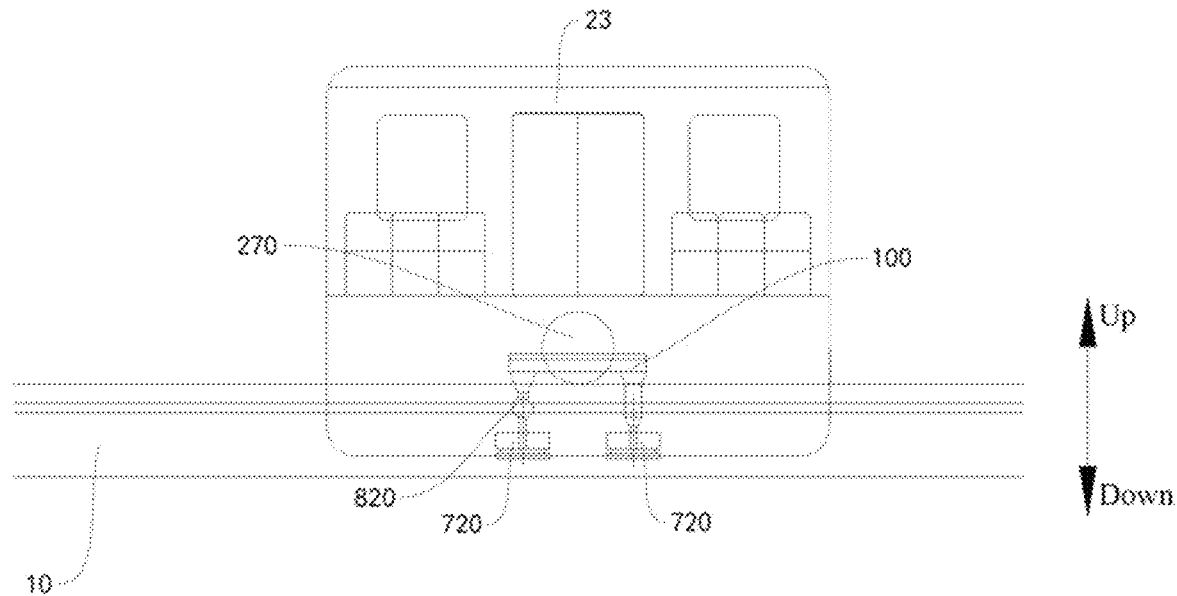
FIG. 92 is a partial schematic structural diagram of a rail transport system according to an embodiment of the present disclosure.
Figure 93:
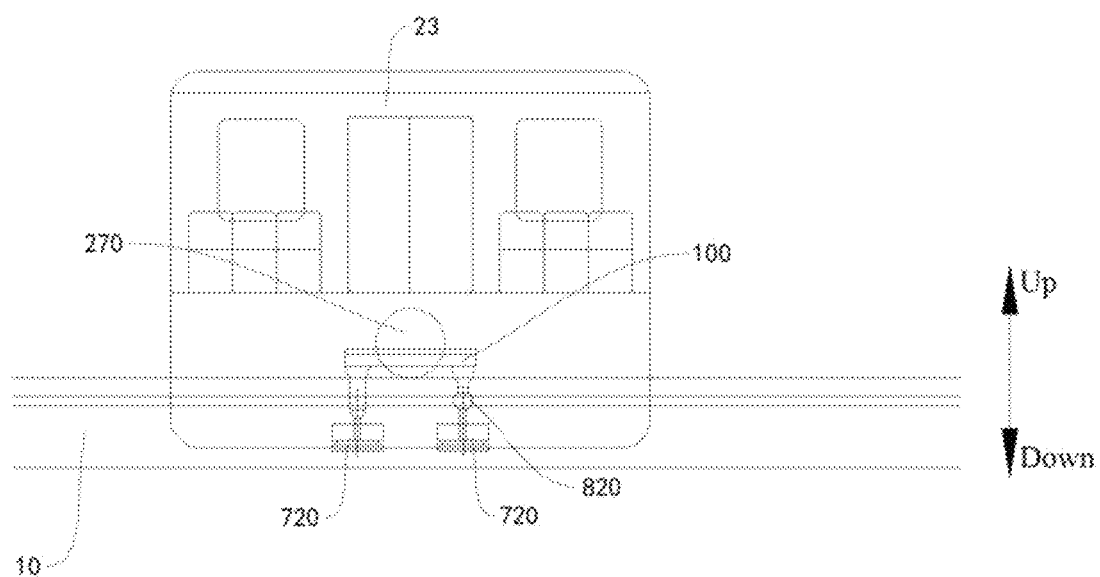
FIG. 93 is a partial schematic structural diagram of a rail transport system according to an embodiment of the present disclosure.
Figure 94:
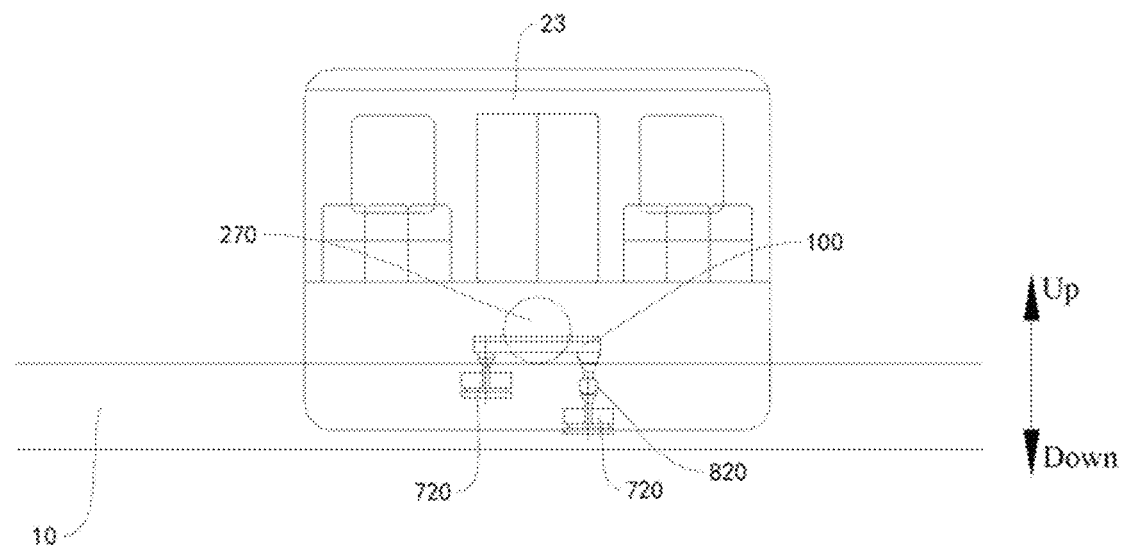
FIG. 94 is a partial schematic structural diagram of a rail transport system according to an embodiment of the present disclosure.
Figure 95:
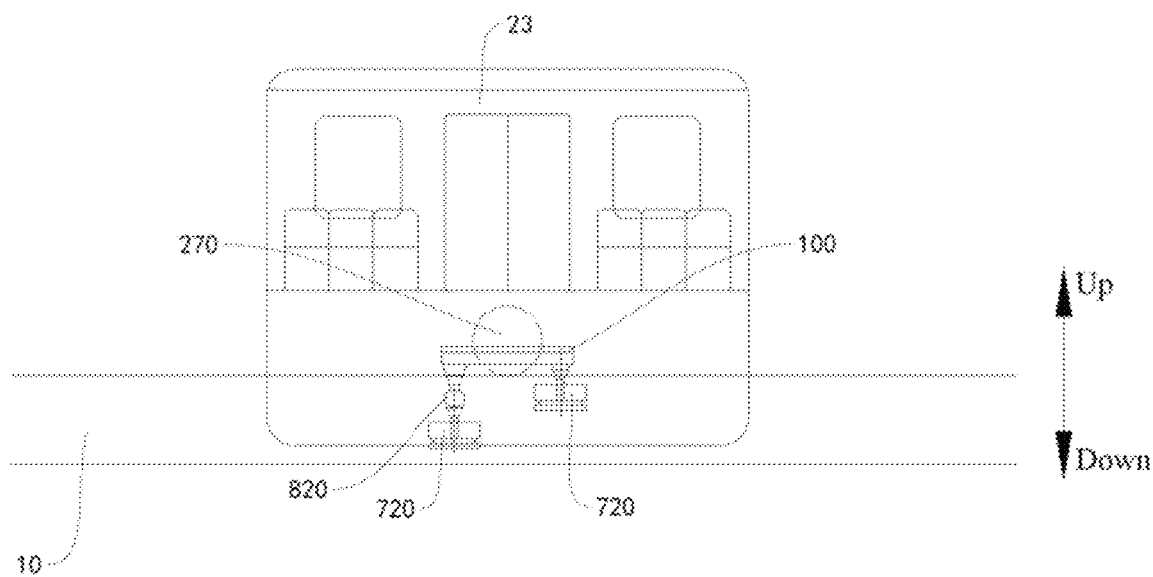
FIG. 95 is a partial schematic structural diagram of a rail transport system according to an embodiment of the present disclosure.

In some specific examples of the present disclosure, as shown in FIG. 90 and FIG. 91, there is a plurality of first horizontal wheels 710 spaced apart along an up and down direction and a length direction of a steering portion 111 respectively, and there is a plurality of second horizontal wheels 720 spaced apart along the up and down direction and the length direction of the steering portion 111 respectively. To be specific, the plurality of first horizontal wheels 710 is staggered vertically, and the plurality of second horizontal wheels 720 is staggered vertically. Some first horizontal wheels 710 may be located above some second horizontal wheels 720, or may be located below some second horizontal wheels 720. In this way, the horizontal wheel on the top can play a role of guiding during travelling, and the horizontal wheel on the bottom is relatively far away from the vehicle body 22, and can play a role of stabilization and overturn prevention.

In some examples of the present disclosure, as shown in FIG. 77 to FIG. 84, the bogie 21 further includes a first collector shoe 810 and a second collector shoe 820.

A first conductive rail 830 extending along the length direction of the steering portion 111 is disposed on the first side surface of the steering portion 111, and a second conductive rail 840 extending along the length direction of the steering portion 111 is disposed on the second side surface of the steering portion 111. The first collector shoe 810 is disposed on the bogie frame 100 and fits in with the first conductive rail 830, and the second collector shoe 820 is disposed on the bogie frame 100 and fits in with the second conductive rail 840. The first collector shoe 810 is powered by using the first conductive rail 830, and the second collector shoe 820 is powered by using the second conductive rail 840, so as to be used by the rail vehicle 20.

In some specific examples of the present disclosure, as shown in FIG. 18, FIG. 90, and FIG. 91, there is a plurality of first horizontal wheels 710 spaced apart along the length direction of the steering portion 111, and the first collector shoe 810 is located between neighboring first horizontal wheels 710 in the length direction of the steering portion 111; and there is a plurality of second horizontal wheels 720 spaced apart along the length direction of the steering portion 111, and the second collector shoe 820 is located between neighboring second horizontal wheels 720 in the length direction of the steering portion 111. Therefore, a force applied to the first horizontal wheel 710 does not affect the first collector shoe 810 and a force applied to the second horizontal wheel 720 does not affect the second collector shoe 820. Moreover, space utilization can be improved, and the structure of the bogie 21 can be simplified.

For example, FIG. 88, FIG. 90, and FIG. 91 show an example in which the first collector shoe 810 of the bogie 21 is located between neighboring first horizontal wheels 710 in the length direction of the steering portion 111 and the second collector shoe 820 is located between neighboring second horizontal wheels 720 in the length direction of the steering portion 111. The plurality of first horizontal wheels 710 may be located at a same height and the plurality of second horizontal wheels 720 may be located at a same height; or the plurality of first horizontal wheels 710 may be staggered vertically and the plurality of second horizontal wheels 720 may be staggered vertically.

In some specific examples of the present disclosure, as shown in FIG. 92 to FIG. 95, there is a plurality of first horizontal wheels 710 spaced apart along the length direction of the steering portion 111, and the first collector shoe 810 and one of the first horizontal wheels 710 are disposed facing each other in the up and down direction. For example, the central axis of the first collector shoe 810 coincides with the central axis of one of the first horizontal wheels 710. There is a plurality of second horizontal wheels 720 spaced apart along the length direction of the steering portion 111, and the second collector shoe 820 and one of the second horizontal wheels 720 are disposed facing each other in the up and down direction. For example, the central axis of the second collector shoe 820 coincides with the central axis of one of the second horizontal wheels 720. In other words, the collector shoes are disposed in front or disposed behind. Therefore, mounting space of the horizontal wheels can be fully used, and no mounting mechanism needs to be additional disposed, to facilitate structure simplification and weight reduction of the bogie 21.

For example, FIG. 92 to FIG. 95 show an example in which collector shoes of the bogie 21 are disposed in front or disposed behind. The plurality of first horizontal wheels 710 may be located at a same height and the plurality of second horizontal wheels 720 may be located at a same height; or the plurality of first horizontal wheels 710 may be located at different heights and the plurality of second horizontal wheels 720 may be located at different heights.

Figure 77:
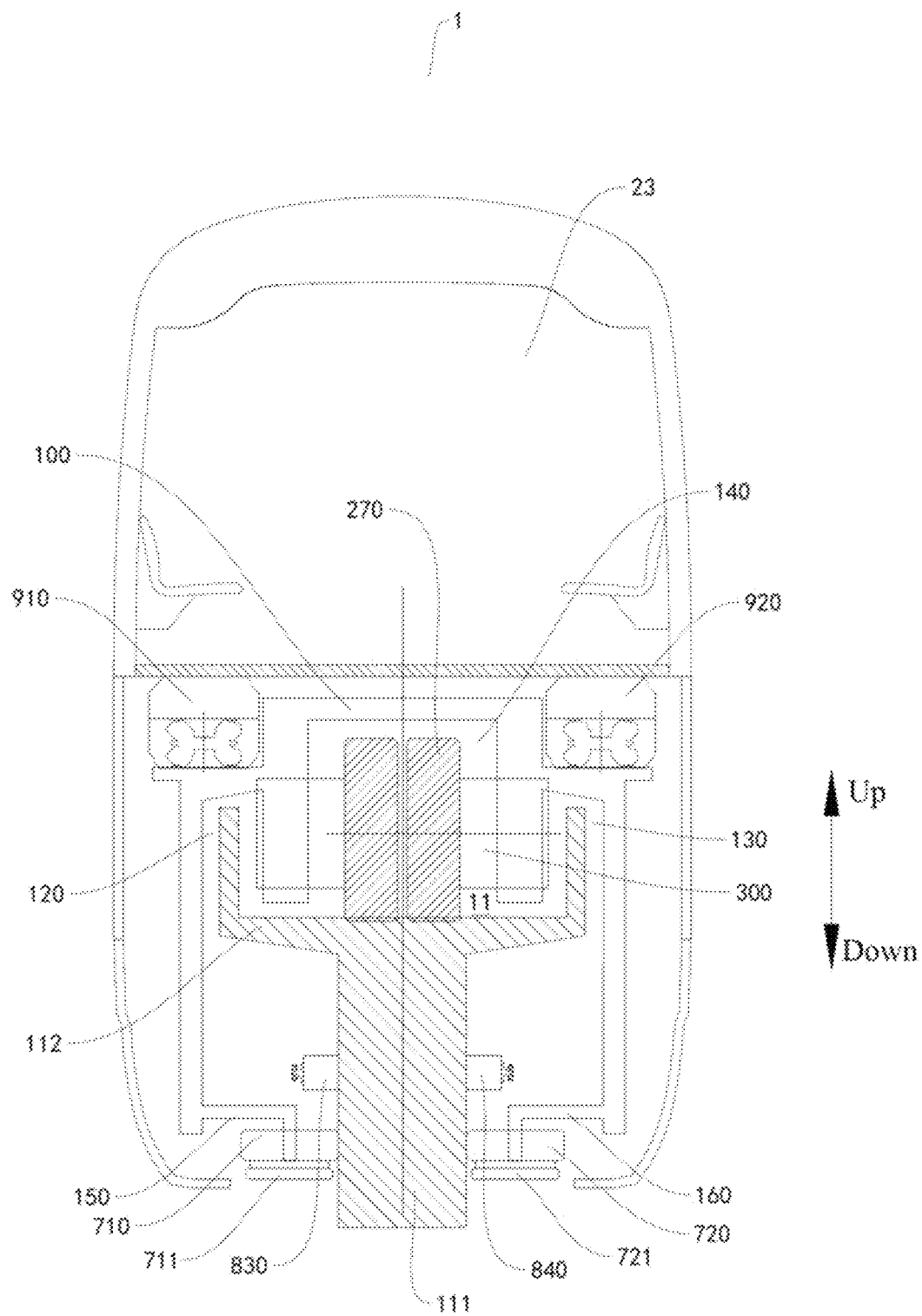
FIG. 77 is a sectional view of a rail transport system according to another embodiment of the present disclosure.
Figure 78:
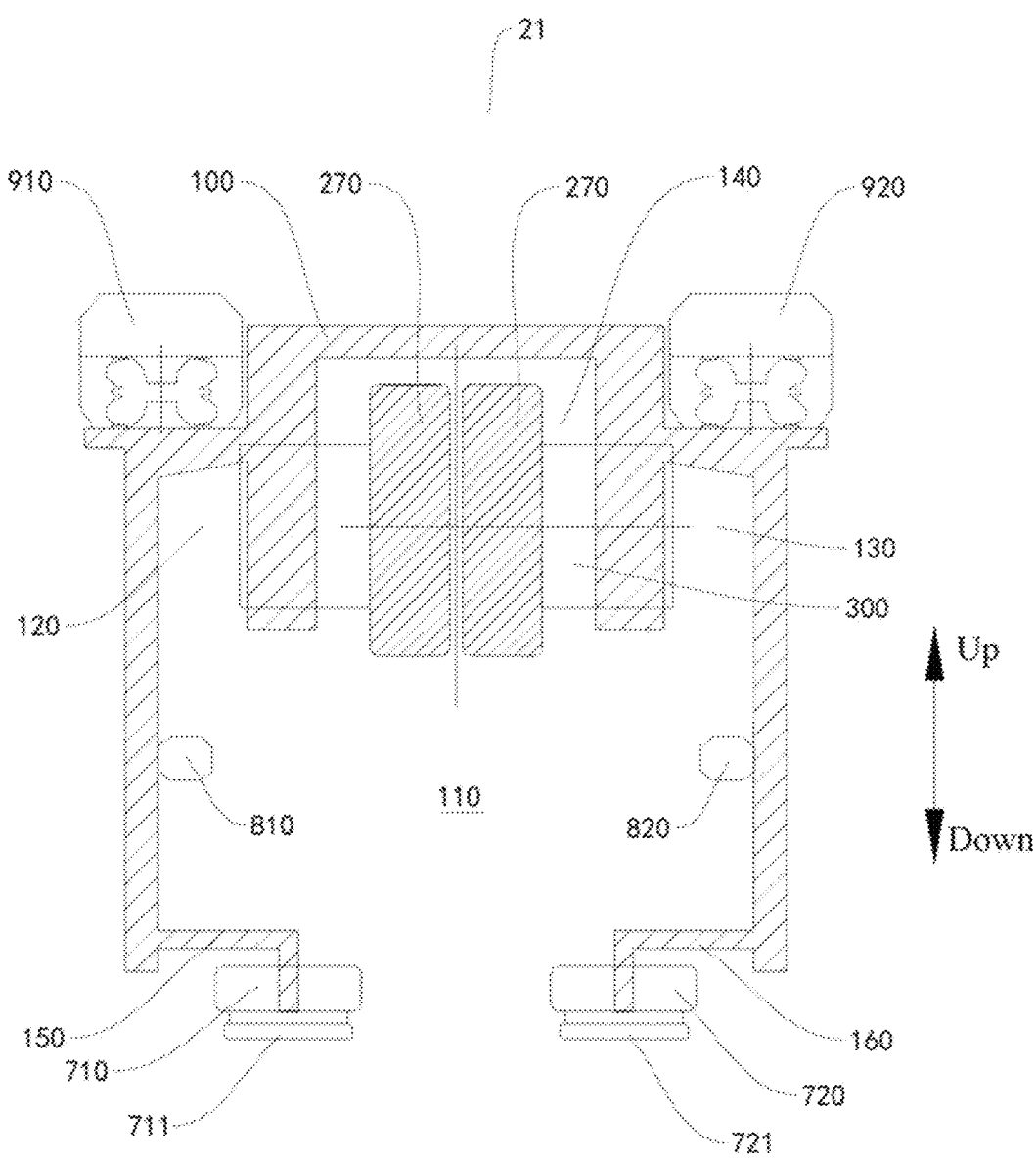
FIG. 78 is a sectional view of a bogie of a rail vehicle according to another embodiment of the present disclosure.

In some embodiments of the present disclosure, as shown in FIG. 77 and FIG. 78, a first collector shoe 810 is located above each first horizontal wheel 710, and a second collector shoe 820 is located above each second horizontal wheel 720. Reduction in a distance between a collector shoe and the driving device 300 facilitates energy transfer and improvement in space utilization.

Figure 79:
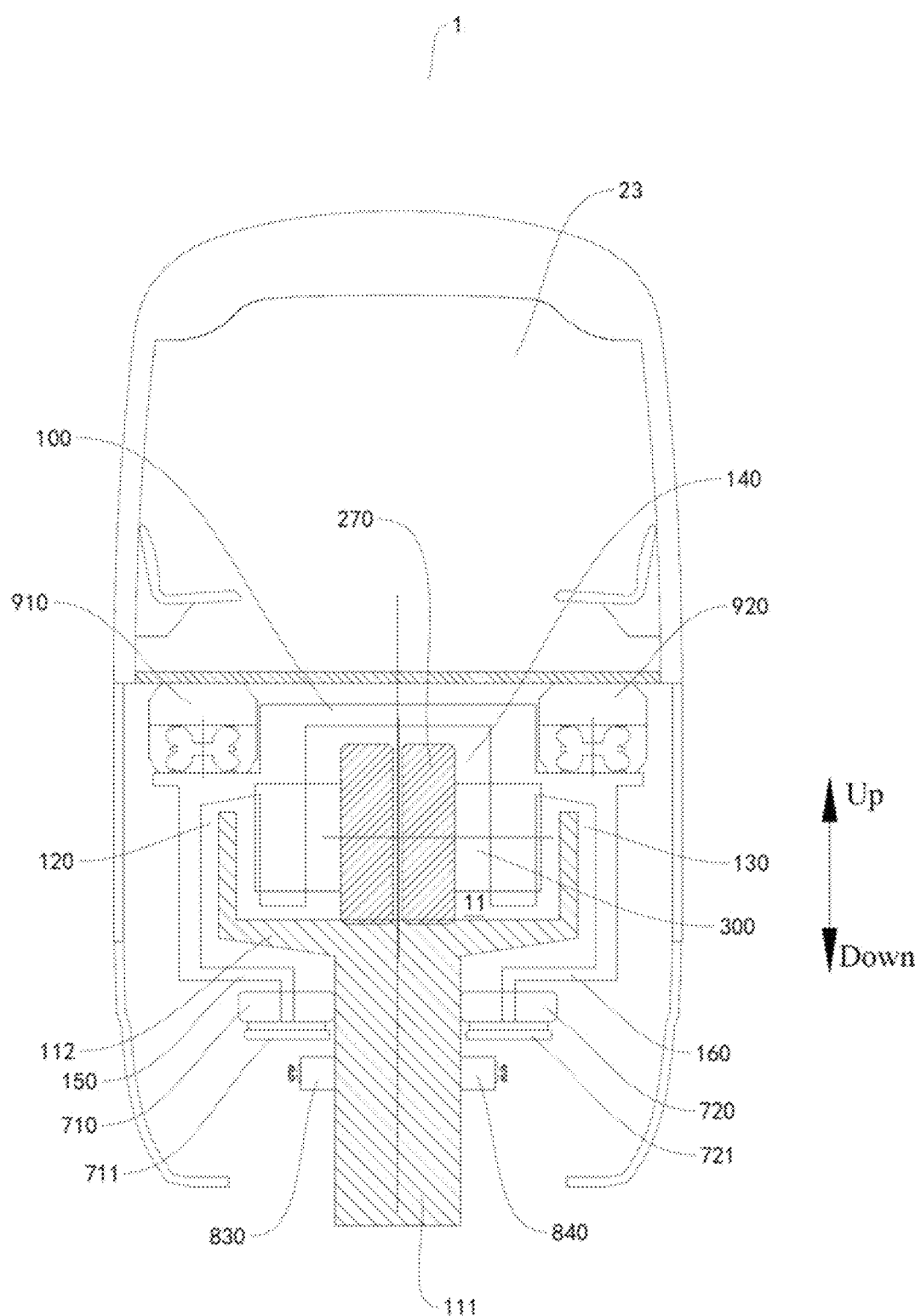
FIG. 79 is a sectional view of a rail transport system according to another embodiment of the present disclosure.
Figure 80:
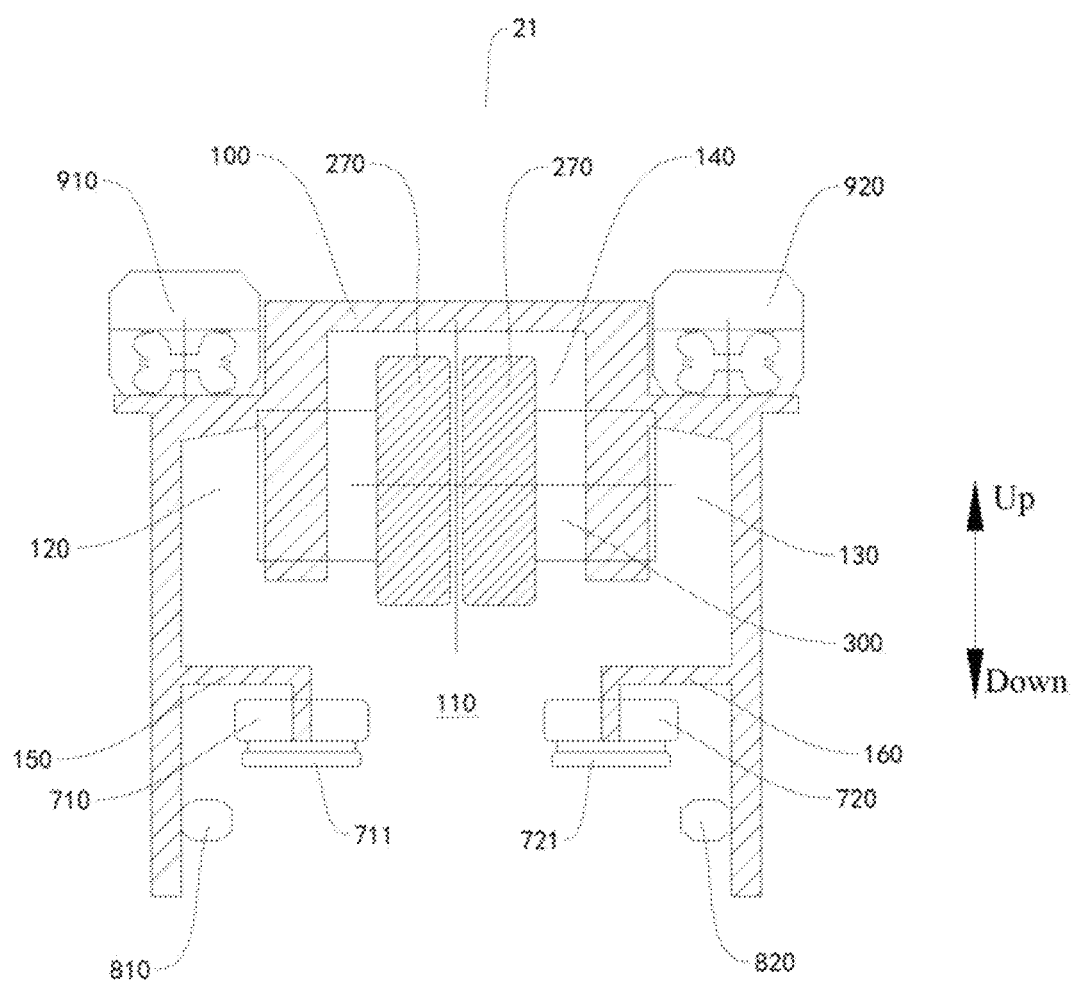
FIG. 80 is a sectional view of a bogie of a rail vehicle according to another embodiment of the present disclosure.

In some embodiments of the present disclosure, as shown in FIG. 79 and FIG. 80, a first collector shoe 810 is located below each first horizontal wheel 710, and a second collector shoe 820 is located below each second horizontal wheel 720. Therefore, a horizontal wheel is arranged at a location close to an upper portion of a rail beam to facilitate travelling stability of the rail vehicle 20.

Figure 81:
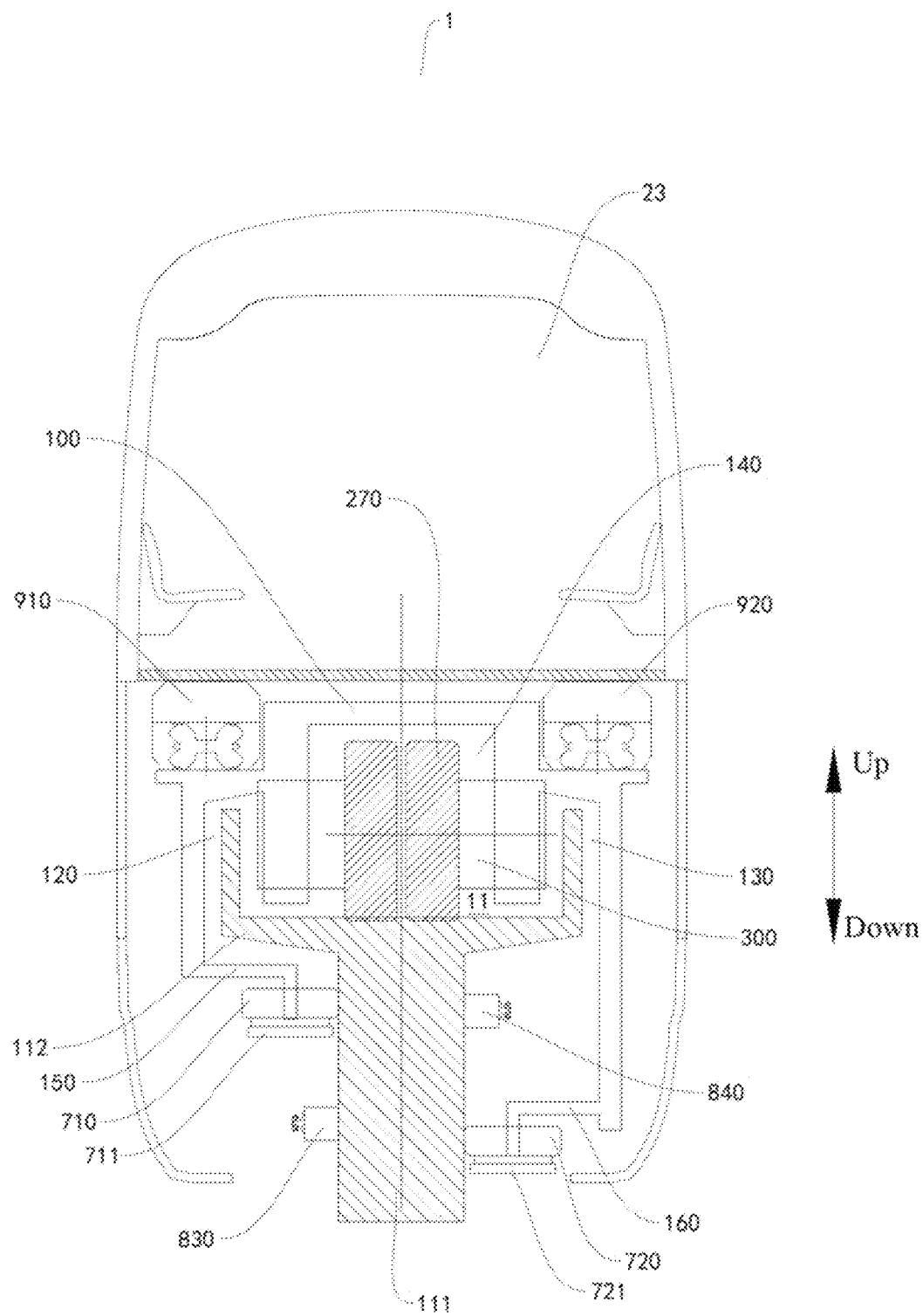
FIG. 81 is a sectional view of a rail transport system according to another embodiment of the present disclosure.
Figure 82:
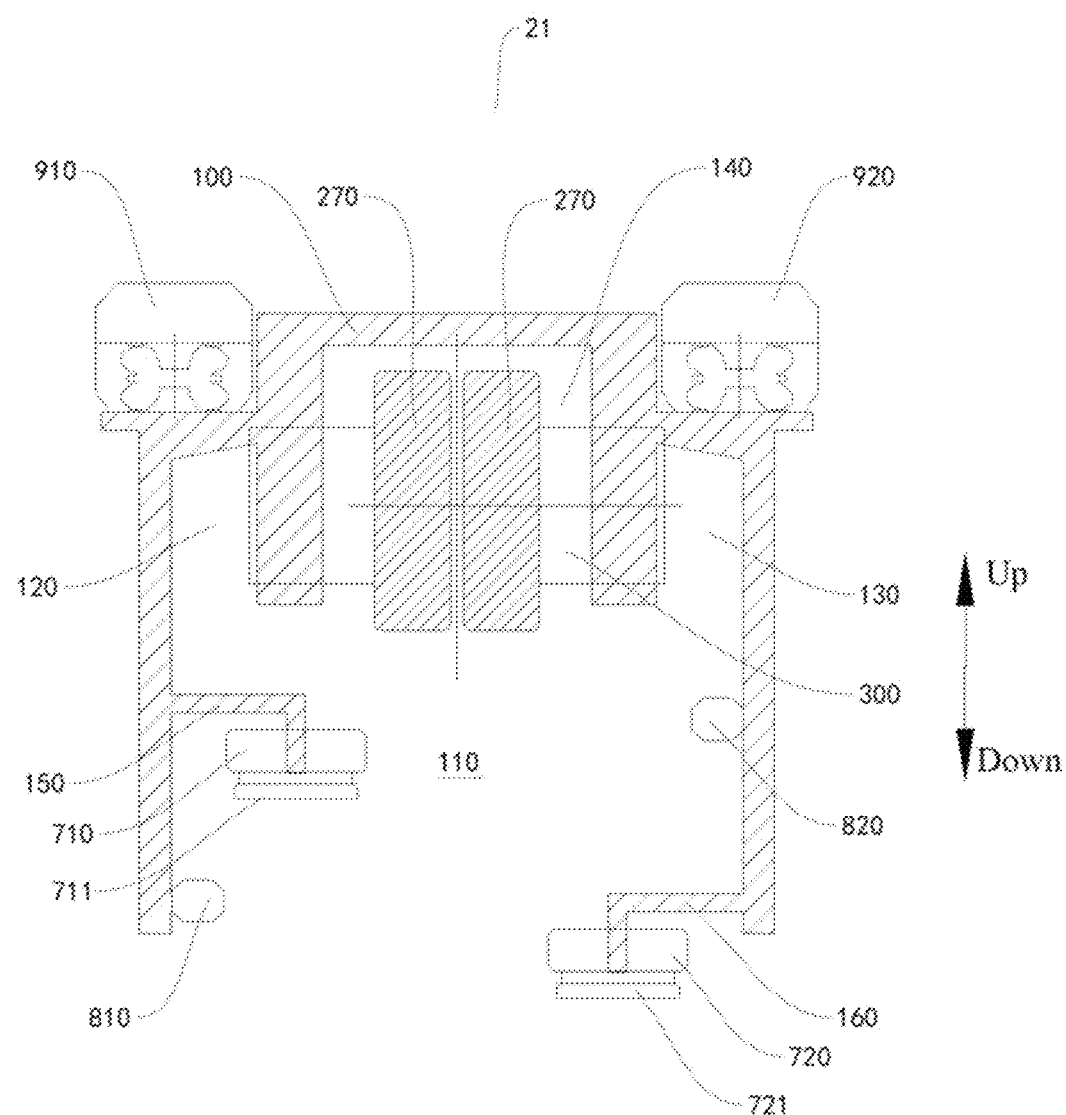
FIG. 82 is a sectional view of a bogie of a rail vehicle according to another embodiment of the present disclosure.

In some embodiments of the present disclosure, as shown in FIG. 81 and FIG. 82, a first collector shoe 810 is located below each first horizontal wheel 710, and a second collector shoe 820 is located above each second horizontal wheel 720. Therefore, collector shoes are arranged vertically according to different polarities of a collected current. For example, a collector shoe arranged above is connected to a positive electrode of the current, and a collector shoe arranged below is connected to a negative electrode of the current on an opposite side, so as to facilitate space distribution and improvement in safety of the collected current.

Figure 83:
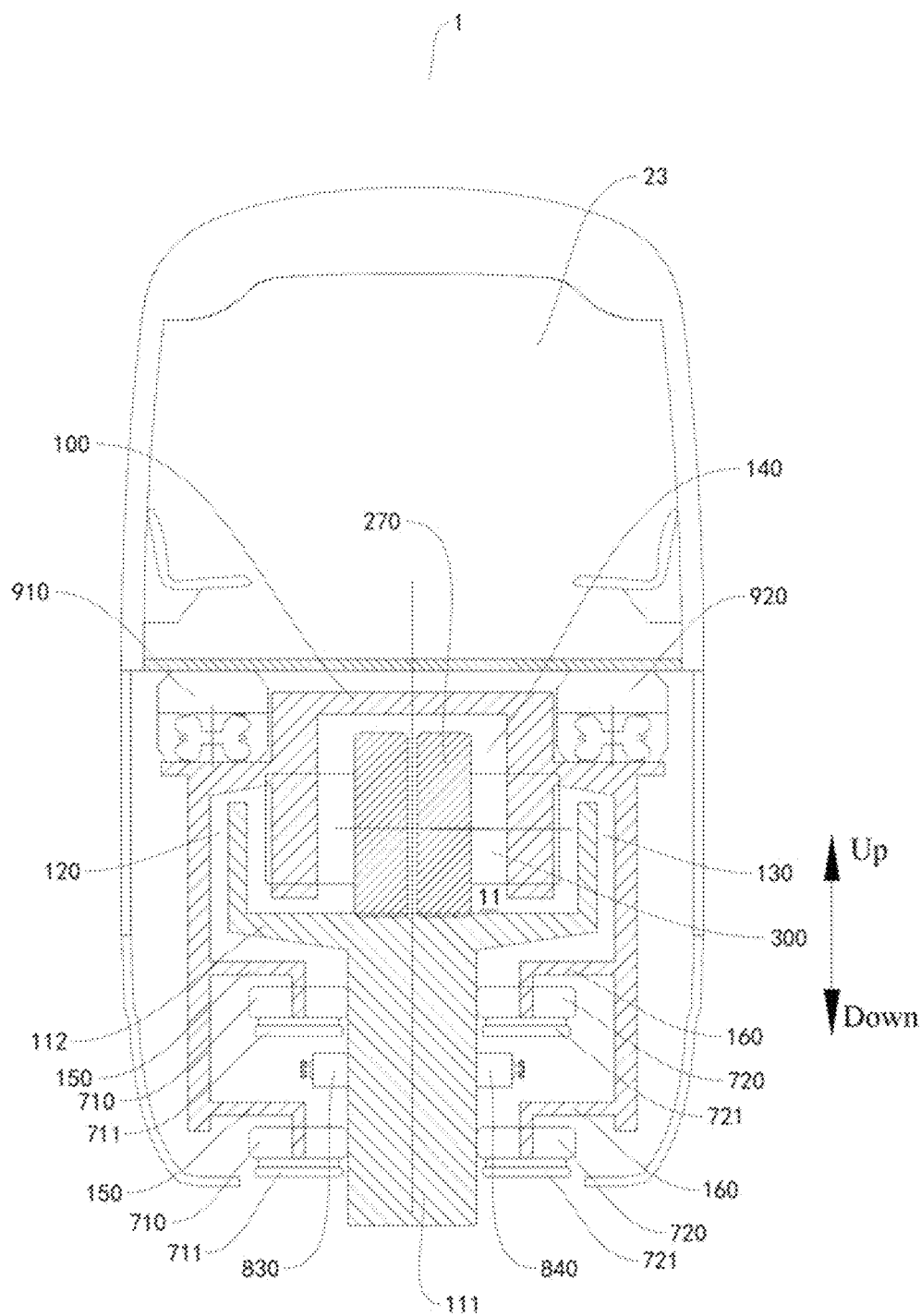
FIG. 83 is a sectional view of a rail transport system according to another embodiment of the present disclosure.
Figure 84:
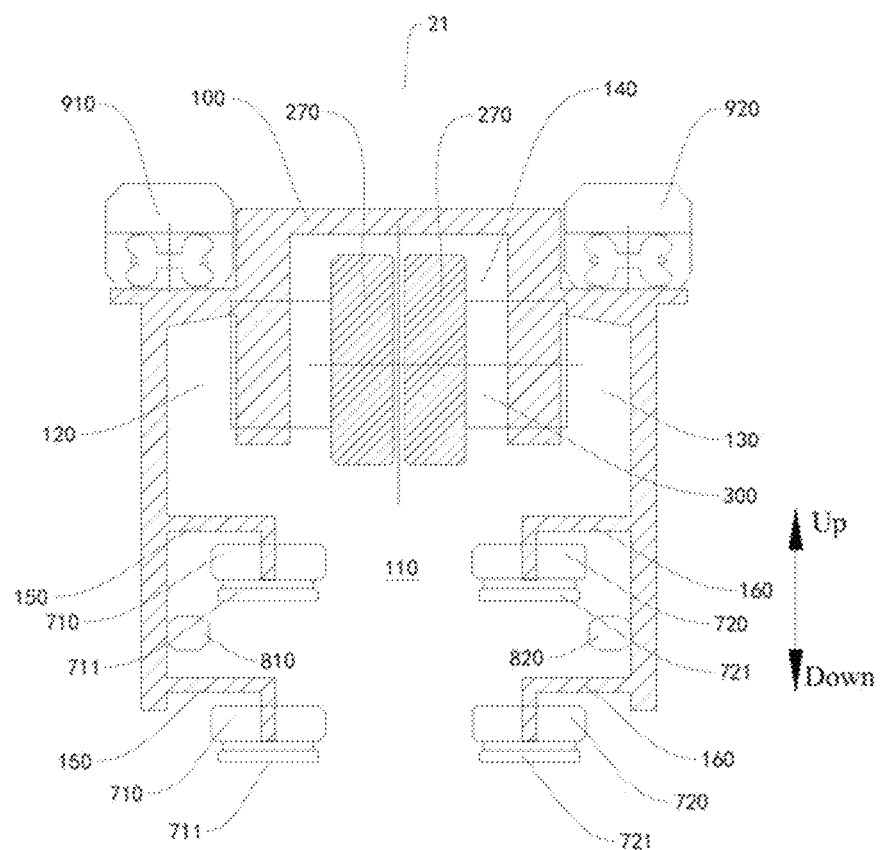
FIG. 84 is a sectional view of a bogie of a rail vehicle according to another embodiment of the present disclosure.

In some embodiments of the present disclosure, as shown in FIG. 83 and FIG. 84, there is a plurality of first horizontal wheels 710 spaced apart along an up and down direction and the first collector shoe 810 is located between neighboring first horizontal wheels 710 in the up and down direction. There is a plurality of second horizontal wheels 720 spaced apart along the up and down direction and the second collector shoe 820 is located between neighboring second horizontal wheels 720 in the up and down direction. Therefore, space distribution and stabilization of the entire structure may be facilitated.

Figure 98:
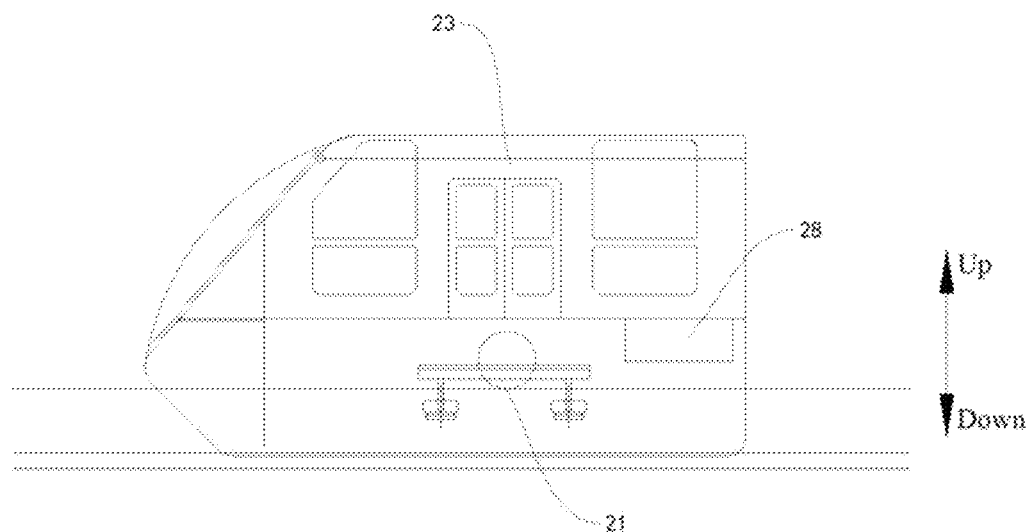
FIG. 98 is a partial schematic structural diagram of a rail transport system according to another embodiment of the present disclosure.

In another embodiment of the present disclosure, as shown in FIG. 98, the rail transport system 1 according to this embodiment of the present disclosure may be applied to transport connection between a main line and each living community. Therefore, the volume of the rail vehicle 20 is smaller than the volume of a rail vehicle on the main line, so that a conductive rail and a collector shoe may be removed, and a power battery 28 is used for power supply. The power battery 28 supplies power to travelling of the rail vehicle 20, and certainly may also supply power to other power utilization situations of the rail vehicle 20. This may simplify the structure and power supply lines, and reduce costs.

Specifically, the power battery 28 may be disposed on a position outside the bogie 21. For example, the power battery 28 may be mounted on the bottom of the compartment 23, or may be mounted inside the compartment 23. The power battery 28 can ensure that the rail vehicle is operated at a normal needed speed, and is automatically charged when passenger traffic is relatively small.

Figure 85:
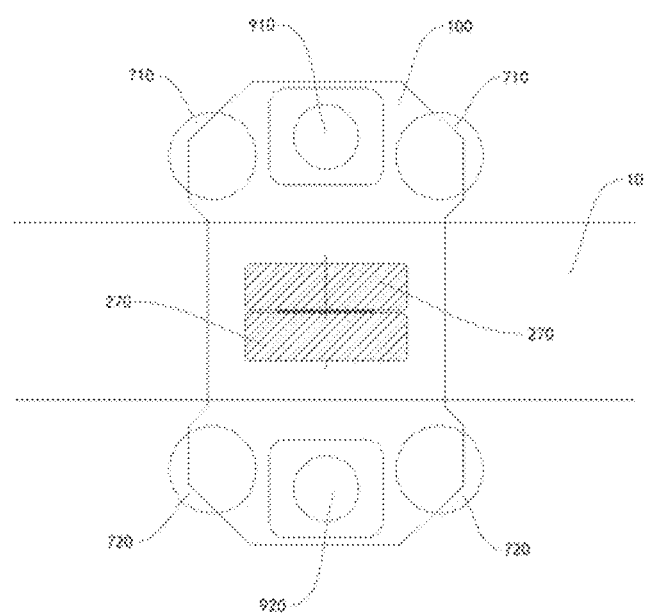
FIG. 85 is a schematic structural diagram of a bogie of a rail vehicle according to an embodiment of the present disclosure.
Figure 86:
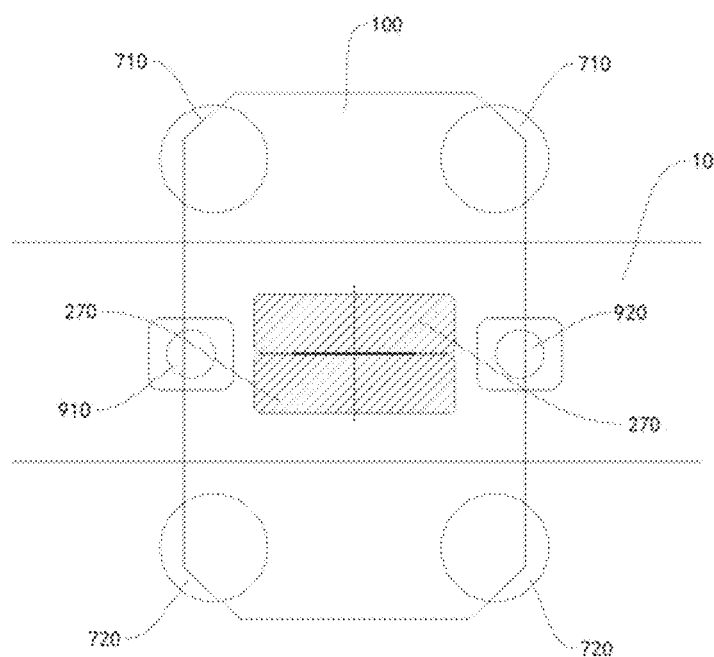
FIG. 86 is a schematic structural diagram of a bogie of a rail vehicle according to another embodiment of the present disclosure.

In some specific examples of the present disclosure, as shown in FIG. 85 and FIG. 86, the bogie 21 further includes a first support suspension device 910 and a second support suspension device 920.

The first support suspension device 910 and the second support suspension device 920 are respectively mounted onto the bogie frame 100 and respectively connected to the vehicle body 22. The first support suspension device 910 and the second support suspension device 920 are spaced apart along the length direction of the rail 10; and in the horizontal plane, the central axis of the first support suspension device 910 and the central axis of the second support suspension device 920 are located on the central axis of the bogie frame 100 and the central axis of the bogie frame 100 equally divides the bogie frame 100 in the width direction of the rail 10.

Alternatively, the first support suspension device 910 and the second support suspension device 920 are spaced apart along the width direction of the rail 10; and in the horizontal plane, the central axis of the first support suspension device 910 and the central axis of the second support suspension device 920 are located on the central axis of the bogie frame 100 and the central axis of the bogie frame 100 equally divides the bogie frame 100 in the length direction of the rail 10.

The first support suspension device 910 and the second support suspension device 920 are used to support the vehicle body 22 and play a role of shock absorption and buffering, and the first support suspension device 910 and the second support suspension device 920 are uniformly loaded and supported, thereby ensuring stability and comfort of the rail vehicle 20. Moreover, costs are relatively low.

For example, the first support suspension device 910 and the second support suspension device 920 may be spaced apart along the length direction of the rail 10 and located on the central axis equally dividing the bogie frame 100 in the width direction of the rail 10 (as shown in FIG. 86). Alternatively, the first support suspension device 910 and the second support suspension device 920 may be spaced apart along the width direction of the rail 10 and located on the central axis equally dividing the bogie frame 100 in the length direction of the rail 10 (as shown in FIG. 85).

Figure 87:
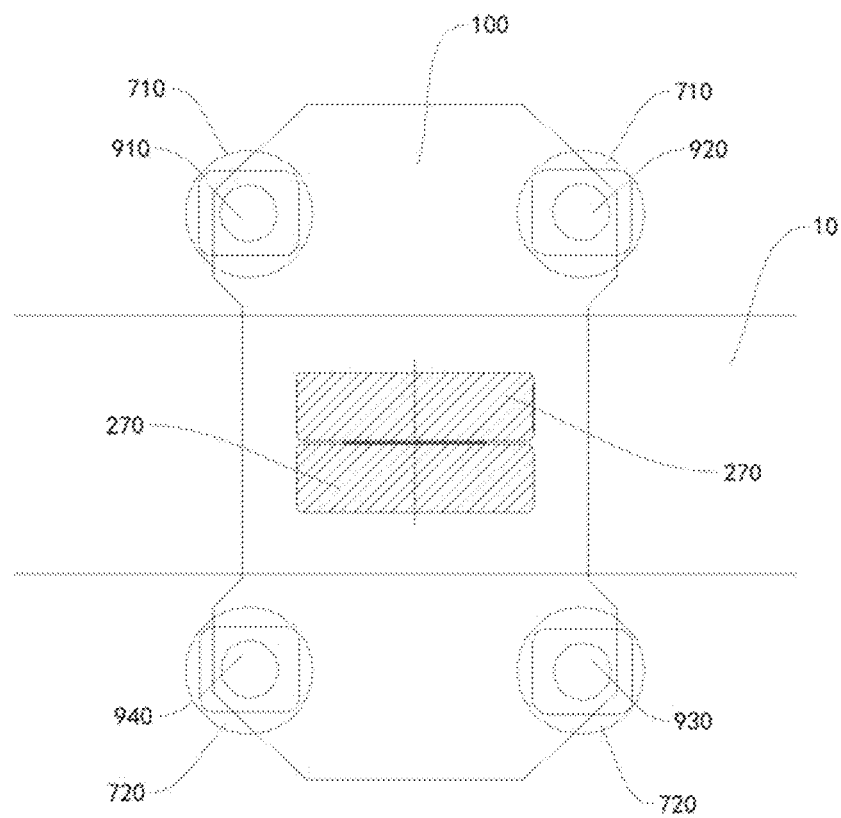
FIG. 87 is a schematic structural diagram of a bogie of a rail vehicle according to another embodiment of the present disclosure.

In some other embodiments of the present disclosure, as shown in FIG. 87, the bogie 21 further includes a first support suspension device 910, a second support suspension device 920, a third support suspension device 930, and a fourth support suspension device 940.

The first support suspension device 910, the second support suspension device 920, the third support suspension device 930, and the fourth support suspension device 940 are respectively mounted onto the bogie frame 100 and respectively connected to the vehicle body 22. The first support suspension device 910, the second support suspension device 920, the third support suspension device 930, and the fourth support suspension device 940 are respectively located at four corners of a rectangle in the horizontal plane, and the rectangle is symmetrical about the center of the bogie frame 100, that is, the symmetrical center of the rectangle is the center of the bogie frame 100. In other words, in the horizontal plane, the rectangle is rotated by 180° around the center of the bogie frame 100, and a rectangle formed after rotation coincides with the rectangle before rotation. The first support suspension device 910, the second support suspension device 920, the third support suspension device 930 and the fourth support suspension device 940 are used to support the vehicle body 22 and play a role of shock absorption and buffering, and first support suspension device 910, the second support suspension device 920, the third support suspension device 930 and the fourth support suspension device 940 are uniformly loaded and supported, thereby improving stability and comfort of the rail vehicle 20.

In some embodiments of the present disclosure, as shown in FIG. 85 to FIG. 87, there are two first horizontal wheels 710 spaced apart along the length direction of the steering portion 111, and there are two second horizontal wheels 720 spaced apart along the length direction of the steering portion 111. The central axes of the two first horizontal wheels 710 and the central axes of the two second horizontal wheels 720 are respectively located at four corners of a rectangle in the horizontal plane, and the rectangle is symmetrical about the center of the bogie frame 100, that is, the symmetrical center of the rectangle is the center of the bogie frame 100. In other words, in the horizontal plane, the rectangle is rotated by 180° around the center of the bogie frame 100, and a rectangle formed after rotation coincides with the rectangle before rotation. Therefore, four horizontal wheels may be uniformly arranged in the horizontal plane, to ensure stability of the horizontal wheels to drive the rail vehicle 20 during steering and straight-line travelling.

It can be understood that that, each of the foregoing rectangles is an assumed virtual rectangle, the rectangle is to clearly express an arrangement manner of the first support suspension device 910, the second support suspension device 920, the third support suspension device 930, and the fourth support suspension device 940 in the horizontal plane, and an arrangement manner of the two first horizontal wheels 710 and the two second horizontal wheels in the horizontal plane.

In the example shown in FIG. 87, the central axes of the two first horizontal wheels 710 and the central axes of the two second horizontal wheels 720 may respectively coincide with the central axis of the first support suspension device 910, the central axis of the second support suspension device 920, the central axis of the third support suspension device 930, and the central axis of the fourth support suspension device 940.

Figure 99:
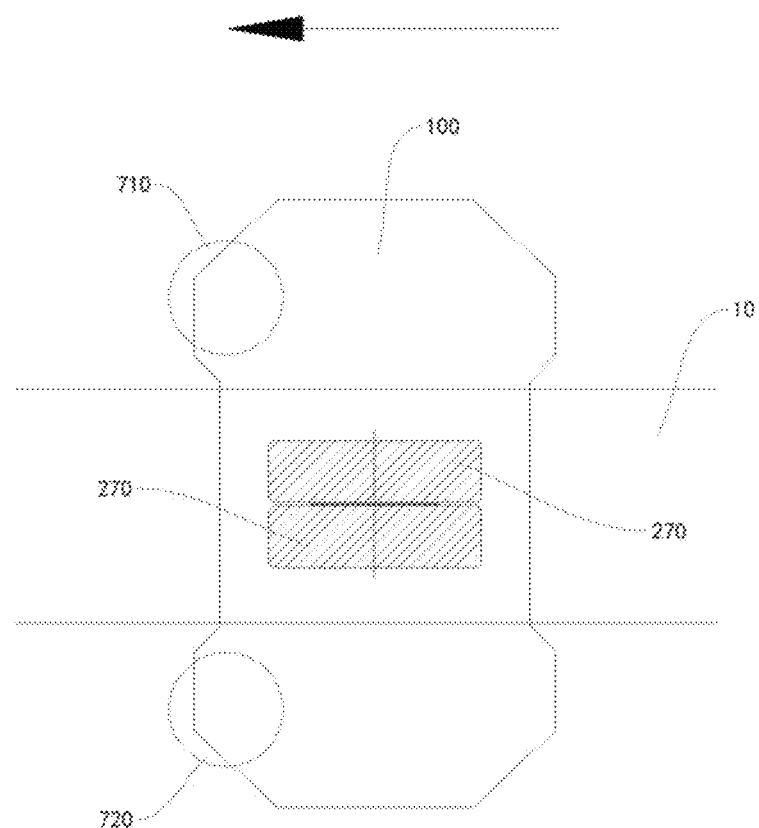
FIG. 99 is a schematic structural diagram of a bogie of a rail vehicle according to another embodiment of the present disclosure.

In some embodiments of the present disclosure, as shown in FIG. 99, there are one first horizontal wheel 710 and one second horizontal wheel 720 respectively, the first horizontal wheel 710 and the second horizontal wheel 720 are spaced apart along the width direction of the rail 10, and the first horizontal wheel 710 and the second horizontal wheel 720 deviate from the center of the bogie frame 100 to a travelling direction of the rail vehicle 20 in the length direction of the rail 10 (an arrow in FIG. 99 shows the travelling direction of the rail vehicle 20). In other words, the first horizontal wheel 710 and the second horizontal wheel 720 deviate from the center of the bogie frame 100 in the length direction of the rail 10 and deviation directions of the first horizontal wheel 710 and the second horizontal wheel 720 are consistent with the travelling direction of the rail vehicle 20. During a travelling process of the rail vehicle 20, a front horizontal wheel in the travelling direction plays a main guiding function, and during bending, a rear horizontal wheel in the travelling direction interferes with the bogie frame 100 to generate a side effect, so that for a one-way rail transport system 1 or a circular rail transport system 1, the rear horizontal wheel in the travelling direction is removed, thereby eliminating interference with the bogie frame 100 during bending, reducing the weight of the rail vehicle 20, and reducing costs of the rail vehicle 20.

Other configurations and operations of the rail transport system 1 according to the embodiments of the present disclosure are known to those of ordinary skill in the art and will not be described in detail herein.

Moreover, those skilled in the art can understand that the individual technical features in the above embodiments can be combined with each other without interference or contradiction. In the above embodiments, the cross section of each member is a section orthogonal to the length direction of the member; the longitudinal central axis of the cross section is a central axis of the cross section extending in the longitudinal direction (length direction) thereof.

In the description of the present disclosure, it should be understood that directions or location relationships indicated by terms "center", "longitudinal", "landscape", "length", "width", "thickness", "upper", "lower", "front", "rear", "left", "right", "vertical", "horizontal", "top", "bottom", "inner", "outer", "clockwise", and "counterclockwise" are directions or location relationships shown based on the accompanying drawings, are merely used for the convenience of describing the present disclosure and simplifying the description, but are not used to indicate or imply that a device or an element must have a particular direction or must be constructed and operated in a particular direction, and therefore, cannot be understood as a limitation to the present disclosure.

In addition, terms "first" and "second" are used only for description objectives, and shall not be construed as indicating or implying relative importance or implying a number of indicated technical features. Therefore, features modified by "first" and "second" may explicitly or implicitly include one or more features. In the description of the present disclosure, unless otherwise specifically limited, "multiple" means at least two, for example, two or three.

In the present disclosure, unless explicitly specified or limited otherwise, the terms "mounted", "connected", "connection", and "fixed" should be understood broadly, for example, which may be fixed connections, detachable connections or integral connections; may be mechanical connections or electrical connections; may be direct connections, indirectly connected with each other through an intermediate medium, or communications inside two elements or an interaction relationship of two elements. A person of ordinary skill in the art may understand specific meanings of the foregoing terms in this disclosure according to a specific situation.

In the descriptions of this specification, descriptions such as reference terms "an embodiment", "some embodiments", "example", "specific example", or "some examples" intend to indicate that specific features, structures, materials, or characteristics described with reference to embodiments or examples are included in at least one embodiment or example of this disclosure. In this specification, exemplary descriptions of the foregoing terms do not necessarily refer to a same embodiment or example. In addition, the described specific feature, structure, material, or characteristic may be combined in a proper manner in any one or more embodiments or examples. In addition, a person skilled in the art may combine different embodiments or examples described in this specification.

Although the embodiments of the present disclosure are shown and described above, it can be understood that the foregoing embodiments are exemplary, and should not be construed as limitations to the present disclosure. A person of ordinary skill in the art can make changes, modifications, replacements, and variations to the foregoing embodiments within the scope of the present disclosure.

What is claimed is:

1. A rail transport system, including:
a rail, the rail being configured to be an escape passage for passengers to evacuate when emergency occurs, wherein the escape passage is directly formed on the rail along a length direction of the rail; and
a rail vehicle, wherein:
the rail vehicle includes a vehicle body and a plurality of bogies, the plurality of bogies respectively movably straddles the rail, and the vehicle body is connected to the plurality of bogies and pulled by the plurality of bogies to travel along the rail;
the vehicle body includes a plurality of compartments hinged sequentially along a length direction of the rail, the plurality of compartments forms at least one compartment group, the compartment group includes three compartments hinged sequentially, and the bottom of each of only compartments that are located at two ends of the compartment group and that are of the three compartments is connected to the bogie; and
the vehicle body further includes an escape port and an escape cover plate, wherein the escape port is disposed on an inner floor of the compartment at the at least one end, and the escape cover plate collaborates with an escape door and can be disposed on the inner floor of the compartment at the at least one end to enable the escape cover plate to open and close the escape port, wherein an escape ladder leading to the escape passage is disposed in the escape port, the escape ladder is in a fixed state and suspends in the escape port, a lower end of the escape ladder and an inner bottom surface of the escape passage are spaced apart to avoid affecting traveling of the rail vehicle.

2. The rail transport system according to claim 1, wherein a number of the compartments is an odd number, and the plurality of compartments is sorted sequentially along the length direction of the rail, wherein the bottom of only each compartment whose sequence number is an odd number is connected to the bogie.

3. The rail transport system according to claim 1, wherein the plurality of compartments is sorted sequentially along the length direction of the rail, and the bottom of each of remaining compartments other than a compartment whose sequence number is 2 is connected to the bogie.

4. The rail transport system according to claim 1, wherein the plurality of compartments of the vehicle body is all used to form a plurality of compartment groups.

5. The rail transport system according to claim 1, wherein neighboring compartments are further flexibly connected.

6. The rail transport system according to claim 5, wherein the neighboring compartments are hinged at a lower portion and flexibly connected at an upper portion.

7. The rail transport system according to claim 1, wherein
the vehicle body includes a plurality of compartments hinged sequentially along the length direction of the rail and the escape door that can be opened and closed,
the escape door is disposed on a surface that is of a compartment at at least one end of the vehicle body along the length direction of the rail and that faces away from an adjacent compartment,
the escape door includes a first end and a second end,
the first end of the escape door is pivotably mounted onto the corresponding compartment, and
the second end of the escape door tilts downward and stretches into the escape passage when the escape door is opened.

8. The rail transport system according to claim 7, wherein an inner surface of the escape door is provided with a slide rail.

9. The rail transport system according to claim 1, wherein
the vehicle body includes a plurality of compartments hinged sequentially along the length direction of the rail and the escape door that can be opened and closed,
the escape door is disposed on a surface that is of a compartment at at least one end of the vehicle body along the length direction of the rail and that faces away from an adjacent compartment.

10. The rail transport system according to claim 9, wherein the vehicle body further includes a stretching/retraction driving device used to drive stretching/retraction of the escape ladder.

11. The rail transport system according to claim 1, wherein the rail includes:
a first rail beam;
a second rail beam, wherein the first rail beam and the second rail beam are spaced apart; and
a weight bearing floor, wherein the weight bearing floor is disposed between the first rail beam and the second rail beam and is connected to the first rail beam and the second rail beam, and the escape passage is defined among the first rail beam, the second rail beam, and the weight bearing floor.

12. The rail transport system according to claim 11, wherein the weight bearing floor includes:
a connection beam, wherein two ends of the connection beam are respectively connected to the first rail beam and the second rail beam;
a support frame, wherein the support frame is mounted onto the connection beam; and
a support plate, wherein the support plate is connected to the support frame and supported by the support frame, and the support plate forms a bottom surface of the escape passage.

13. The rail transport system according to claim 12, wherein the support plate and at least one of the first rail beam and the second rail beam are spaced apart in a horizontal direction.

14. The rail transport system according to claim 12, wherein there is a plurality of connection beams spaced apart along the length direction of the rail, and there is a plurality of support plates sequentially connected along the length direction of the rail.

15. The rail transport system according to claim 12, wherein at least one of an upper end and a lower end of at least one of the first rail beam and the second rail beam is provided with an anti-dropping edge, and the anti-dropping edge extends outward horizontally and is used to prevent the bogie from being disengaged from the rail.

16. The rail transport system according to claim 11, wherein the bogie includes:
- a bogie frame, wherein the bogie frame has a straddle recess straddling the rail;
- a first running wheel and a second running wheel, wherein the first running wheel and the second running wheel are pivotably mounted onto the bogie frame respectively and are coaxially spaced apart, the first running wheel fits in on an upper surface of the first rail beam, and the second running wheel fits in on an upper surface of the second rail beam; and
- a driving device, wherein the driving device is mounted onto the bogie frame and is located between the first running wheel and the second running wheel, and the first running wheel and the second running wheel are driven by the driving device.

17. The rail transport system according to claim 11, wherein the bogie includes:
- a bogie frame, wherein the bogie frame has a straddle recess straddling the rail;
- a first running wheel and a second running wheel, wherein the first running wheel and the second running wheel are pivotably mounted onto the bogie frame respectively and are coaxially spaced apart, the first running wheel fits in on an upper surface of the first rail beam, and the second running wheel fits in on an upper surface of the second rail beam;
- a third running wheel and a fourth running wheel, wherein the third running wheel and the fourth running wheel are pivotably mounted onto the bogie frame respectively and are coaxially spaced apart, the third running wheel fits in on the upper surface of the first rail beam and is spaced apart from the first running wheel in a length direction of the first rail beam, and the fourth running wheel fits in on the upper surface of the second rail beam and is spaced apart from the second running wheel in a length direction of the second rail beam; and
- at least one driving device, wherein the at least one driving device is mounted onto the bogie frame, a first driving device of the at least one driving device is located between the first running wheel and the second running wheel and/or a second driving device of the at least one driving device is located between the third running wheel and the fourth running wheel, and the first running wheel and the second running wheel are driven by the first driving device and/or the third running wheel and the fourth running wheel are driven by the second driving device.

18. The rail transport system according to claim 17, wherein
- the first running wheel and the second running wheel are connected by using a first connection shaft and/or the third running wheel and the fourth running wheel are connected by using a second connection shaft; and
- the at least one driving device is in transmission connection to the first connection shaft and/or the second connection shaft.

19. The rail transport system according to claim 17, wherein
- the first driving device is closer to the first running wheel than the second running wheel, and/or the second driving device is closer to the fourth running wheel than the third running wheel.

20. The rail transport system according to claim 16, wherein the bogie further includes:
- a first horizontal wheel, wherein the first horizontal wheel is pivotably mounted onto the bogie frame and fits in on a side surface of the first rail beam; and
- a second horizontal wheel, wherein the second horizontal wheel is pivotably mounted onto the bogie frame and fits in on a side surface of the second rail beam.

* * * * *